United States Patent
Farag et al.

(10) Patent No.: US 12,470,356 B2
(45) Date of Patent: Nov. 11, 2025

(54) CROSS CARRIER BEAM INDICATION

(71) Applicant: Samsung Electronics Co., Ltd., Suwon-si (KR)

(72) Inventors: Emad N. Farag, Flanders, NJ (US); Eko Onggosanusi, Coppell, TX (US); Dalin Zhu, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 394 days.

(21) Appl. No.: 18/068,452

(22) Filed: Dec. 19, 2022

(65) Prior Publication Data

US 2023/0216645 A1    Jul. 6, 2023

Related U.S. Application Data

(60) Provisional application No. 63/322,542, filed on Mar. 22, 2022, provisional application No. 63/296,358, filed on Jan. 4, 2022.

(51) Int. Cl.
*H04L 5/00* (2006.01)
*H04L 1/1812* (2023.01)
(Continued)

(52) U.S. Cl.
CPC .......... *H04L 5/0055* (2013.01); *H04L 1/1812* (2013.01); *H04W 72/0453* (2013.01); *H04W 72/1273* (2013.01)

(58) Field of Classification Search
None
See application file for complete search history.

(56) References Cited

U.S. PATENT DOCUMENTS

2022/0264537 A1    8/2022    Shi et al.
2022/0322390 A1*   10/2022   Nogami ............ H04W 72/0446
(Continued)

FOREIGN PATENT DOCUMENTS

WO      2021088012 A1     5/2021
WO   WO-2021201533 A1 *  10/2021    ........... H04B 17/373
WO      2021243670 A1    12/2021

OTHER PUBLICATIONS

"3rd Generation Partnership Project; Technical Specification Group Radio Access Network; NR; Physical channels and modulation (Release 16)", 3GPP TS 38.211 V16.8.0, Dec. 2021, 134 pages.
(Continued)

*Primary Examiner* — Srinivasa R Reddivalam

(57) ABSTRACT

A method of operating a user equipment (UE) includes receiving configuration information for a list of transmission configuration indicator (TCI) states, a list of TCI state code points, and cross carrier scheduling and receiving a downlink control information (DCI) format including (i) a carrier indicator field and (ii) a transmission configuration indication field indicating a TCI state code point. The TCI state code point is from the list of TCI state code points and indicates a TCI state for a first carrier and a TCI state for a second carrier. The method further includes applying the indicated TCI state code point for a first carrier and a second carrier and receiving or transmitting, on the first carrier and the second carrier, downlink (DL) channels or uplink (UL) channels, respectively, based on quasi-co-location properties or spatial properties corresponding to the indicated TCI state code point.

17 Claims, 19 Drawing Sheets

(51) Int. Cl.
*H04W 72/0453* (2023.01)
*H04W 72/1273* (2023.01)

(56) References Cited

U.S. PATENT DOCUMENTS

| | | | | |
|---|---|---|---|---|
| 2023/0136113 | A1* | 5/2023 | Guo | H04L 5/0094 370/329 |
| 2023/0156772 | A1* | 5/2023 | Xiao | H04L 5/0053 370/329 |
| 2023/0217458 | A1 | 7/2023 | Bang et al. | |
| 2024/0080843 | A1* | 3/2024 | Muruganathan | H04W 72/20 |

OTHER PUBLICATIONS

"3rd Generation Partnership Project; Technical Specification Group Radio Access Network; NR; Multiplexing and channel coding (Release 16)", 3GPP TS 38.212 V16.8.0, Dec. 2021, 153 pages.
"3rd Generation Partnership Project; Technical Specification Group Radio Access Network; NR; Physical layer procedures for control (Release 16)", 3GPP TS 38.213 V16.8.0, Dec. 2021, 189 pages.
"3rd Generation Partnership Project; Technical Specification Group Radio Access Network; NR; Physical layer procedures for data (Release 16)", 3GPP TS 38.214 V16.8.0, Dec. 2021, 172 pages.
"5G; NR; Medium Access Control (MAC) protocol specification (3GPP TS 38.321 version 16.7.0 Release 16)", ETSI TS 138 321 V16.7.0, Jan. 2022, 160 pages.
"5G; NR; Radio Resource Control (RRC); Protocol specification (3GPP TS 38.331 version 16.7.0 Release 16)", ETSI TS 138 331 V16.7.0, Jan. 2022, 950 pages.
International Search Report and Written Opinion issued Apr. 4, 2023 regarding International Application No. PCT/KR2023/000180, 8 pages.
Samsung, "Multi-beam enhancements", 3GPP TSG RAN WG1 #103-e, R1-2008148, Nov. 2020, 20 pages.
Asustek, "Interoperation between cross-carrier scheduling and multiple TRPs", 3GPP TSG RAN WG1 #105-e, R1-2105842, May 2021, 4 pages.
Vivo, "Further discussion on multi beam enhancement", 3GPP TSG RAN WG1 #106-e, R1-2106571, Aug. 2021, 30 pages.
Samsung, "Multi-beam enhancements", 3GPP TSG RAN WG1 #106-e, R1-2106865, Aug. 2021, 24 pages.
Extended European Search Report issued Feb. 5, 2025 regarding Application No. 23737385.7, 11 pages.

* cited by examiner

CROSS CARRIER BEAM INDICATION

CROSS-REFERENCE TO RELATED APPLICATIONS AND CLAIM OF PRIORITY

The present application claims priority to U.S. Provisional Patent Application No. 63/296,358, filed on Jan. 4, 2022, and U.S. Provisional Patent Application No. 63/322,542, filed on Mar. 22, 2022. The contents of the above-identified patent documents are incorporated herein by reference.

TECHNICAL FIELD

The present disclosure relates generally to wireless communication systems and, more specifically, the present disclosure relates to a cross carrier beam indication, for example, with multiple TCI states in a wireless communication system.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

The present disclosure relates to wireless communication systems and, more specifically, the present disclosure relates to a cross carrier beam indication.

In one embodiment, a user equipment (UE) is provided. The UE includes a transceiver configured to receive configuration information for a list of transmission configuration indicator (TCI) states, receive configuration information for a list of TCI state code points, receive configuration information for cross carrier scheduling, and receive a downlink control information (DCI) format including (i) a carrier indicator field associated with the configuration information for cross carrier scheduling and (ii) a transmission configuration indication field indicating a TCI state code point. The TCI state code point is from the list of TCI state code points and indicates a TCI state for a first carrier and a TCI state for a second carrier. The UE further includes a processor operably coupled to the transceiver. The processor is configured to apply the indicated TCI state code point for a first carrier and a second carrier. The transceiver is further configured to receive or transmit, on the first and second carriers, downlink (DL) channels or uplink (UL) channels, respectively, based on quasi-co-location properties or spatial properties corresponding to the indicated TCI state code point.

In another embodiment, a base station (BS) is provided. The BS includes a transceiver configured to transmit configuration information for a list of TCI states, transmit configuration information for a list of TCI state code points, transmit configuration information for cross carrier scheduling, and transmit a DCI format including (i) a carrier indicator field associated with the configuration information for cross carrier scheduling and (ii) a transmission configuration indication field indicating a TCI state code point. The TCI state code point is from the list of TCI state code points and indicates a TCI state for a first carrier and a TCI state for a second carrier. The BS further includes a processor operably coupled to the transceiver. The processor is configured to apply the indicated TCI state code point for a first carrier and a second carrier. The transceiver is further configured to transmit or receive, on the first carrier and the second carrier, DL channels or UL channels, respectively, based on quasi-co-location properties or spatial properties corresponding to the indicated TCI state code point.

In yet another embodiment, a method of operating a UE is provided. The method includes receiving configuration information for a list of TCI states; receiving configuration information for a list of TCI state code points; receiving configuration information for cross carrier scheduling; and receiving a DCI format including (i) a carrier indicator field associated with the configuration information for cross carrier scheduling and (ii) a transmission configuration indication field indicating a TCI state code point. The TCI state code point is from the list of TCI state code points and indicates a TCI state for a first carrier and a TCI state for a second carrier. The method further includes applying the indicated TCI state code point for a first carrier and a second carrier; and receiving or transmitting, on the first carrier and the second carrier, DL channels or UL channels, respectively, based on quasi-co-location properties or spatial properties corresponding to the indicated TCI state code point.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIG. 1 through FIG. 30, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents are hereby incorporated by reference into the present disclosure as if fully set forth herein: 3GPP TS 38.211 v16.8.0, "NR; Physical channels and modulation"; 3GPP TS 38.212 v16.8.0, "NR; Multiplexing and Channel coding"; 3GPP TS 38.213 v16.8.0, "NR; Physical Layer Procedures for Control"; 3GPP TS 38.214 v16.8.0, "NR; Physical Layer Procedures for Data"; 3GPP TS 38.321 v16.7.0, "NR; Medium Access Control (MAC) protocol specification"; and 3GPP TS 38.331 v16.7.0, "NR; Radio Resource Control (RRC) Protocol Specification."

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancelation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Figure 1:
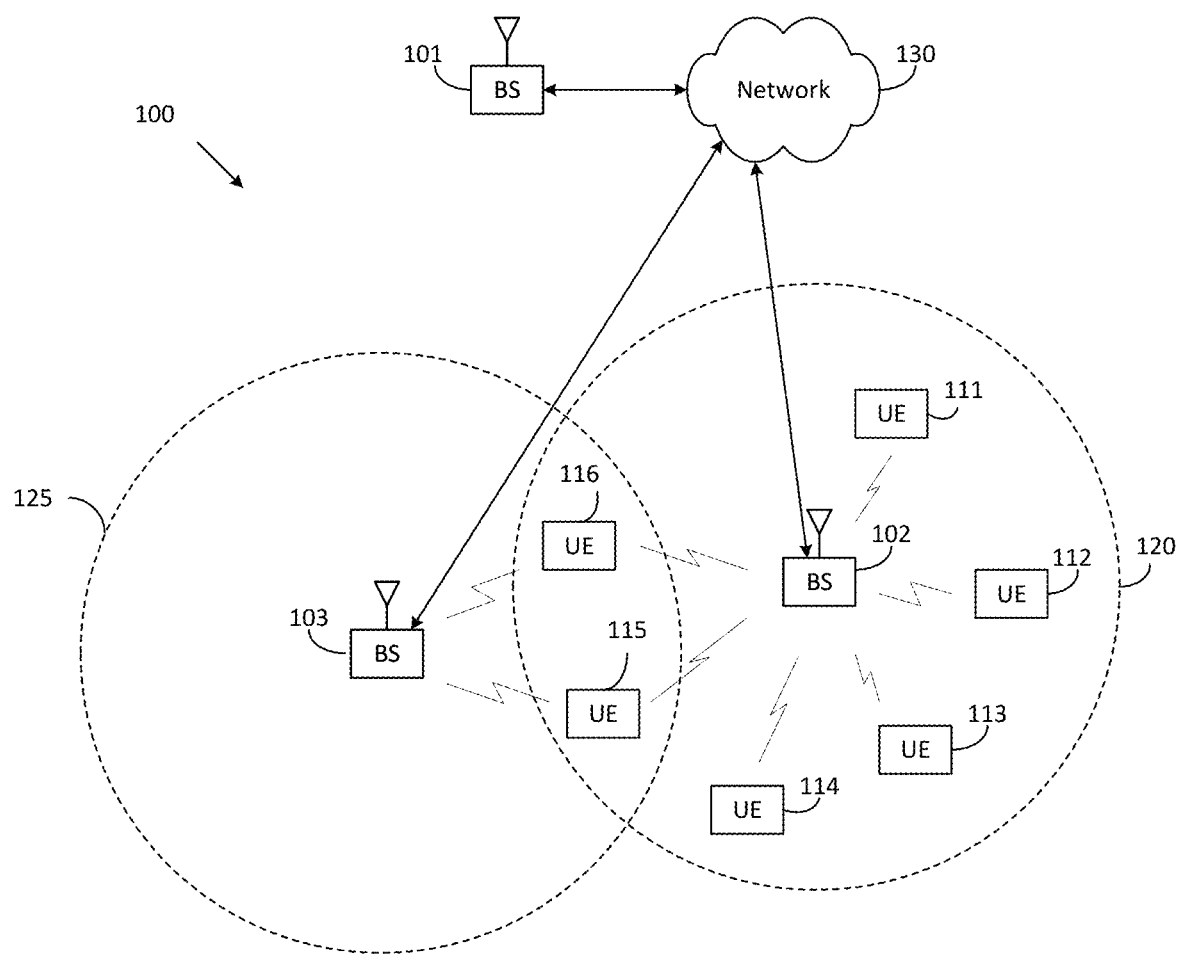
FIG. 1 illustrates an example of wireless network according to embodiments of the present disclosure.
Figure 2:
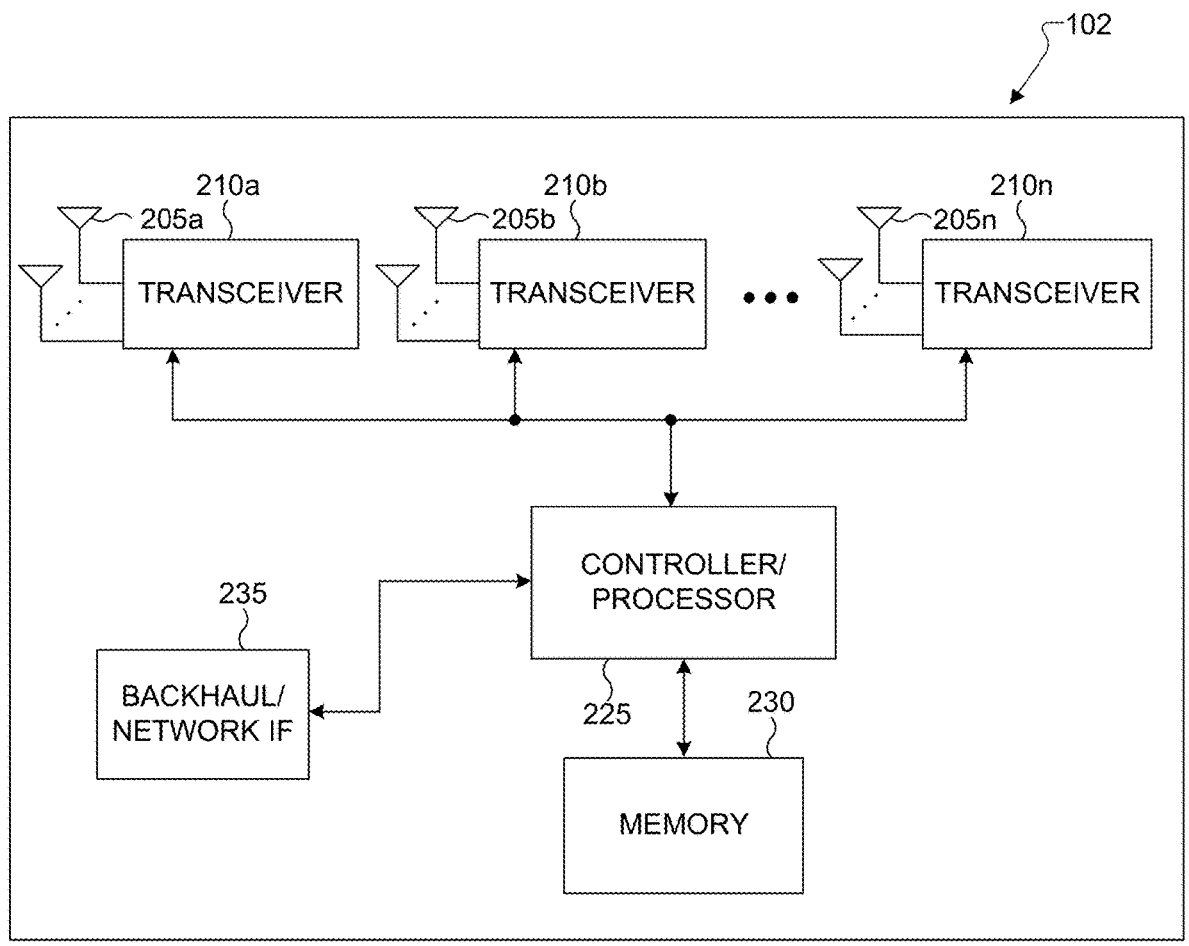
FIG. 2 illustrates an example of gNB according to embodiments of the present disclosure.
Figure 3:
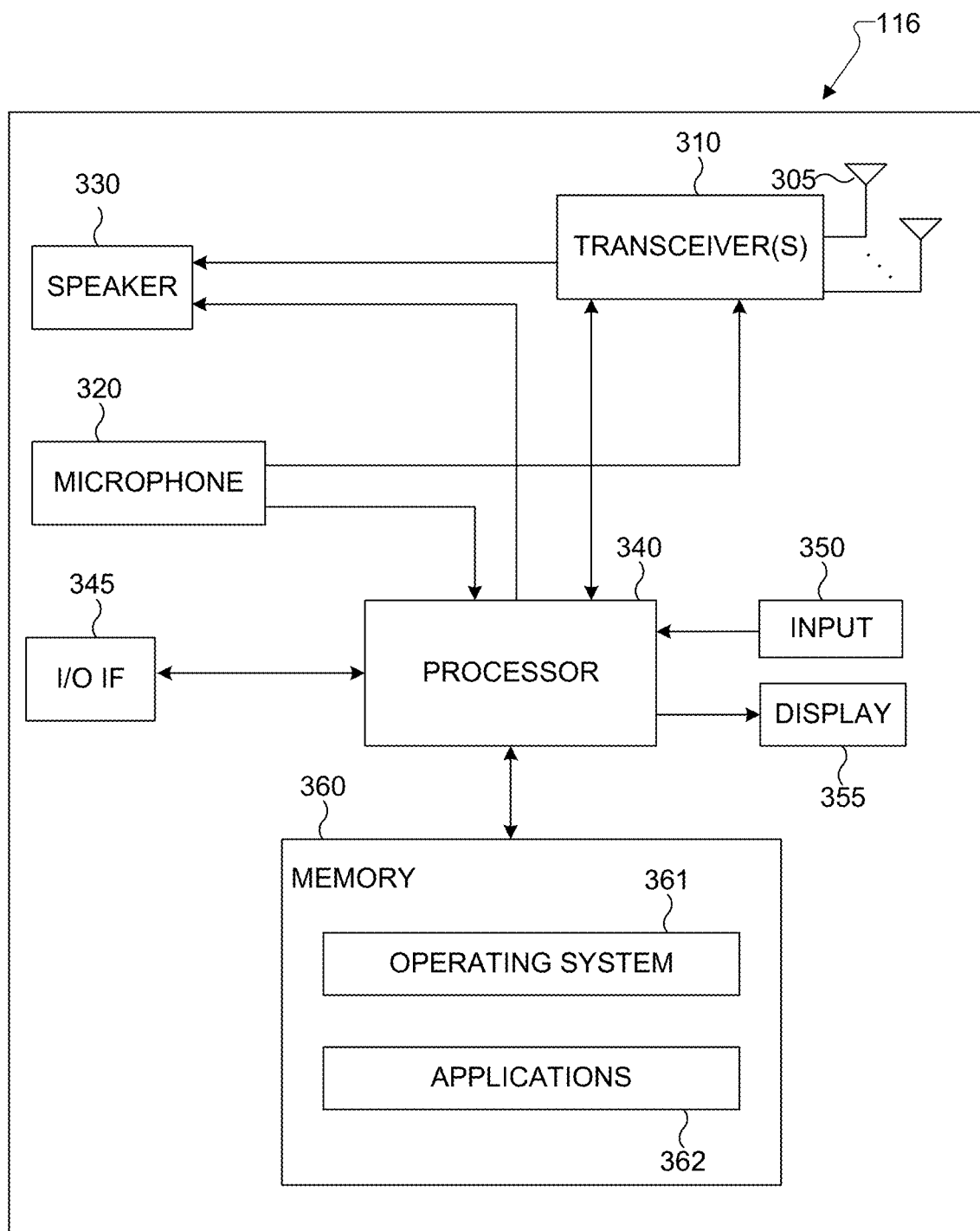
FIG. 3 illustrates an example of UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise; a UE 113, which may be a WiFi hotspot; a UE 114, which may be located in a first residence; a UE 115, which may be located in a second residence; and a UE 116, which may be a mobile device, such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3$^{rd}$ generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for a cross carrier beam indication with multiple TCI states in a wireless communication system. In certain embodiments, and one or more of the gNBs 101-103 includes circuitry, programing, or a combination thereof, for a cross carrier beam indication with multiple TCI states in a wireless communication system.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple transceivers 210a-210n, a controller/processor 225, a memory 230, and a backhaul or network interface 235.

The transceivers 210a-210n receive, from the antennas 205a-205n, incoming RF signals, such as signals transmitted by UEs in the network 100. The transceivers 210a-210n down-convert the incoming RF signals to generate IF or baseband signals. The IF or baseband signals are processed by receive (RX) processing circuitry in the transceivers 210a-210n and/or controller/processor 225, which generates processed baseband signals by filtering, decoding, and/or digitizing the baseband or IF signals. The controller/processor 225 may further process the baseband signals.

Transmit (TX) processing circuitry in the transceivers 210a-210n and/or controller/processor 225 receives analog or digital data (such as voice data, web data, e-mail, or interactive video game data) from the controller/processor 225. The TX processing circuitry encodes, multiplexes, and/or digitizes the outgoing baseband data to generate processed baseband or IF signals. The transceivers 210a-210n up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of UL channel signals and the transmission of DL channel signals by the transceivers 210a-210n in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process. The controller/processor 225 is also capable of executing programs and other processes resident in the memory 230, such as processes a cross carrier beam indication with multiple TCI states in a wireless communication system.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes antenna(s) 305, a transceiver(s) 310, and a microphone 320. The UE 116 also includes a speaker 330, a processor 340, an input/output (I/O) interface (IF) 345, an input 350, a display 355, and a memory 360. The memory 360 includes an operating system (OS) 361 and one or more applications 362.

The transceiver(s) 310 receives, from the antenna 305, an incoming RF signal transmitted by a gNB of the network 100. The transceiver(s) 310 down-converts the incoming RF signal to generate an intermediate frequency (IF) or baseband signal. The IF or baseband signal is processed by RX processing circuitry in the transceiver(s) 310 and/or processor 340, which generates a processed baseband signal by filtering, decoding, and/or digitizing the baseband or IF signal. The RX processing circuitry sends the processed baseband signal to the speaker 330 (such as for voice data) or is processed by the processor 340 (such as for web browsing data).

TX processing circuitry in the transceiver(s) 310 and/or processor 340 receives analog or digital voice data from the microphone 320 or other outgoing baseband data (such as web data, e-mail, or interactive video game data) from the processor 340. The TX processing circuitry encodes, multiplexes, and/or digitizes the outgoing baseband data to generate a processed baseband or IF signal. The transceiver(s) 310 up-converts the baseband or IF signal to an RF signal that is transmitted via the antenna(s) 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the transceiver(s) 310 in accordance with well-known principles. In some embodiments, the processor 340 includes at least one microprocessor or microcontroller.

The processor 340 is also capable of executing other processes and programs resident in the memory 360, such as processes for a cross carrier beam indication with multiple TCI states in a wireless communication system. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input 350, which includes for example, a touchscreen, keypad, etc., and the display 355. The operator of the UE 116 can use the input 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). In another example, the transceiver(s) 310 may include any number of transceivers and signal processing chains and may be connected to any number of antennas. Also, while FIG. 3 illustrates the UE 116 configured as a mobile telephone or smartphone, UEs could be configured to operate as other types of mobile or stationary devices.

Figure 4:
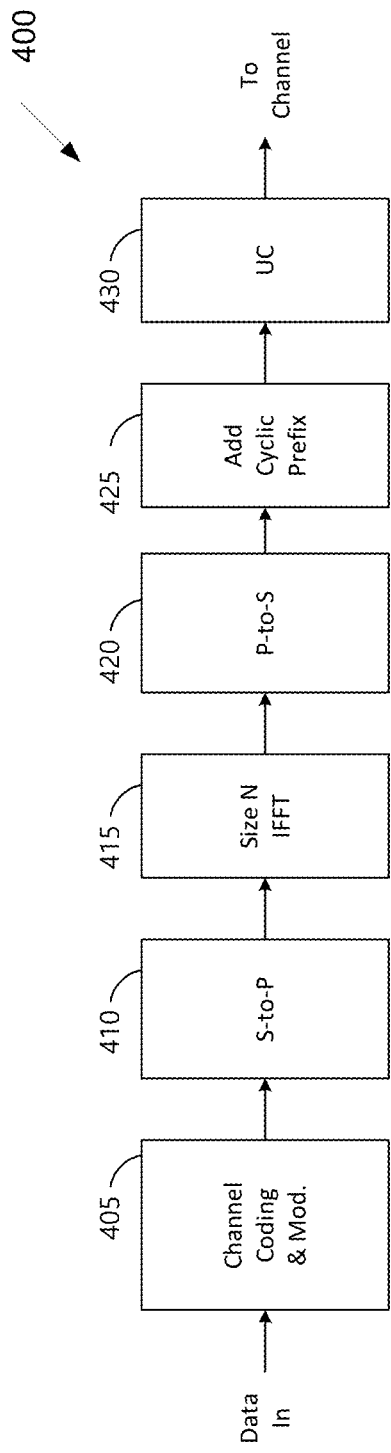
FIGS. 4 and 5 illustrate example of wireless transmit and receive paths according to this disclosure.
Figure 5:
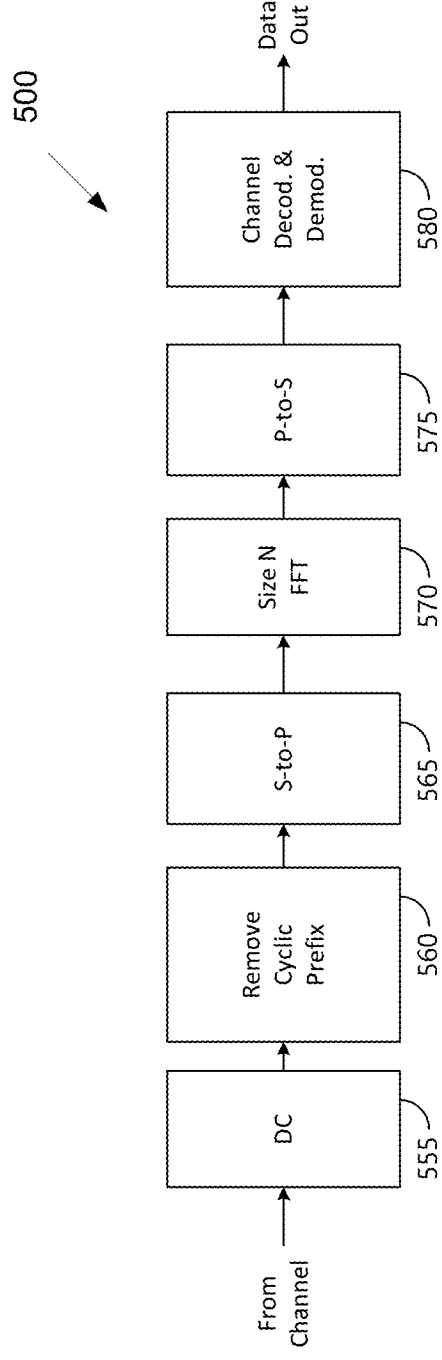

FIG. 4 and FIG. 5 illustrate example wireless transmit and receive paths according to this disclosure. In the following description, a transmit path 400 may be described as being implemented in a gNB (such as the gNB 102), while a receive path 500 may be described as being implemented in a UE (such as a UE 116). However, it may be understood that the receive path 500 can be implemented in a gNB and that the transmit path 400 can be implemented in a UE. In some embodiments, the receive path 500 is configured to support the codebook design and structure for systems having 2D antenna arrays as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a downconverter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols.

The serial-to-parallel block 410 converts (such as demultiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the gNB 102 arrives at the UE 116 after passing through the wireless channel, and reverse operations to those at the gNB 102 are performed at the UE 116.

As illustrated in FIG. 5, the downconverter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the gNB s 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the gNBs 101-103 and may implement the receive path 500 for receiving in the downlink from the gNBs 101-103.

Each of the components in FIG. 4 and FIG. 5 can be implemented using only hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 515 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

A unit for DL signaling or for UL signaling on a cell is referred to as a slot and can include one or more symbols. A bandwidth (BW) unit is referred to as a resource block (RB). One RB includes a number of sub-carriers (SCs). For example, a slot can have duration of one millisecond and an RB can have a bandwidth of 180 KHz and include 12 SCs with inter-SC spacing of 15 KHz. A slot can be either full DL slot, or full UL slot, or hybrid slot similar to a special subframe in time division duplex (TDD) systems.

DL signals include data signals conveying information content, control signals conveying DL control information (DCI), and reference signals (RS) that are also known as pilot signals. A gNB transmits data information or DCI through respective physical DL shared channels (PDSCHs) or physical DL control channels (PDCCHs). A PDSCH or a PDCCH can be transmitted over a variable number of slot symbols including one slot symbol. A UE can be indicated a spatial setting for a PDCCH reception based on a configuration of a value for a transmission configuration indication state (TCI state) of a control resource set (CORESET) where the UE receives the PDCCH. The UE can be indicated a spatial setting for a PDSCH reception based on a configuration by higher layers or based on an indication by a DCI format scheduling the PDSCH reception of a value for a TCI state. The gNB can configure the UE to receive signals on a cell within a DL bandwidth part (BWP) of the cell DL BW.

A gNB transmits one or more of multiple types of RS including channel state information RS (CSI-RS) and demodulation RS (DMRS). A CSI-RS is primarily intended for UEs to perform measurements and provide channel state information (CSI) to a gNB. For channel measurement, non-zero power CSI-RS (NZP CSI-RS) resources are used. For interference measurement reports (IMRs), CSI interference measurement (CSI-IM) resources associated with a zero power CSI-RS (ZP CSI-RS) configuration are used. A CSI process consists of NZP CSI-RS and CSI-IM resources. A UE can determine CSI-RS transmission parameters through DL control signaling or higher layer signaling, such as an RRC signaling from a gNB. Transmission instances of a CSI-RS can be indicated by DL control signaling or configured by higher layer signaling. A DMRS is transmitted only in the BW of a respective PDCCH or PDSCH and a UE can use the DMRS to demodulate data or control information.

UL signals also include data signals conveying information content, control signals conveying UL control information (UCI), DMRS associated with data or UCI demodulation, sounding RS (SRS) enabling a gNB to perform UL channel measurement, and a random access (RA) preamble enabling a UE to perform random access. A UE transmits data information or UCI through a respective physical UL shared channel (PUSCH) or a physical UL control channel (PUCCH). A PUSCH or a PUCCH can be transmitted over a variable number of slot symbols including one slot symbol. The gNB can configure the UE to transmit signals on a cell within an UL BWP of the cell UL BW.

UCI includes hybrid automatic repeat request acknowledgement (HARQ-ACK) information, indicating correct or incorrect detection of data transport blocks (TBs) in a PDSCH, scheduling request (SR) indicating whether a UE has data in the buffer of UE, and CSI reports enabling a gNB to select appropriate parameters for PDSCH or PDCCH transmissions to a UE. HARQ-ACK information can be configured to be with a smaller granularity than per TB and can be per data code block (CB) or per group of data CBs where a data TB includes a number of data CBs.

A CSI report from a UE can include a channel quality indicator (CQI) informing a gNB of a largest modulation and coding scheme (MCS) for the UE to detect a data TB with a predetermined block error rate (BLER), such as a 10% BLER, of a precoding matrix indicator (PMI) informing a gNB how to combine signals from multiple transmitter antennas in accordance with a multiple input multiple output (MIMO) transmission principle, and of a rank indicator (RI) indicating a transmission rank for a PDSCH. UL RS includes DMRS and SRS. DMRS is transmitted only in a BW of a respective PUSCH or PUCCH transmission. A gNB can use a DMRS to demodulate information in a respective PUSCH or PUCCH. SRS is transmitted by a UE to provide a gNB with an UL CSI and, for a TDD system, an SRS transmission can also provide a PMI for DL transmission. Additionally, in order to establish synchronization or an initial higher layer connection with a gNB, a UE can transmit a physical random-access channel.

In the present disclosure, a beam is determined by either of: (1) a TCI state, which establishes a quasi-colocation (QCL) relationship or spatial relation between a source reference signal (e.g., synchronization signal/physical broadcast channel (PBCH) block (SSB) and/or CSI-RS) and a target reference signal; or (2) spatial relation information that establishes an association to a source reference signal, such as SSB or CSI-RS or SRS. In either case, the ID of the source reference signal identifies the beam.

The TCI state and/or the spatial relation reference RS can determine a spatial Rx filter for reception of downlink channels at the UE, or a spatial Tx filter for transmission of uplink channels from the UE. The TCI state and/or the spatial relation reference RS can determine a spatial Tx filter for transmission of downlink channels from the gNB, or a spatial Rx filter for reception of uplink channels at the gNB.

Figure 6A:
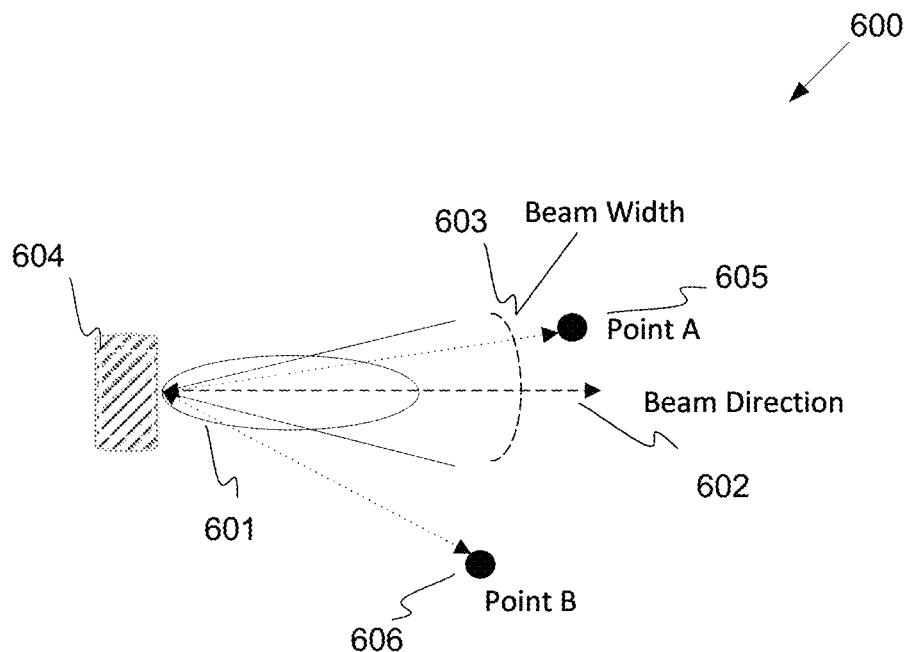
FIG. 6A illustrates an example of wireless system beam according to embodiments of the present disclosure.

FIG. 6A illustrates an example wireless system beam 600 according to embodiments of the present disclosure. An embodiment of the wireless system beam 600 shown in FIG. 6A is for illustration only.

As illustrated in FIG. 6A, in a wireless system a beam 601, for a device 604, can be characterized by a beam direction 602 and a beam width 603. For example, a device 604 with a transmitter transmits radio frequency (RF) energy in a beam direction and within a beam width. The device 604 with a receiver receives RF energy coming towards the device in a beam direction and within a beam width. As illustrated in FIG. 6A, a device at point A 605 can receive from and transmit to the device 604 as point A is within a beam width of a beam traveling in a beam direction and coming from the device 604.

As illustrated in FIG. 6A, a device at point B 606 cannot receive from and transmit to the device 604 as point B is outside a beam width of a beam traveling in a beam direction and coming from the device 604. While FIG. 6A, for illustrative purposes, shows a beam in 2-dimensions (2D), it may be apparent to those skilled in the art, that a beam can be in 3-dimensions (3D), where the beam direction and beam width are defined in space.

Figure 6B:
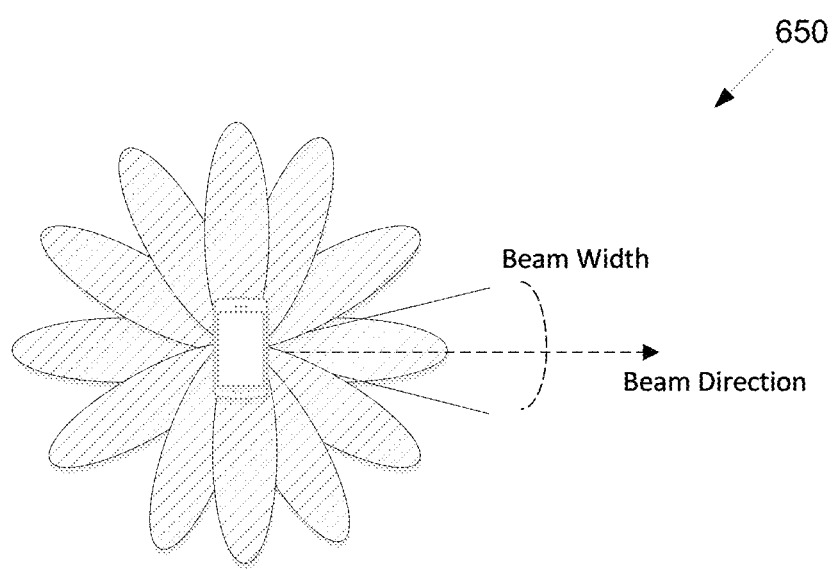
FIG. 6B illustrates an example of multi-beam operation according to embodiments of the present disclosure.

FIG. 6B illustrates an example multi-beam operation 650 according to embodiments of the present disclosure. An embodiment of the multi-beam operation 650 shown in FIG. 6B is for illustration only.

In a wireless system, a device can transmit and/or receive on multiple beams. This is known as "multi-beam operation" and is illustrated in FIG. 6B. While FIG. 6B, for illustrative purposes, is in 2D, it may be apparent to those skilled in the art, that a beam can be 3D, where a beam can be transmitted to or received from any direction in space.

Rel.14 LTE and Rel.15 NR support up to 32 CSI-RS antenna ports which enable an eNB to be equipped with a large number of antenna elements (such as 64 or 128). In this case, a plurality of antenna elements is mapped onto one CSI-RS port. For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies) as illustrated in FIG. 7.

Figure 7:
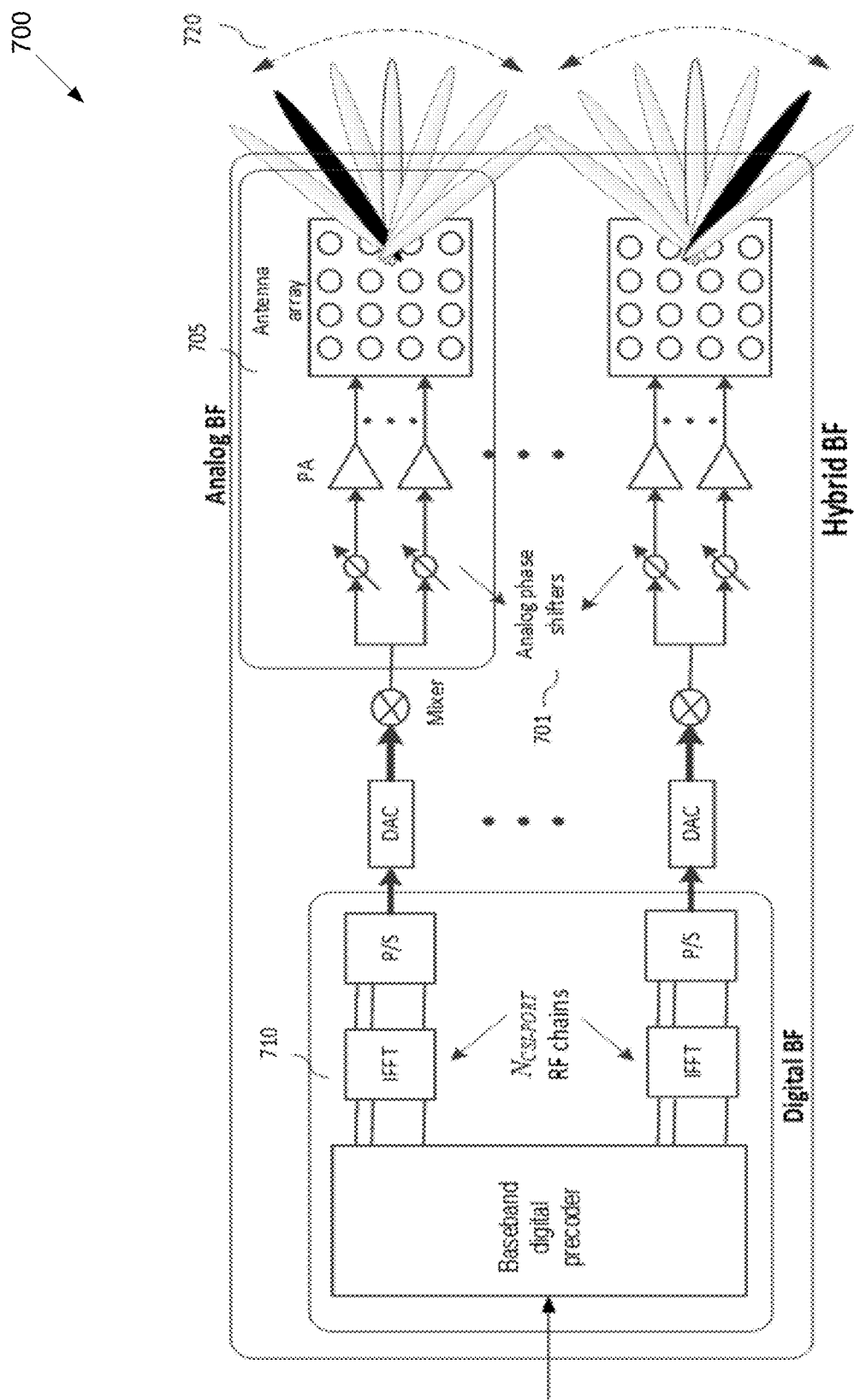
FIG. 7 illustrates an example of antenna structure according to embodiments of the present disclosure.

FIG. 7 illustrates an example antenna structure 700 according to embodiments of the present disclosure. An embodiment of the antenna structure 700 shown in FIG. 7 is for illustration only.

In this case, one CSI-RS port is mapped onto a large number of antenna elements which can be controlled by a bank of analog phase shifters 701. One CSI-RS port can then correspond to one sub-array which produces a narrow analog beam through analog beamforming 705. This analog beam can be configured to sweep across a wider range of angles 720 by varying the phase shifter bank across symbols or subframes. The number of sub-arrays (equal to the number of RF chains) is the same as the number of CSI-RS ports $N_{CSI-PORT}$. A digital beamforming unit 710 performs a linear combination across $N_{CSI-PORT}$ analog beams to further increase precoding gain. While analog beams are wideband (hence not frequency-selective), digital precoding can be varied across frequency sub-bands or resource blocks. Receiver operation can be conceived analogously.

Since the aforementioned system utilizes multiple analog beams for transmission and reception (wherein one or a small number of analog beams are selected out of a large number, for instance, after a training duration—to be performed from time to time), the term "multi-beam operation" is used to refer to the overall system aspect. This includes, for the purpose of illustration, indicating the assigned DL or UL TX beam (also termed "beam indication"), measuring at least one reference signal for calculating and performing beam reporting (also termed "beam measurement" and "beam reporting," respectively), and receiving a DL or UL transmission via a selection of a corresponding RX beam.

The aforementioned system is also applicable to higher frequency bands such as >52.6 GHz. In this case, the system can employ only analog beams. Due to the O2 absorption loss around 60 GHz frequency (~10 dB additional loss @100 m distance), larger number of and sharper analog beams (hence larger number of radiators in the array) may be needed to compensate for the additional path loss.

Rel-17 introduced the unified TCI framework, where a unified or master or main or indicated TCI state is signaled or indicated to the UE also referred to as an indicated TCI state. The unified or master or main or indicated TCI state can be one of: (1) in case of joint TCI state indication, wherein a same beam is used for DL and UL channels, a joint TCI state that can be used at least for UE-dedicated DL channels and UE-dedicated UL channels; (2) in case of separate TCI state indication, wherein different beams are used for DL and UL channels, a DL TCI state that can be used at least for UE-dedicated DL channels; and (3) in case of separate TCI state indication, wherein different beams are used for DL and UL channels, a UL TCI state that can be used at least for UE-dedicated UL channels.

The unified (master or main or indicated) TCI state is TCI state of UE-dedicated reception on PDSCH/PDCCH or dynamic-grant/configured-grant based PUSCH and all of dedicated PUCCH resources.

The unified TCI framework applies to intra-cell beam management, wherein, the TCI states have a source RS that is directly or indirectly associated, through a quasi-co-location relation, e.g., spatial relation, with an SSB of a serving cell. The unified TCI state framework also applies to inter-cell beam management, wherein a TCI state can have a source RS that is directly or indirectly associated, through a quasi-co-location relation, e.g., spatial relation, with an SSB of cell that has a PCI different from the PCI of the serving cell.

A quasi-co-location (QCL) relation can be quasi-location with respect to one or more of the following relations (e.g., 3GPP standard specification TS 38.214): (1) Type A, {Doppler shift, Doppler spread, average delay, delay spread}; (2) Type B, {Doppler shift, Doppler spread}; (3) Type C, {Doppler shift, average delay}; and (4) Type D, {Spatial Rx parameter}.

In addition, quasi-co-location relation can also provide a spatial relation for UL channels, e.g., a DL source reference signal provides information on the spatial domain filter to be used for UL transmissions, or the UL source reference signal provides the spatial domain filter to be used for UL transmissions, e.g., same spatial domain filter for UL source reference signal and UL transmissions.

The unified (master or main or indicated) TCI state applies at least to UE dedicated DL and UL channels. The unified (master or main or indicated) TCI can also apply to other DL and/or UL channels and/or signals e.g., non-UE dedicated channel and sounding reference signal (SRS).

NR provides support for cross carrier scheduling, wherein a DCI format in a first carrier includes a DL scheduling assignment, for DL related DCI formats (e.g., DCI format 1_1 or DCI format 1_2) or an UL scheduling grant, for UL related DCI formats (e.g., DCI format 0_1 or DCI format 0_2) for a second carrier. In the present disclosure methods are provided for beam indication for a second carrier (cell or BWP) when a cross carrier scheduling is configured.

In release 15/16 a common framework is shared for CSI and beam management, while the complexity of such framework is justified for CSI in a frequency range 1 (FR1), it makes beam management procedures rather cumbersome, and less efficient in FR2. Efficiency here refers to overhead associated with beam management operations and latency for reporting and indicating new beams.

Furthermore, in release 15 and release 16, the beam management framework is different for different channels. This increases the overhead of beam management, and could lead to less robust beam-based operation. For example, for PDCCH the TCI state (used for beam indication), is updated through MAC CE signaling. While the TCI state of PDSCH can be updated through a DL DCI carrying the DL assignment with codepoints configured by MAC CE, or the PDSCH TCI state can follow that of the corresponding PDCCH, or use a default beam indication. In the uplink direction, the spatialRelationInfo framework is used for beam indication for PUCCH and SRS, which is updated through RRC and MAC CE signaling. For PUSCH the SRI (SRS Resource Indicator), in an UL DCI with UL grants, can be used for beam indication. Having different beam indications and beam indication update mechanisms increases the complexity, overhead and latency of beam management, and could lead to less robust beam-based operation.

Rel-17 introduced the unified TCI framework, wherein a unified or master or main or indicated TCI state is signaled to the UE. RRC signaling configures Rel-17 TCI states (e.g., TCI states provided by higher layer parameter dl-OrJoint-TCIStateList in PDSCH-Config or provided by higher layer parameter TCI-UL-State in BWP-UplinkDedicated). MAC signaling can activate one or more TCI codepoints. When one TCI state codepoint is activated by MAC CE, the UE applies the TCI state(s) associated with the activated codepoint after a beam application time. When more than one TCI codepoints are activated by MAC CE, further DCI signaling is used to indicate a TCI state codepoint to the UE. The unified TCI state can be signaled by a DCI format (e.g., DL related DCI format (e.g., DCI format 1_1 or DCI format 1_2) with a DL assignment or a DL related DCI format (e.g., DCI format 1_1 or DCI format 1_2) without a DL assignment.

NR provides support for cross carrier scheduling, wherein a DCI format in a first carrier includes a DL scheduling assignment, for DL related DCI formats (e.g., DCI format 1_1 or DCI format 1_2) or an UL scheduling grant, for UL related DCI formats (e.g., DCI format 0_1 or DCI format 0_2) for a second carrier. In the present disclosure, some methods for extending the unified beam indication framework, for beam indication for a second carrier (cell or BWP) when cross carrier scheduling is configured, are provided.

The present disclosure relates to a 5G/NR communication system.

The present disclosure provides design aspects related to extension of TCI state framework developed for the unified TCI state indication in Rel-17 to beam indication for cross carrier scheduling.

In the following, both FDD and TDD are considered as a duplex method for DL and UL signaling.

Although exemplary descriptions and embodiments to follow assume orthogonal frequency division multiplexing (OFDM) or orthogonal frequency division multiple access (OFDMA), the present disclosure can be extended to other OFDM-based transmission waveforms or multiple access schemes such as filtered OFDM (F-OFDM).

The present disclosure provides several components that can be used in conjunction or in combination with one another, or can operate as standalone schemes.

In the present disclosure, the term "activation" describes an operation wherein a UE receives and decodes a signal from the network (or gNB) that signifies a starting point in time. The starting point can be a present or a future slot/subframe or symbol and the exact location is either implicitly or explicitly indicated, or is otherwise specified in the system operation or is configured by higher layers. Upon successfully decoding the signal, the UE responds according to an indication provided by the signal. The term "deactivation" describes an operation wherein a UE receives and decodes a signal from the network (or gNB) that signifies a stopping point in time. The stopping point can be a present or a future slot/subframe or symbol and the exact location is either implicitly or explicitly indicated, or is otherwise specified in the system operation or is configured by higher layers. Upon successfully decoding the signal, the UE responds according to an indication provided by the signal.

Terminology such as TCI, TCI states, SpatialRelationInfo, target RS, reference RS, and other terms is used for illustrative purposes and is therefore not normative. Other terms that refer to same functions can also be used.

A "reference RS" corresponds to a set of characteristics of a DL beam or an UL TX beam, such as a direction, a precoding/beamforming, a number of ports, and so on.

In the following components, a TCI state is used for beam indication. A TCI state can refer to a DL TCI state for downlink channels (e.g., PDCCH and PDSCH), an uplink TCI state for uplink channels (e.g., PUSCH or PUCCH), a joint TCI state for downlink and uplink channels, or separate TCI states for uplink and downlink channels. A TCI state can be common across multiple component carriers or can be a separate TCI state for a component carrier or a set of component carriers. A TCI state can be gNB or UE panel specific or common across panels. In some examples, the uplink TCI state can be replaced by SRS resource indicator (SRI).

Figure 8:
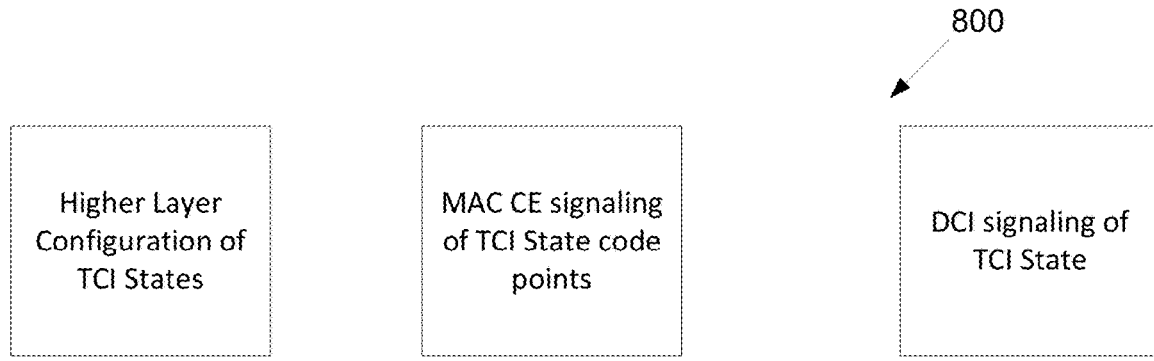
FIG. 8 illustrates an example of TCI state configuration according to embodiments of the present disclosure.

FIG. 8 illustrates an example of TCI state configuration 800 according to embodiments of the present disclosure. An embodiment of the TCI state configuration 800 shown in FIG. 8 is for illustration only.

In the following examples, as illustrated in FIG. 8, a UE is configured/updated through higher layer RRC signaling a set of TCI States with L elements in the set. MAC CE signaling (or activation) includes a subset of K (K≤L) TCI states from the set of L TCI states, wherein each TCI state is associated with a code point of the DCI field used for indication of the TCI state. A codepoint can include one TCI state (e.g., DL TCI state or UL TCI state or Joint (DL and UL) TCI state). Alternatively, a codepoint can include two TCI states (e.g., a DL TCI state and an UL TCI state). L1 control signaling (i.e., Downlink Control Information (DCI)) updates the UE's TCI state, wherein the DCI includes a "transmission configuration indication" (beam indication) field e.g., with m bits (such that K≤2$^m$), the TCI state corresponds to a code point signaled by MAC CE.

A UE is configured with a number of component carriers, CC1, CC2, . . . , CCn. A UE is configured with release 17 TCI states (e.g., TCI states provided by higher layer parameter dl-OrJoint-TCIStateList in PDSCH-Config or provided by higher layer parameter TCI-UL-State in BWP-UplinkDedicated).

The UE can use a DL related DCI (e.g., DCI format 1_1 or DCI format 1_2) without DL assignment, for beam indication. For example, the use of DL related DCI without DL assignment, can be configured by higher layers, or can be specified in the system specification.

Alternatively, the UE can use a DL related DCI (e.g., DCI format 1_1 or DCI format 1_2) with DL assignment, for beam indication. For example, the use of DL related DCI with DL assignment, can be configured by higher layers, or can be specified in the system specification.

In the following examples, if a UE is configured with CrossCarrierSchedulingConfig (or similar parameter) for a serving cell the "carrier indicator" field value in a DCI corresponds to a value indicated by CrossCarrierSchedulingConfig (e.g., the schedulingCellId parameter (or similar parameter) provided by CrossCarrierSchedulingConfig). The configuration of a UE with CrossCarrierSchedulingConfig can be for: (1) a DL related DCI format (e.g., DCI format 1_1 or DCI format 1_2) with DL assignment, wherein the DL related DCI format (e.g., DCI format 1_1 or DCI format 1_2) with DL assignment includes a "carrier indicator" field, the size of the "carrier indicator" field can be provided by CrossCarrierSchedulingConfig (or similar parameter) and/or (2) a DL related DCI format (e.g., DCI format 1_1 or DCI format 1_2) without DL assignment, wherein the DL related DCI format (e.g., DCI format 1_1 or DCI format 1_2) without DL assignment includes a "carrier indicator" field, the size of the "carrier indicator" field can be provided by CrossCarrierSchedulingConfig (or similar parameter).

In some of the following examples, the "transmission configuration indication" provided by a DCI format includes a TCI state codepoint activated by MAC CE. Wherein, the TCI state codepoint can be at least one of: (1) joint TCI state used for UL transmissions and DL receptions by the UE; (2) a DL TCI state used for DL receptions by the UE; (3) a UL TCI state used for UL transmissions by the UE; and (4) a DL TCI state used for DL receptions by the UE and UL TCI states used for UL transmissions by the UE.

Figure 9:
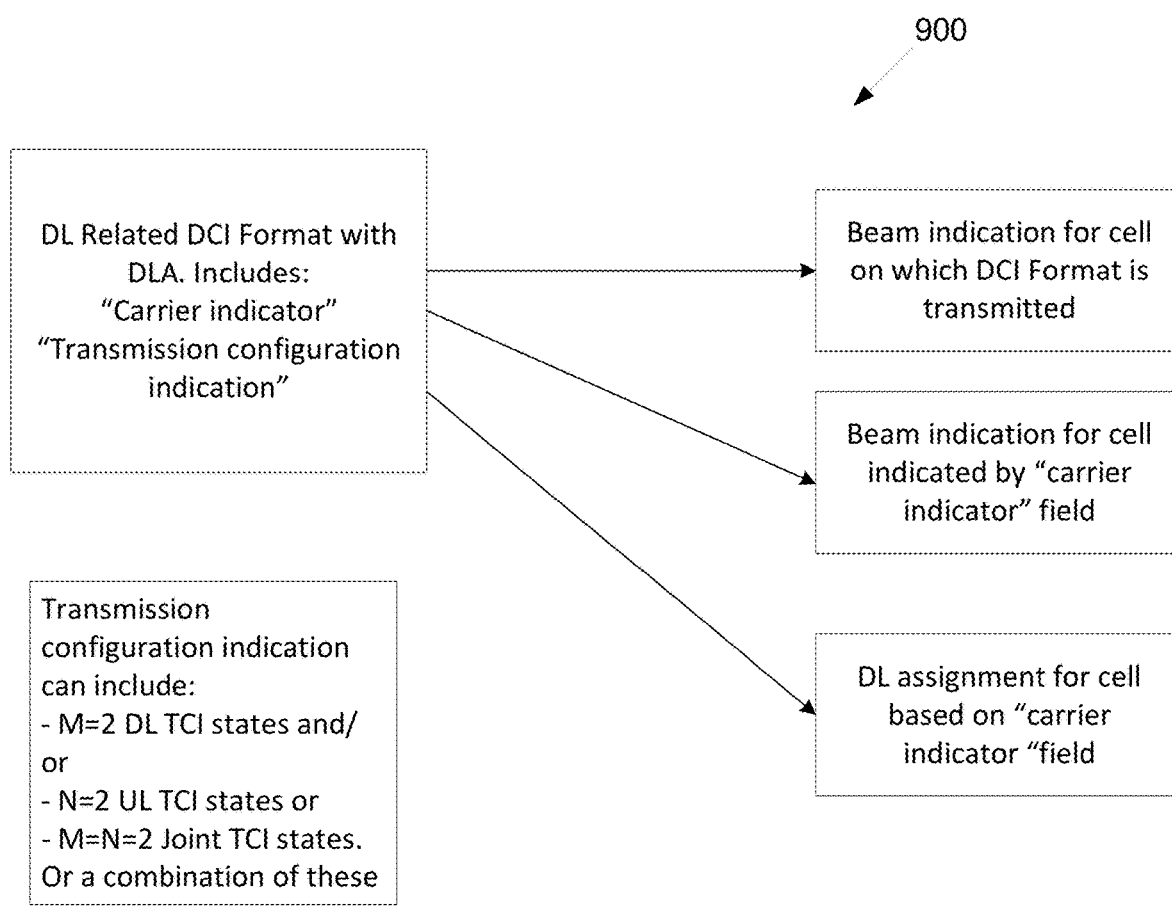
FIG. 9 illustrates an example of DL related DCI format according to embodiments of the present disclosure.

FIG. 9 illustrates an example of DL related DCI format 900 according to embodiments of the present disclosure. An embodiment of the DL related DCI format 900 shown in FIG. 9 is for illustration only.

In one example, as illustrated in FIG. 9, a DL related DCI format (e.g., DCI format 1_1 or DCI format 1_2) with DL assignment for cross carrier beam indication and cross carrier scheduling is provided. The DCI format includes at least a "carrier indicator" field. The carrier indicator field indicates the carrier for which the DCI format carries a scheduling assignment.

The DCI format includes a "transmission configuration indication" field. The "transmission configuration indication" field carries a codepoint from the codepoints activated by MAC CE. The codepoint can indicate one of examples. In the following examples, M refers to the number indicated DL TCI states, and N refers to the number of indicated UL TCI states.

In one example, a codepoint indicates 2 DL TCI states (M=2). Wherein, a first DL TCI state is for carrier (or cell or BWP) on which the DCI format is transmitted. The second DL TCI state is for a carrier (or cell or BWP) indicated by the "carrier indicator" field.

In one example, a codepoint indicates 2 UL TCI states (N=2). Wherein, a first UL TCI state is for carrier (or cell or BWP) on which the DCI format is transmitted. The second UL TCI state is for a carrier (or cell or BWP) indicated by the "carrier indicator" field.

In one example, a codepoint indicates 2 joint TCI states (M=2 and N=2). Wherein, a first joint TCI state is for carrier (or cell or BWP) on which the DCI format is transmitted. The second joint TCI state is for a carrier (or cell or BWP) indicated by the "carrier indicator" field.

In other examples, a codepoint indicates separate UL and DL TCI states as shown in below examples.

In one example, M=2 and N=1 (separate DL TCI state for each carrier (or cell or BWP) and common or one UL TCI state). Wherein, a first DL TCI state is for carrier (or cell or BWP) on which the DCI format is transmitted. The second DL TCI state is for a carrier (or cell or BWP) indicated by the "carrier indicator" field. For UL TCI state, one of the following: (1) a common UL TCI state or TCI state ID for carrier (or cell or BWP) on which the DCI format is transmitted and for a carrier (or cell or BWP) indicated by the "carrier indicator" field; (2) a UL TCI state for carrier (or cell or BWP) on which the DCI format is transmitted. For example, the carrier (or cell or BWP) indicated by the "carrier indicator" field is a DL only carrier (or cell or BWP); and/or (3) a UL TCI state for a carrier (or cell or BWP) indicated by the "carrier indicator" field. For example, the carrier (or cell or BWP) on which the DCI format is transmitted is a DL only carrier (or cell or BWP).

In one example, M=1 and N=2 (separate UL TCI state for each carrier (or cell or BWP) and common or one DL TCI state). Wherein, a first UL TCI state is for carrier (or cell or BWP) on which the DCI format is transmitted. The second UL TCI state is for a carrier (or cell or BWP) indicated by the "carrier indicator" field. For DL TCI state, one of the following: (1) a common DL TCI state or TCI state ID for carrier (or cell or BWP) on which the DCI format is transmitted and for a carrier (or cell or BWP) indicated by the "carrier indicator" field; (2) a DL TCI state for carrier (or cell or BWP) on which the DCI format is transmitted. For example, the carrier (or cell or BWP) indicated by the "carrier indicator" field is a UL only carrier (or cell or BWP); and/or (3) a DL TCI state for a carrier (or cell or BWP) indicated by the "carrier indicator" field.

In one example, M=2 and N=2 (separate DL TCI state for each carrier (or cell or BWP) separate UL TCI state for each carrier (or cell or BWP)). Wherein, a first DL TCI state is for carrier (or cell or BWP) on which the DCI format is transmitted. The second DL TCI state is for a carrier (or cell or BWP) indicated by the "carrier indicator" field. The first UL TCI state is for carrier (or cell or BWP) on which the DCI format is transmitted. The second UL TCI state is for a carrier (or cell or BWP) indicated by the "carrier indicator" field.

In other examples, a codepoint indicates a combination of joint and separate TCI states as shown in following examples.

In one example of 1 joint TCI state and 1 DL TCI state: (1) the joint TCI state is for carrier (or cell or BWP) on which the DCI format is transmitted. The DL TCI state is for a carrier (or cell or BWP) indicated by the "carrier indicator" field; and/or (2) the joint TCI state is a carrier (or cell or BWP) indicated by the "carrier indicator" field. The DL TCI state is for carrier (or cell or BWP) on which the DCI format is transmitted.

In one example of 1 joint TCI state and 1 UL TCI state: (1) the joint TCI state is for carrier (or cell or BWP) on which the DCI format is transmitted. The UL TCI state is for a carrier (or cell or BWP) indicated by the "carrier indicator" field; and/or (2) the joint TCI state is a carrier (or cell or BWP) indicated by the "carrier indicator" field. The UL TCI state is for carrier (or cell or BWP) on which the DCI format is transmitted.

In one example of 1 joint TCI state, 1 DL TCI state, and 1 UL TCI state: (1) the joint TCI state is for carrier (or cell or BWP) on which the DCI format is transmitted. The separate DL TCI state and UL TCI state are for a carrier (or cell or BWP) indicated by the "carrier indicator" field; and/or (2) the joint TCI state is a carrier (or cell or BWP) indicated by the "carrier indicator" field. The separate DL TCI state and UL TCI state are for carrier (or cell or BWP) on which the DCI format is transmitted.

If the "carrier indicator" field points to the carrier (or cell or BWP) on which the DCI format is transmitted. One of the following: (1) the codepoint includes M=1 DL TCI state and/or N=1 UL TCI State or M=N=1 joint TCI state; or (2) if the codepoint has M=2 DL TCI states and/or N=2 UL TCI states or M=N=2 joint TCI states. The second TCI state is ignored.

Figure 10:
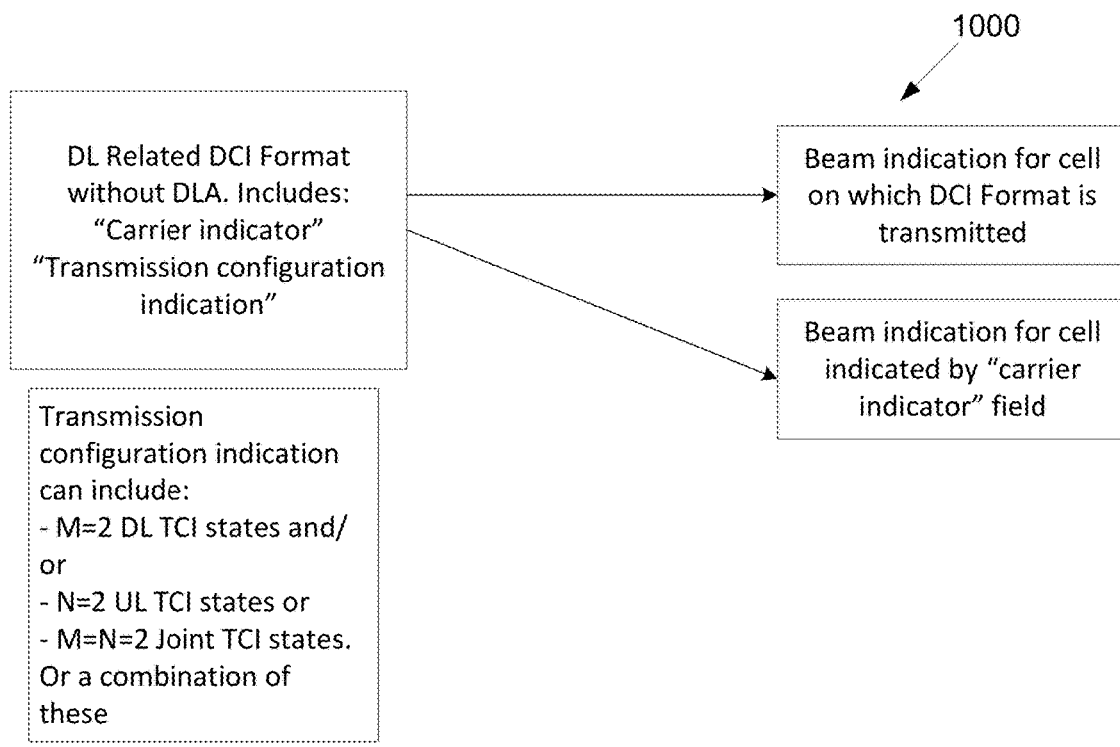
FIG. 10 illustrates another example of DL related DCI format according to embodiments of the present disclosure.

FIG. 10 illustrates another example of DL related DCI format 1000 according to embodiments of the present disclosure. An embodiment of the DL related DCI format 1000 shown in FIG. 10 is for illustration only.

In another example, as illustrated in FIG. 10, configure DL Related DCI format (e.g., DCI format 1_1 or DCI format 1_2) without DL assignment for cross carrier beam indication. The DCI format includes at least a "carrier indicator" field. The carrier indicator field indicates the carrier for which the DCI format carries a beam indication.

The DCI format includes a "transmission configuration indication" field. The "transmission configuration indication" field carries a codepoint from the codepoints activated by MAC CE. The codepoint can indicate one of following examples.

In one example, a codepoint indicates 2 DL TCI states (M=2). Wherein, a first DL TCI state is for carrier (or cell or BWP) on which the DCI format is transmitted. The second DL TCI state is for a carrier (or cell or BWP) indicated by the "carrier indicator" field.

In one example, a codepoint indicates 2 UL TCI states (N=2). Wherein, a first UL TCI state is for carrier (or cell or BWP) on which the DCI format is transmitted. The second UL TCI state is for a carrier (or cell or BWP) indicated by the "carrier indicator" field.

In one example, a codepoint indicates 2 joint TCI states (M=2 and N=2). Wherein, a first joint TCI state is for carrier (or cell or BWP) on which the DCI format is transmitted. The second joint TCI state is for a carrier (or cell or BWP) indicated by the "carrier indicator" field.

In one other examples, a codepoint indicates separate UL and DL TCI states as shown in following examples.

In one example, M=2 and N=1 (separate DL TCI state for each carrier (or cell or BWP) and common or one UL TCI state). Wherein, a first DL TCI state is for carrier (or cell or BWP) on which the DCI format is transmitted. The second DL TCI state is for a carrier (or cell or BWP) indicated by the "carrier indicator" field. For UL TCI state, one of the following: (1) a common UL TCI state or TCI state ID for carrier (or cell or BWP) on which the DCI format is transmitted and for a carrier (or cell or BWP) indicated by the "carrier indicator" field; (2) a UL TCI state for carrier (or cell or BWP) on which the DCI format is transmitted. For example, the carrier (or cell or BWP) indicated by the "carrier indicator" field is a DL only carrier (or cell or BWP); or (3) a UL TCI state for a carrier (or cell or BWP) indicated by the "carrier indicator" field. For example, the carrier (or cell or BWP) on which the DCI format is transmitted is a DL only carrier (or cell or BWP).

In one example, M=1 and N=2 (separate UL TCI state for each carrier (or cell or BWP) and common or one DL TCI state). Wherein, a first UL TCI state is for carrier (or cell or BWP) on which the DCI format is transmitted. The second UL TCI state is for a carrier (or cell or BWP) indicated by the "carrier indicator" field. For DL TCI state, one of the following: (1) a common DL TCI state or TCI state ID for carrier (or cell or BWP) on which the DCI format is transmitted and for a carrier (or cell or BWP) indicated by the "carrier indicator" field; (2) a DL TCI state for carrier (or cell or BWP) on which the DCI format is transmitted. For example, the carrier (or cell or BWP) indicated by the "carrier indicator" field is a UL only carrier (or cell or BWP); or (3) a DL TCI state for a carrier (or cell or BWP) indicated by the "carrier indicator" field.

In one example, M=2 and N=2 (separate DL TCI state for each carrier (or cell or BWP) separate UL TCI state for each carrier (or cell or BWP)). Wherein, a first DL TCI state is for carrier (or cell or BWP) on which the DCI format is transmitted. The second DL TCI state is for a carrier (or cell or BWP) indicated by the "carrier indicator" field. The first UL TCI state is for carrier (or cell or BWP) on which the DCI format is transmitted. The second UL TCI state is for a carrier (or cell or BWP) indicated by the "carrier indicator" field.

In other examples, a codepoint indicates a combination of joint and separate TCI states as shown in following examples.

In one example of 1 joint TCI state and 1 DL TCI state: (1) the joint TCI state is for carrier (or cell or BWP) on which the DCI format is transmitted. The DL TCI state is for a carrier (or cell or BWP) indicated by the "carrier indicator" field; and/or (2) the joint TCI state is a carrier (or cell or BWP) indicated by the "carrier indicator" field. The DL TCI state is for carrier (or cell or BWP) on which the DCI format is transmitted.

In one example of 1 joint TCI state and 1 UL TCI state: (1) the joint TCI state is for carrier (or cell or BWP) on which the DCI format is transmitted. The UL TCI state is for a carrier (or cell or BWP) indicated by the "carrier indicator" field; and/or (2) the joint TCI state is a carrier (or cell or BWP) indicated by the "carrier indicator" field. The UL TCI state is for carrier (or cell or BWP) on which the DCI format is transmitted.

In one example of 1 joint TCI state, 1 DL TCI state and 1 UL TCI state: (1) the joint TCI state is for carrier (or cell or BWP) on which the DCI format is transmitted. The separate DL TCI state and UL TCI state are for a carrier (or cell or BWP) indicated by the "carrier indicator" field; and/or (2) the joint TCI state is a carrier (or cell or BWP) indicated by the "carrier indicator" field. The separate DL TCI state and UL TCI state are for carrier (or cell or BWP) on which the DCI format is transmitted.

If the "carrier indicator" field points to the carrier (or cell or BWP) on which the DCI format is transmitted. One of the following: (1) the codepoint includes M=1 DL TCI state and/or N=1 UL TCI State or M=N=1 joint TCI state; or (2) if the codepoint has M=2 DL TCI states and/or N=2 UL TCI states or M=N=2 joint TCI states. The second TCI state is ignored.

Figure 11:
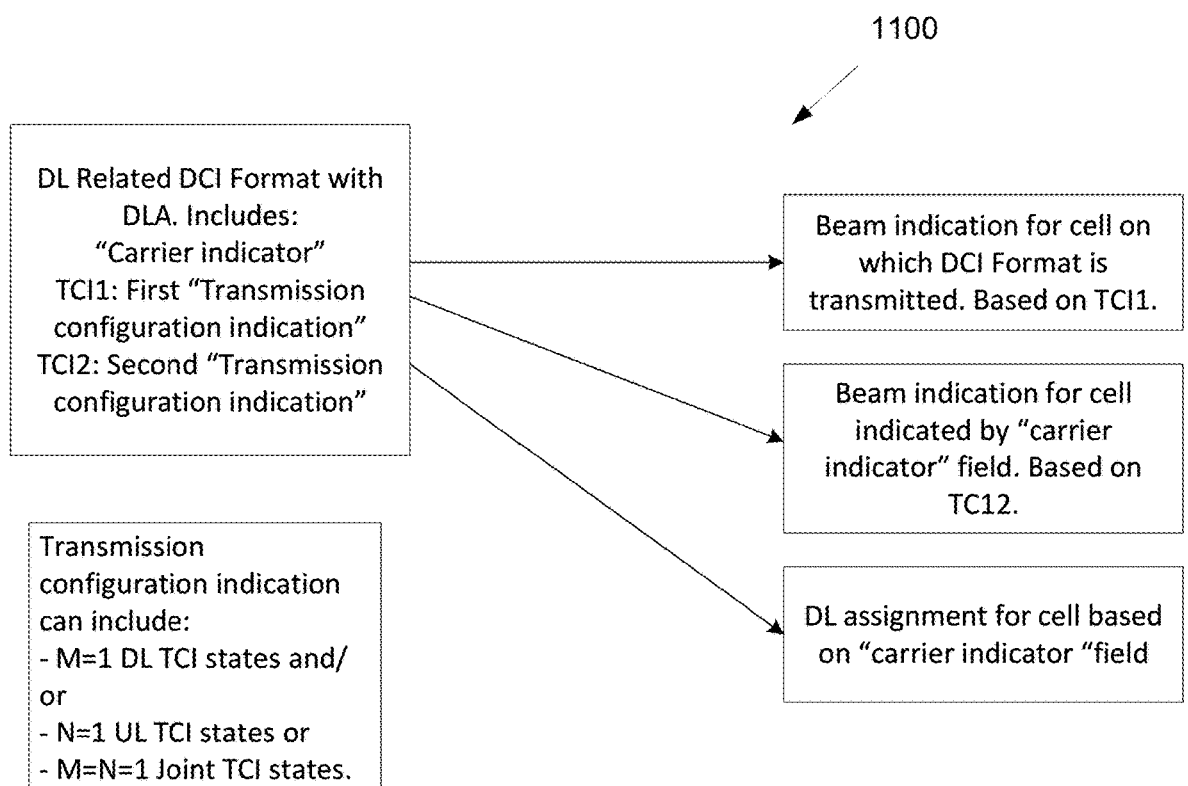
FIG. 11 illustrates yet another example of DL related DCI format according to embodiments of the present disclosure.

FIG. 11 illustrates yet another example of DL related DCI format 1100 according to embodiments of the present disclosure. An embodiment of the DL related DCI format 1100 shown in FIG. 11 is for illustration only.

In another example, as illustrated in FIG. 11, DL related DCI format (e.g., DCI format 1_1 or DCI format 1_2) with DL assignment for cross carrier beam indication and cross carrier scheduling is provided. The DCI format includes at least a "carrier indicator" field. The carrier indicator field indicates the carrier for which the DCI format carries a scheduling assignment.

In one example, MAC CE activates a first set of TCI state code points for a first "transmission configuration indication" field TCI1, and a second set of TCI state code points for a second "transmission configuration indication" field TCI2.

In one example, MAC CE activates a set of TCI state code points that can be used for a first "transmission configuration indication" field TCI1, and a second "transmission configuration indication" field TCI2.

The DCI format includes a first "transmission configuration indication" field TCI1. The first "transmission configuration indication" field carries a codepoint from the codepoints activated by MAC CE. The codepoint can indicate one of following examples.

In one example, a codepoint indicates 1 DL TCI states (M=1). Wherein, the DL TCI state is for carrier (or cell or BWP) on which the DCI format is transmitted.

In one example, a codepoint indicates 1 UL TCI states (N=1). Wherein, the UL TCI state is for carrier (or cell or BWP) on which the DCI format is transmitted.

In one example, a codepoint indicates 1 joint TCI states (M=1 and N=1). Wherein, the joint TCI state is for carrier (or cell or BWP) on which the DCI format is transmitted.

In one example, a codepoint indicates separate UL and DL TCI states (M=1 and N=1). Wherein, the DL TCI state is for carrier (or cell or BWP) on which the DCI format is transmitted. The UL TCI state is for carrier (or cell or BWP) on which the DCI format is transmitted.

The DCI format includes a second "transmission configuration indication" field TCI2. The second "transmission configuration indication" field carries a codepoint from the codepoints activated by MAC CE. The codepoint can indicate one of: (1) a codepoint indicates 1 DL TCI states (M=1). Wherein, the DL TCI state is for a carrier (or cell or BWP) indicated by the "carrier indicator" field; (2) a codepoint indicates 1 UL TCI states (N=1). Wherein, the UL TCI state is for a carrier (or cell or BWP) indicated by the "carrier indicator" field; (3) a codepoint indicates 1 joint TCI states (M=1 and N=1). Wherein, the joint TCI state is for a carrier (or cell or BWP) indicated by the "carrier indicator" field; or (4) a codepoint indicates separate UL and DL TCI states (M=1 and N=1). Wherein, the DL TCI state is for a carrier (or cell or BWP) indicated by the "carrier indicator" field. The UL TCI state is for a carrier (or cell or BWP) indicated by the "carrier indicator" field.

If the "carrier indicator" field points to the carrier (or cell or BWP) on which the DCI format is transmitted. One of the following: (1) the second "transmission configuration indication" is reserved or ignored by the UE; or (2) the UE expects that the second "transmission configuration indication" is set to the same value as the first "transmission configuration indication."

Figure 12:
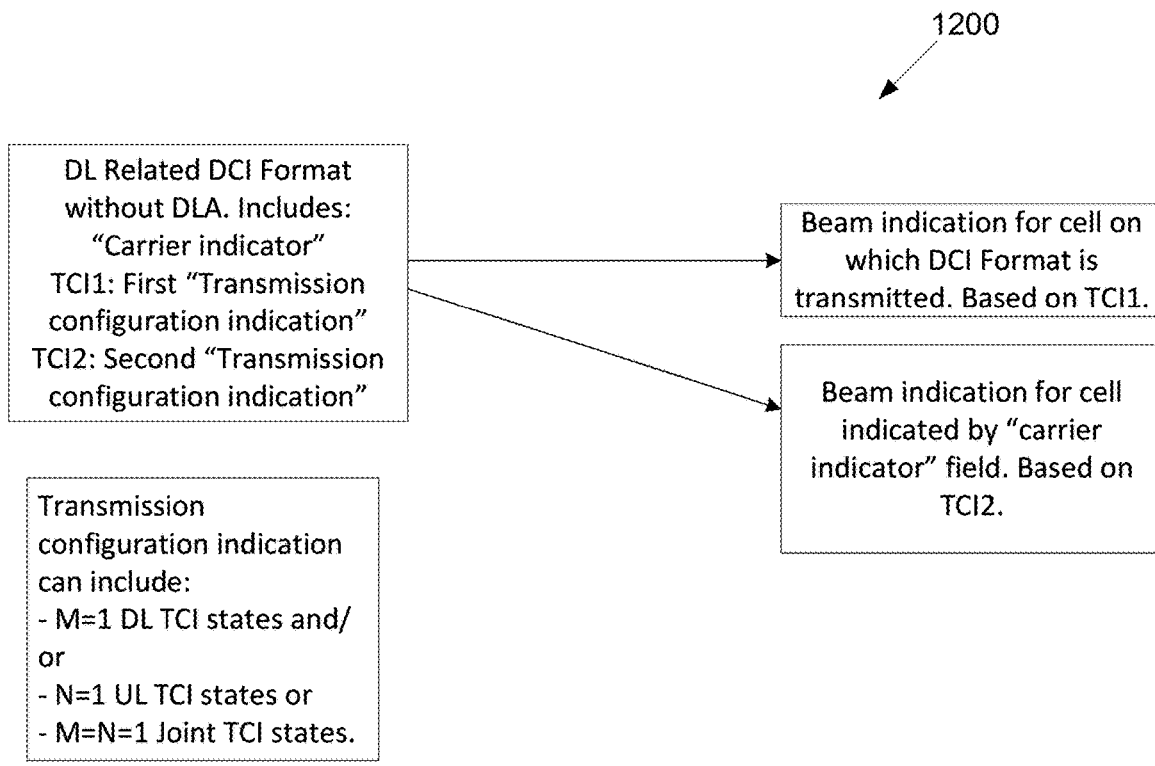
FIG. 12 illustrates yet another example of DL related DCI format according to embodiments of the present disclosure.

FIG. 12 illustrates yet another example of DL related DCI format 1200 according to embodiments of the present disclosure. An embodiment of the DL related DCI format 1200 shown in FIG. 12 is for illustration only.

In another example, as illustrated in FIG. 12, configure DL Related DCI format (e.g., DCI format 1_1 or DCI format 1_2) without DL assignment for cross carrier beam indication. The DCI format includes at least a "carrier indicator" field. The carrier indicator field indicates the carrier for which the DCI format carries a beam indication.

In one example, MAC CE activates a first set of TCI state code points for a first "transmission configuration indication" field TCI1, and a second set of TCI state code points for a second "transmission configuration indication" field TCI2.

In one example, MAC CE activates a set of TCI state code points that can be used for a first "transmission configuration indication" field TCI1, and a second "transmission configuration indication" field TCI2.

The DCI format includes a first "transmission configuration indication" field TCI1. The first "transmission configuration indication" field carries a codepoint from the codepoints activated by MAC CE. The codepoint can indicate one of: (1) a codepoint indicates 1 DL TCI states (M=1). Wherein, the DL TCI state is for carrier (or cell or BWP) on which the DCI format is transmitted; (2) a codepoint indicates 1 UL TCI states (N=1). Wherein, the UL TCI state is for carrier (or cell or BWP) on which the DCI format is transmitted; (3) a codepoint indicates 1 joint TCI states (M=1 and N=1). Wherein, the joint TCI state is for carrier (or cell or BWP) on which the DCI format is transmitted; or (4) a codepoint indicates separate UL and DL TCI states (M=1 and N=1). Wherein, the DL TCI state is for carrier (or cell or BWP) on which the DCI format is transmitted. The UL TCI state is for carrier (or cell or BWP) on which the DCI format is transmitted.

The DCI format includes a second "transmission configuration indication" field TCI2. The second "transmission configuration indication" field carries a codepoint from the codepoints activated by MAC CE. The codepoint can indicate one of: (1) a codepoint indicates 1 DL TCI states (M=1). Wherein, the DL TCI state is for a carrier (or cell or BWP) indicated by the "carrier indicator" field; (2) a codepoint indicates 1 UL TCI states (N=1). Wherein, the UL TCI state is for a carrier (or cell or BWP) indicated by the "carrier indicator" field; (3) a codepoint indicates 1 joint TCI states (M=1 and N=1). Wherein, the joint TCI state is for a carrier (or cell or BWP) indicated by the "carrier indicator" field; or (4) a codepoint indicates separate UL and DL TCI states (M=1 and N=1). Wherein, the DL TCI state is for a carrier (or cell or BWP) indicated by the "carrier indicator" field. The UL TCI state is for a carrier (or cell or BWP) indicated by the "carrier indicator" field.

If the "carrier indicator" field points to the carrier (or cell or BWP) on which the DCI format is transmitted. One of the following: (1) the second "transmission configuration indication" is reserved or ignored by the UE; or (2) the UE expects that the second "transmission configuration indication" is set to the same value as the first "transmission configuration indication."

Figure 13:
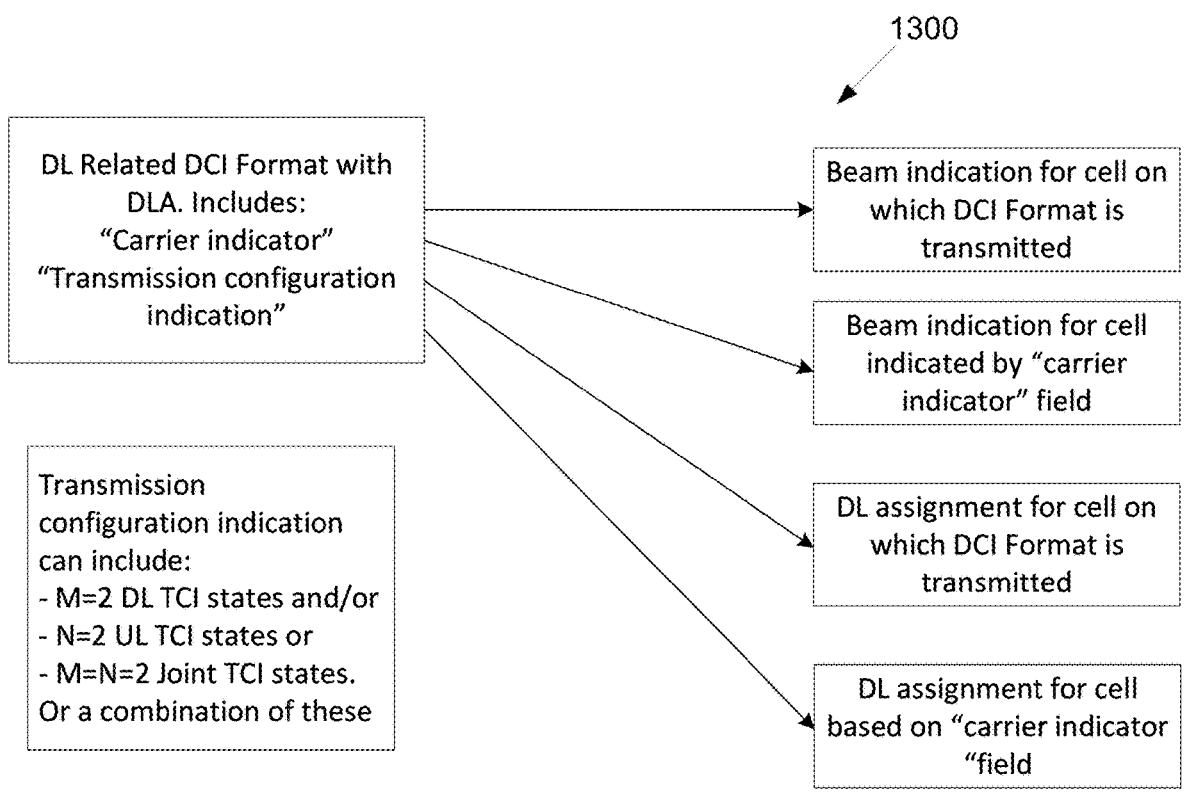
FIG. 13 illustrates yet another example of DL related DCI format according to embodiments of the present disclosure.

FIG. 13 illustrates yet another example of DL related DCI format 1300 according to embodiments of the present disclosure. An embodiment of the DL related DCI format 1300 shown in FIG. 13 is for illustration only.

In another example, as illustrated in FIG. 13, a DL related DCI format (e.g., DCI format 1_1 or DCI format 1_2) with DL assignment for cross carrier beam indication and cross carrier scheduling is provided, wherein the DCI format includes a DL assignment for own (self) carrier (or cell or BWP), as well as a DL assignment for other carrier (or cell or BWP) based on the "carrier indicator" field. The DCI format includes at least a "carrier indicator" field. The carrier indicator field indicates the carrier for which the DCI format carries a scheduling assignment.

The DCI format includes a "transmission configuration indication" field. The "transmission configuration indication" field carries a codepoint from the codepoints activated by MAC CE. The codepoint can indicate one of following examples.

In one example, a codepoint indicates 2 DL TCI states (M=2). Wherein, a first DL TCI state is for carrier (or cell or BWP) on which the DCI format is transmitted. The second DL TCI state is for a carrier (or cell or BWP) indicated by the "carrier indicator" field.

In one example, a codepoint indicates 2 UL TCI states (N=2). Wherein, a first UL TCI state is for carrier (or cell or BWP) on which the DCI format is transmitted. The second UL TCI state is for a carrier (or cell or BWP) indicated by the "carrier indicator" field.

In one example, a codepoint indicates 2 joint TCI states (M=2 and N=2). Wherein, a first joint TCI state is for carrier (or cell or BWP) on which the DCI format is transmitted. The second joint TCI state is for a carrier (or cell or BWP) indicated by the "carrier indicator" field.

In other examples, a codepoint indicates separate UL and DL TCI states as shown in following examples.

In one example, M=2 and N=1 (separate DL TCI state for each carrier (or cell or BWP) and common or one UL TCI state). Wherein, a first DL TCI state is for carrier (or cell or BWP) on which the DCI format is transmitted. The second DL TCI state is for a carrier (or cell or BWP) indicated by the "carrier indicator" field. For UL TCI state, one of the following: (1) a common UL TCI state or TCI state ID for carrier (or cell or BWP) on which the DCI format is transmitted and for a carrier (or cell or BWP) indicated by the "carrier indicator" field; (2) a UL TCI state for carrier (or cell or BWP) on which the DCI format is transmitted. For example, the carrier (or cell or BWP) indicated by the "carrier indicator" field is a DL only carrier (or cell or BWP); or (3) a UL TCI state for a carrier (or cell or BWP) indicated by the "carrier indicator" field. For example, the carrier (or cell or BWP) on which the DCI format is transmitted is a DL only carrier (or cell or BWP).

In one example, M=1 and N=2 (separate UL TCI state for each carrier (or cell or BWP) and common or one DL TCI state). Wherein, a first UL TCI state is for carrier (or cell or BWP) on which the DCI format is transmitted. The second UL TCI state is for a carrier (or cell or BWP) indicated by the "carrier indicator" field. For DL TCI state, one of the following: (1) a common DL TCI state or TCI state ID for carrier (or cell or BWP) on which the DCI format is transmitted and for a carrier (or cell or BWP) indicated by the "carrier indicator" field; (2) a DL TCI state for carrier (or cell or BWP) on which the DCI format is transmitted. For example, the carrier (or cell or BWP) indicated by the "carrier indicator" field is a UL only carrier (or cell or BWP); or (3) a DL TCI state for a carrier (or cell or BWP) indicated by the "carrier indicator" field.

In one example, M=2 and N=2 (separate DL TCI state for each carrier (or cell or BWP) separate UL TCI state for each carrier (or cell or BWP)). Wherein, a first DL TCI state is for carrier (or cell or BWP) on which the DCI format is transmitted. The second DL TCI state is for a carrier (or cell or BWP) indicated by the "carrier indicator" field. The first UL TCI state is for carrier (or cell or BWP) on which the DCI format is transmitted. The second UL TCI state is for a carrier (or cell or BWP) indicated by the "carrier indicator" field.

In other examples, a codepoint indicates a combination of joint and separate TCI states as shown in following examples.

In one example of 1 joint TCI state and 1 DL TCI state: (1) the joint TCI state is for carrier (or cell or BWP) on which the DCI format is transmitted. The DL TCI state is for a carrier (or cell or BWP) indicated by the "carrier indicator" field; and/or (2) the joint TCI state is a carrier (or cell or BWP) indicated by the "carrier indicator" field. The DL TCI state is for carrier (or cell or BWP) on which the DCI format is transmitted.

In one example of 1 joint TCI state and 1 UL TCI state: (1) the joint TCI state is for carrier (or cell or BWP) on which the DCI format is transmitted. The UL TCI state is for a carrier (or cell or BWP) indicated by the "carrier indicator" field; and/or (2) the joint TCI state is a carrier (or cell or BWP) indicated by the "carrier indicator" field. The UL TCI state is for carrier (or cell or BWP) on which the DCI format is transmitted.

In one example of 1 joint TCI state, 1 DL TCI state and 1 UL TCI state: (1) the joint TCI state is for carrier (or cell or BWP) on which the DCI format is transmitted. The separate DL TCI state and UL TCI state are for a carrier (or cell or BWP) indicated by the "carrier indicator" field; and/or (2) the joint TCI state is a carrier (or cell or BWP) indicated by the "carrier indicator" field. The separate DL TCI state and UL TCI state are for carrier (or cell or BWP) on which the DCI format is transmitted.

If the "carrier indicator" field points to the carrier (or cell or BWP) on which the DCI format is transmitted. One of the following: (1) the codepoint includes M=1 DL TCI state and/or N=1 UL TCI State or M=N=1 joint TCI state; or (2) if the codepoint has M=2 DL TCI states and/or N=2 UL TCI states or M=N=2 joint TCI states. The second TCI state is ignored.

If the "carrier indicator" field points to the carrier (or cell or BWP) on which the DCI format is transmitted. One of the following: (1) the fields in the DCI format corresponding to the second DL assignment is reserved or ignored by the UE; or (2) the UE expects that the fields in the DCI format corresponding to the second DL assignment are set to the same value as the fields in the DCI format corresponding to the first DL assignment.

Figure 14:
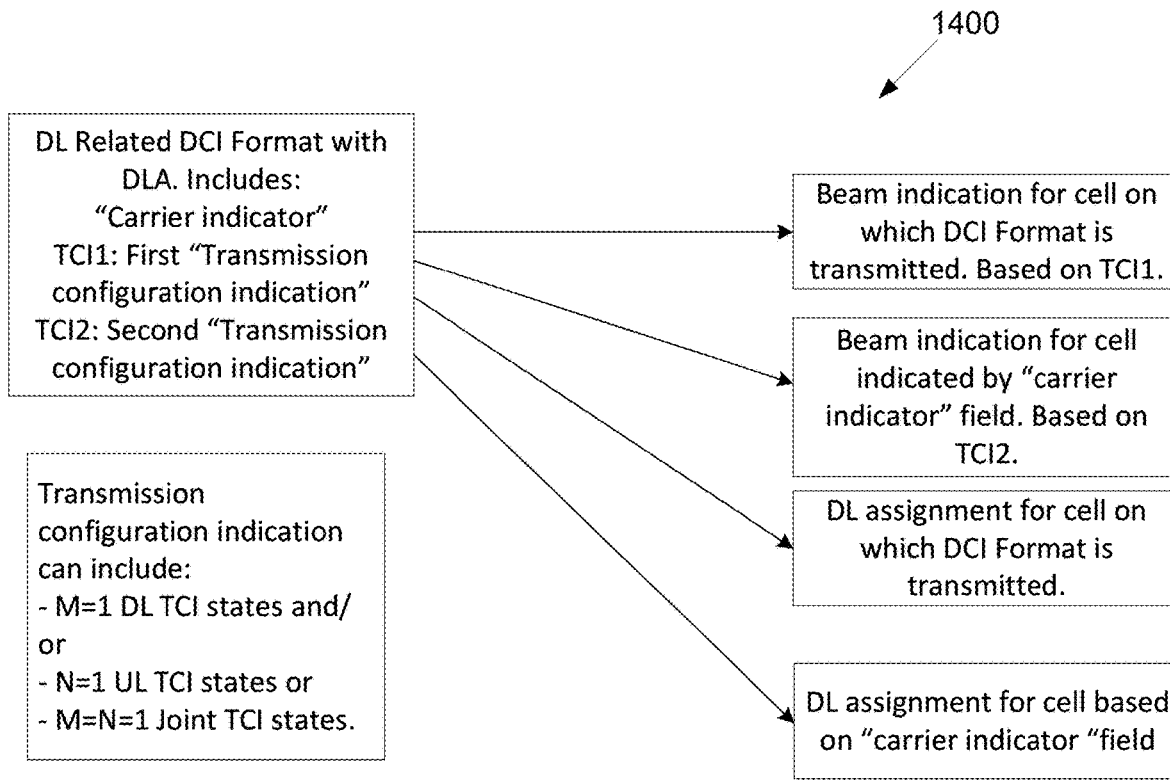
FIG. 14 illustrates yet another example of DL related DCI format according to embodiments of the present disclosure.

FIG. 14 illustrates yet another example of DL related DCI format 1400 according to embodiments of the present disclosure. An embodiment of the DL related DCI format 1400 shown in FIG. 14 is for illustration only.

In another example, as illustrated in FIG. 14, configure DL Related DCI format (e.g., DCI format 1_1 or DCI format 1_2) with DL assignment for cross carrier beam indication and cross carrier scheduling, wherein the DCI format includes a DL assignment for own (self) carrier (or cell or BWP), as well as a DL assignment for other carrier (or cell or BWP) based on the "carrier indicator" field. The DCI format includes at least a "carrier indicator" field. The carrier indicator field indicates the carrier for which the DCI format carries a scheduling assignment.

In one example, MAC CE activates a first set of TCI state code points for a first "transmission configuration indication" field TCI1, and a second set of TCI state code points for a second "transmission configuration indication" field TCI2.

In one example, MAC CE activates a set of TCI state code points that can be used for a first "transmission configuration indication" field TCI1, and a second "transmission configuration indication" field TCI2.

The DCI format includes a first "transmission configuration indication" field TCI1. The first "transmission configuration indication" field carries a codepoint from the codepoints activated by MAC CE. The codepoint can indicate one of: (1) a codepoint indicates 1 DL TCI states (M=1). Wherein, the DL TCI state is for carrier (or cell or BWP) on which the DCI format is transmitted; (2) a codepoint indicates 1 UL TCI states (N=1). Wherein, the UL TCI state is for carrier (or cell or BWP) on which the DCI format is transmitted; (3) a codepoint indicates 1 joint TCI states (M=1 and N=1). Wherein, the joint TCI state is for carrier (or cell or BWP) on which the DCI format is transmitted; or (4) a codepoint indicates separate UL and DL TCI states (M=1 and N=1). Wherein, the DL TCI state is for carrier (or cell or BWP) on which the DCI format is transmitted. The UL TCI state is for carrier (or cell or BWP) on which the DCI format is transmitted.

The DCI format includes a second "transmission configuration indication" field TCI2. The second "transmission configuration indication" field carries a codepoint from the codepoints activated by MAC CE. The codepoint can indicate one of: (1) a codepoint indicates 1 DL TCI states (M=1). Wherein, the DL TCI state is for a carrier (or cell or BWP) indicated by the "carrier indicator" field; (2) a codepoint indicates 1 UL TCI states (N=1). Wherein, the UL TCI state is for a carrier (or cell or BWP) indicated by the "carrier indicator" field; (3) a codepoint indicates 1 joint TCI states (M=1 and N=1). Wherein, the joint TCI state is for a carrier (or cell or BWP) indicated by the "carrier indicator" field; or (4) a codepoint indicates separate UL and DL TCI states (M=1 and N=1). Wherein, the DL TCI state is for a carrier (or cell or BWP) indicated by the "carrier indicator" field. The UL TCI state is for a carrier (or cell or BWP) indicated by the "carrier indicator" field.

If the "carrier indicator" field points to the carrier (or cell or BWP) on which the DCI format is transmitted. One of the following: (1) the second "transmission configuration indication" is reserved or ignored by the UE; or (2) the UE expects that the second "transmission configuration indication" is set to the same value as the first "transmission configuration indication."

If the "carrier indicator" field points to the carrier (or cell or BWP) on which the DCI format is transmitted. One of the following: (1) the fields in the DCI format corresponding to the second DL assignment is reserved or ignored by the UE; or (2) the UE expects that the fields in the DCI format corresponding to the second DL assignment are set to the same value as the fields in the DCI format corresponding to the first DL assignment.

In the examples corresponding to FIGS. 9, 10, 11, 12, 13 and 14, if the carrier (or cell or BWP) on which the DCI format is transmitted is part of a list of carriers that apply the same TCI state ID, the TCI state determined by the indicated TCI state code point for the carrier (or cell or BWP) on which the DCI format is transmitted is applied to all carriers in the list.

the examples corresponding to FIGS. 9, 10, 11, 12, 13 and 14, if the carrier (or cell or BWP) indicated by the "carrier indicator" field is part of a list of carriers that apply the same TCI state ID, the TCI state determined by the indicated TCI state code point for the carrier (or cell or BWP) indicated by the "carrier indicator" field is applied to all carriers in the list.

Figure 15:
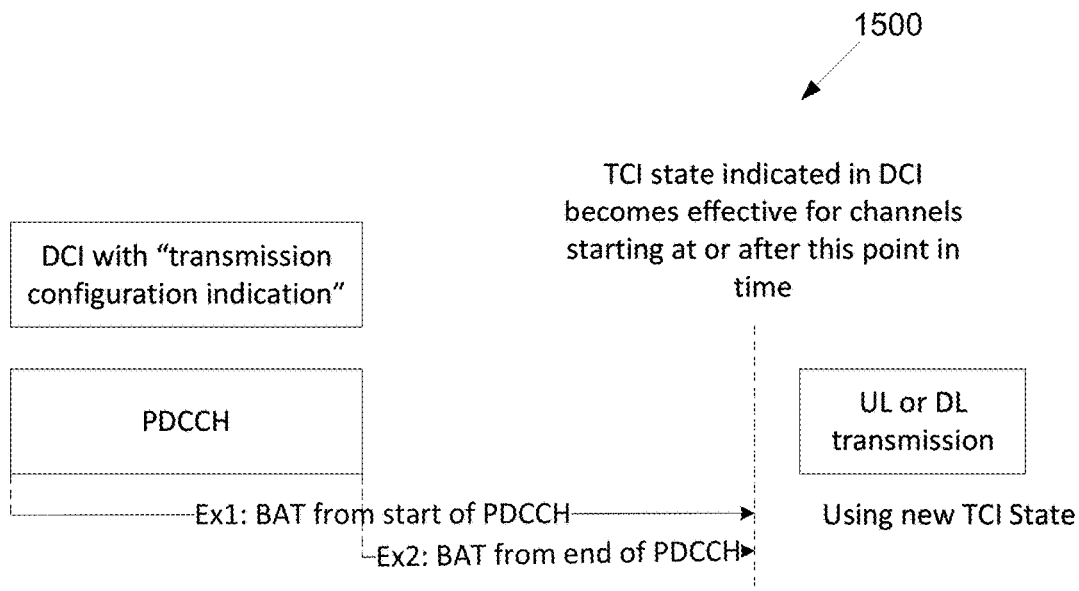
FIG. 15 illustrates an example of cross-carrier beam application time according to embodiments of the present disclosure.

FIG. 15 illustrates an example of cross-carrier beam application time 1500 according to embodiments of the present disclosure. An embodiment of the cross-carrier beam application time 1500 shown in FIG. 15 is for illustration only.

Figure 16:
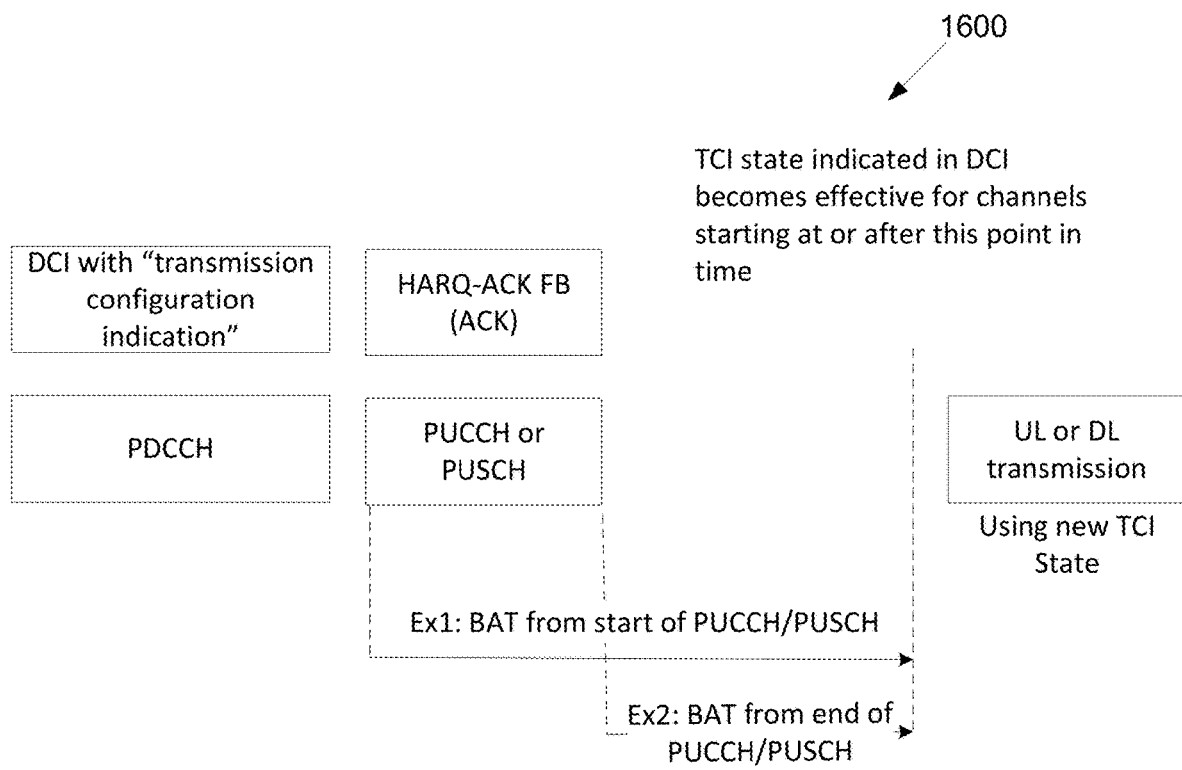
FIG. 16 illustrates another example of cross-carrier beam application time according to embodiments of the present disclosure.

FIG. 16 illustrates another example of cross-carrier beam application time 1600 according to embodiments of the present disclosure. An embodiment of the cross-carrier beam application time 1600 shown in FIG. 16 is for illustration only.

In the following examples, the beam application time can be one of the following: (1) the beam application time (BAT) is the time from a PDCCH (start or end of the PDCCH) containing a DCI format that includes the "transmission configuration indication" (beam indication) field to the first symbol (or slot) at which the new beam corresponding to the "transmission configuration indication" is applied as illustrated in FIG. 15; or (2) the beam application time (BAT) is the time from a channel (start or end of the channel) containing the HARQ-ACK feedback that indicates reception of a DCI format that includes the "transmission configuration indication" (beam indication) field to the first symbol (or slot) at which the new beam corresponding to the "transmission configuration indication" is applied, as illustrated in FIG. 16.

In the diagrams used in the remainder of this disclosure, the beam application time (BAT) is assumed to be from the end of the UL channel containing the HARQ-ACK feedback that indicates reception of a DCI format that includes the "transmission configuration indication" (beam indication) (i.e., Ex2 of FIG. 16). However, this does not limit the scope of the following examples to just this example, Ex1 and Ex2 of FIG. 15, as well as Ex1 of FIG. 16 are also applicable.

Figure 17:
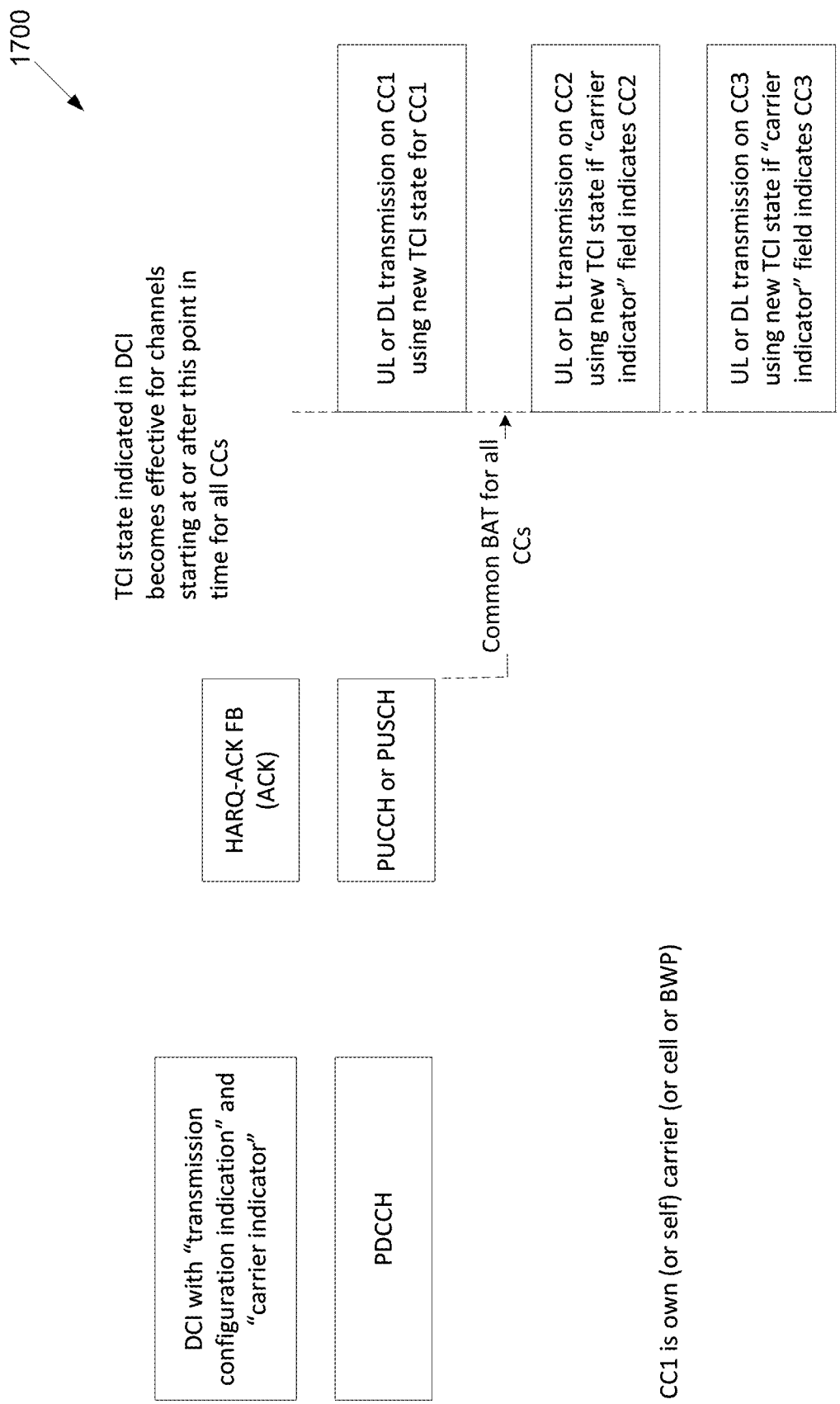
FIG. 17 illustrates yet another example of cross-carrier beam application time according to embodiments of the present disclosure.

FIG. 17 illustrates yet another example of cross-carrier beam application time 1700 according to embodiments of the present disclosure. An embodiment of the cross-carrier beam application time 1700 shown in FIG. 17 is for illustration only.

In one example, as illustrated in FIG. 17, one beam application time is determined for all carriers in case of cross-carrier scheduling and beam indication. Carrier A includes the DCI format that provides "transmission configuration indication" (beam indication) field (e.g., TCI_state_id or TCI state codepoint from the codepoints activated by MAC CE). In addition to carrier A, carriers B1, B2, . . . are carriers that can be indicated by the "carrier indicator" field included in the DCI format transmitted on Carrier A.

The DCI format can be: (1) a DL related DCI format (e.g., DCI format 1_1 or DCI format 1_2) with DL assignment; or (2) a DL related DCI format (e.g., DCI format 1_1 or DCI format 1_2) without DL assignment.

In one example, a beam application time is configured for each carrier (or cell or BWP).

In one example, the beam application time is determined based on the beam application time configured for the carrier (or cell or BWP) with the smallest sub-carrier spacing. The carriers (or cells or BWPs) are determined among the following examples.

In one example, the carriers (or cells or BWPs) that can be indicated by the "carrier indicator" field including the own (or self) carrier (or cell or BWP) being scheduled by the DCI format.

In one example, the carriers (or cells or BWPs) that can be indicated by the "carrier indicator" field including the own (or self) carrier (or cell or BWP) being scheduled by the DCI format as well as the carrier (or cell or BWP) used for the HARQ-ACK feedback of the DCI format that includes the "transmission configuration indication" field.

In one example, the carriers (or cells or BWPs) that can be indicated by the "carrier indicator" field including the own (or self) carrier (or cell or BWP) being scheduled by the DCI format as well as the carrier (or cell or BWP) on which the DCI format that includes the "transmission configuration indication" field is transmitted.

In one example, the carriers (or cells or BWPs) that can be indicated by the "carrier indicator" field including the own (or self) carrier (or cell or BWP) being scheduled by the DCI format as well as the carrier (or cell or BWP) on which the DCI format that includes the "transmission configuration indication" field is transmitted and the carrier (or cell or BWP) used for the HARQ-ACK feedback of the DCI format that includes the "transmission configuration indication" field.

In one example, the beam application time is determined based on the beam application time configured for the carrier (or cell or BWP) with the largest sub-carrier spacing. The carriers (or cells or BWPs) are determined among the following examples.

In one example, the carriers (or cells or BWPs) that can be indicated by the "carrier indicator" field including the own (or self) carrier (or cell or BWP) being scheduled by the DCI format.

In one example, the carriers (or cells or BWPs) that can be indicated by the "carrier indicator" field including the own (or self) carrier (or cell or BWP) being scheduled by the DCI format as well as the carrier (or cell or BWP) used for the HARQ-ACK feedback of the DCI format that includes the "transmission configuration indication" field.

In one example, the carriers (or cells or BWPs) that can be indicated by the "carrier indicator" field including the own (or self) carrier (or cell or BWP) being scheduled by the DCI format as well as the carrier (or cell or BWP) on which the DCI format that includes the "transmission configuration indication" field is transmitted.

In one example, the carriers (or cells or BWPs) that can be indicated by the "carrier indicator" field including the own (or self) carrier (or cell or BWP) being scheduled by the DCI format as well as the carrier (or cell or BWP) on which the DCI format that includes the "transmission configuration indication" field is transmitted and the carrier (or cell or BWP) used for the HARQ-ACK feedback of the DCI format that includes the "transmission configuration indication" field.

In one example, the beam application time is determined based on the largest (or smallest) configured beam application time among one of the following examples.

In one example, the carriers (or cells or BWPs) that can be indicated by the "carrier indicator" field including the own (or self) carrier (or cell or BWP) being scheduled by the DCI format.

In one example, the carriers (or cells or BWPs) that can be indicated by the "carrier indicator" field including the own (or self) carrier (or cell or BWP) being scheduled by the DCI format as well as the carrier (or cell or BWP) used for the HARQ-ACK feedback of the DCI format that includes the "transmission configuration indication" field.

In one example, the carriers (or cells or BWPs) that can be indicated by the "carrier indicator" field including the own (or self) carrier (or cell or BWP) being scheduled by the DCI format as well as the carrier on which the DCI format that includes the "transmission configuration indication" field is transmitted.

In one example, the carriers (or cells or BWPs) that can be indicated by the "carrier indicator" field including the own (or self) carrier (or cell or BWP) being scheduled by the DCI format as well as the carrier (or cell or BWP) on which the DCI format that includes the "transmission configuration indication" field is transmitted and the carrier (or cell or BWP) used for the HARQ-ACK feedback of the DCI format that includes the "transmission configuration indication" field.

Figure 18:
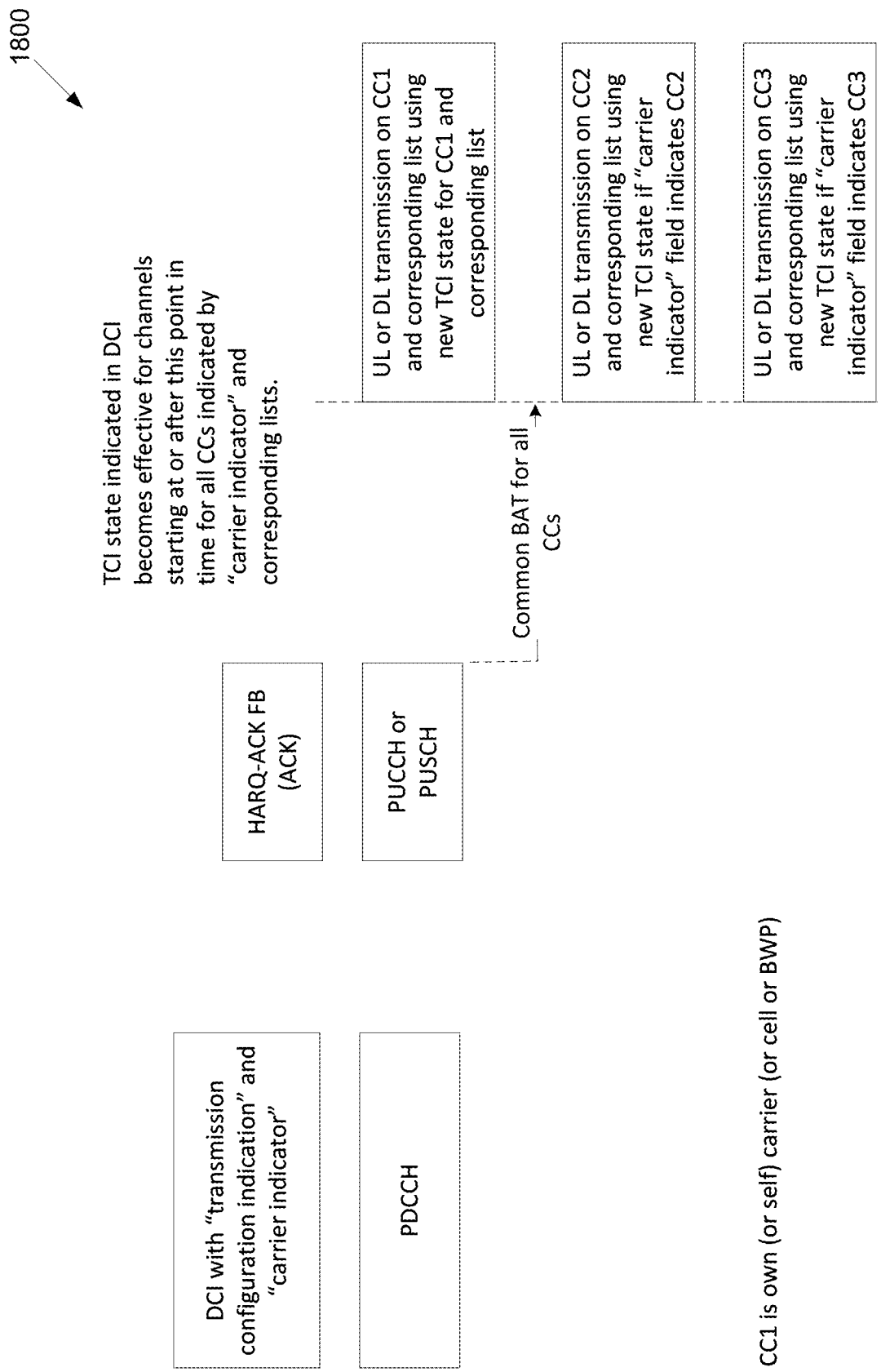
FIG. 18 illustrates yet another example of cross-carrier beam application time according to embodiments of the present disclosure.

FIG. 18 illustrates yet another example of cross-carrier beam application time 1800 according to embodiments of the present disclosure. An embodiment of the cross-carrier beam application time 1800 shown in FIG. 18 is for illustration only.

In another example, as illustrated in FIG. 18, a beam indication applies to a list of carriers (or cells or BWPs), wherein the list of carriers (or cells or BWPs) is configured by higher layer (e.g., RRC) signaling. A common beam application time is determined for all carriers in case of cross-carrier scheduling and beam indication. Carrier A includes the DCI format that provides "transmission configuration indication" (beam indication) field (e.g., TCI_state_id or TCI state codepoint from the codepoints activated by MAC CE). In addition to carrier A, carriers B1, B2, . . . are carriers that can be indicated by the "carrier indicator" field a DCI format transmitted on Carrier A. The indicated carrier (or cell or BWP) is part of a list of carriers (or cells or BWPs), the "transmission configuration indication" applies to all carriers (or cells or BWPs) in the list.

The DCI format can be: (1) a DL related DCI format (e.g., DCI format 1_1 or DCI format 1_2) with DL assignment; and/or (2) a DL related DCI format (e.g., DCI format 1_1 or DCI format 1_2) without DL assignment.

In one example, a beam application time is configured for each carrier (or cell or BWP).

In one example, the beam application time is determined based on the beam application time configured for the carrier (or cell or BWP) with the smallest sub-carrier spacing. The carriers (or cells or BWPs) are determined among the following examples.

In one example, the carriers (or cells or BWPs) that can be indicated by the "carrier indicator" field including the own (or self) carrier (or cell or BWP) being scheduled by the DCI format and corresponding lists of carriers following the same beam.

In one example, the carriers (or cells or BWPs) that can be indicated by the "carrier indicator" field including the own (or self) carrier (or cell or BWP) being scheduled by the DCI format and corresponding lists of carriers following the same beam as well as the carrier (or cell or BWP) used for the HARQ-ACK feedback of the DCI format that includes the "transmission configuration indication" field.

In one example, the carriers (or cells or BWPs) that can be indicated by the "carrier indicator" field including the own (or self) carrier (or cell or BWP) being scheduled by the DCI format and corresponding lists of carriers following the same beam as well as the carrier (or cell or BWP) on which the DCI format that includes the "transmission configuration indication" field is transmitted.

In one example, the carriers (or cells or BWPs) that can be indicated by the "carrier indicator" field including the own (or self) carrier (or cell or BWP) being scheduled by the DCI format and corresponding lists of carriers following the same beam as well as the carrier (or cell or BWP) on which the DCI format that includes the "transmission configuration indication" field is transmitted and the carrier (or cell or BWP) used for the HARQ-ACK feedback of the DCI format that includes the "transmission configuration indication" field.

In one example, the beam application time is determined based on the beam application time configured for the carrier (or cell or BWP) with the largest sub-carrier spacing. The carriers (or cells or BWPs) are determined among the following examples.

In one example, the carriers (or cells or BWPs) that can be indicated by the "carrier indicator" field including the own (or self) carrier (or cell or BWP) being scheduled by the DCI format and corresponding lists of carriers following the same beam.

In one example, the carriers (or cells or BWPs) that can be indicated by the "carrier indicator" field including the own (or self) carrier (or cell or BWP) being scheduled by the DCI format and corresponding lists of carriers following the same beam as well as the carrier (or cell or BWP) used for the HARQ-ACK feedback of the DCI format that includes the "transmission configuration indication" field.

In one example, the carriers (or cells or BWPs) that can be indicated by the "carrier indicator" field including the own (or self) carrier (or cell or BWP) being scheduled by the DCI format and corresponding lists of carriers following the same beam as well as the carrier (or cell or BWP) on which the DCI format that includes the "transmission configuration indication" field is transmitted.

In one example, the carriers (or cells or BWPs) that can be indicated by the "carrier indicator" field including the own (or self) carrier (or cell or BWP) being scheduled by the DCI format and corresponding lists of carriers following the same beam as well as the carrier (or cell or BWP) on which the DCI format that includes the "transmission configuration indication" field is transmitted and the carrier (or cell or BWP) used for the HARQ-ACK feedback of the DCI format that includes the "transmission configuration indication" field.

In one example, the beam application time is determined based on the largest (or smallest) configured beam application time among one of the following examples.

In one example, the carriers (or cells or BWPs) that can be indicated by the "carrier indicator" field including the own (or self) carrier (or cell or BWP) being scheduled by the DCI format and corresponding lists of carriers following the same beam.

In one example, the carriers (or cells or BWPs) that can be indicated by the "carrier indicator" field including the own (or self) carrier (or cell or BWP) being scheduled by the DCI format and corresponding lists of carriers following the same beam as well as the carrier (or cell or BWP) used for the HARQ-ACK feedback of the DCI format that includes the "transmission configuration indication" field.

In one example, the carriers (or cells or BWPs) that can be indicated by the "carrier indicator" field including the own (or self) carrier (or cell or BWP) being scheduled by the DCI format and corresponding lists of carriers following the same beam as well as the carrier on which the DCI format that includes the "transmission configuration indication" field is transmitted.

In one example, the carriers (or cells or BWPs) that can be indicated by the "carrier indicator" field including the own (or self) carrier (or cell or BWP) being scheduled by the DCI format and corresponding lists of carriers following the same beam as well as the carrier (or cell or BWP) on which the DCI format that includes the "transmission configuration indication" field is transmitted and the carrier (or cell or BWP) used for the HARQ-ACK feedback of the DCI format that includes the "transmission configuration indication" field.

Figure 19:
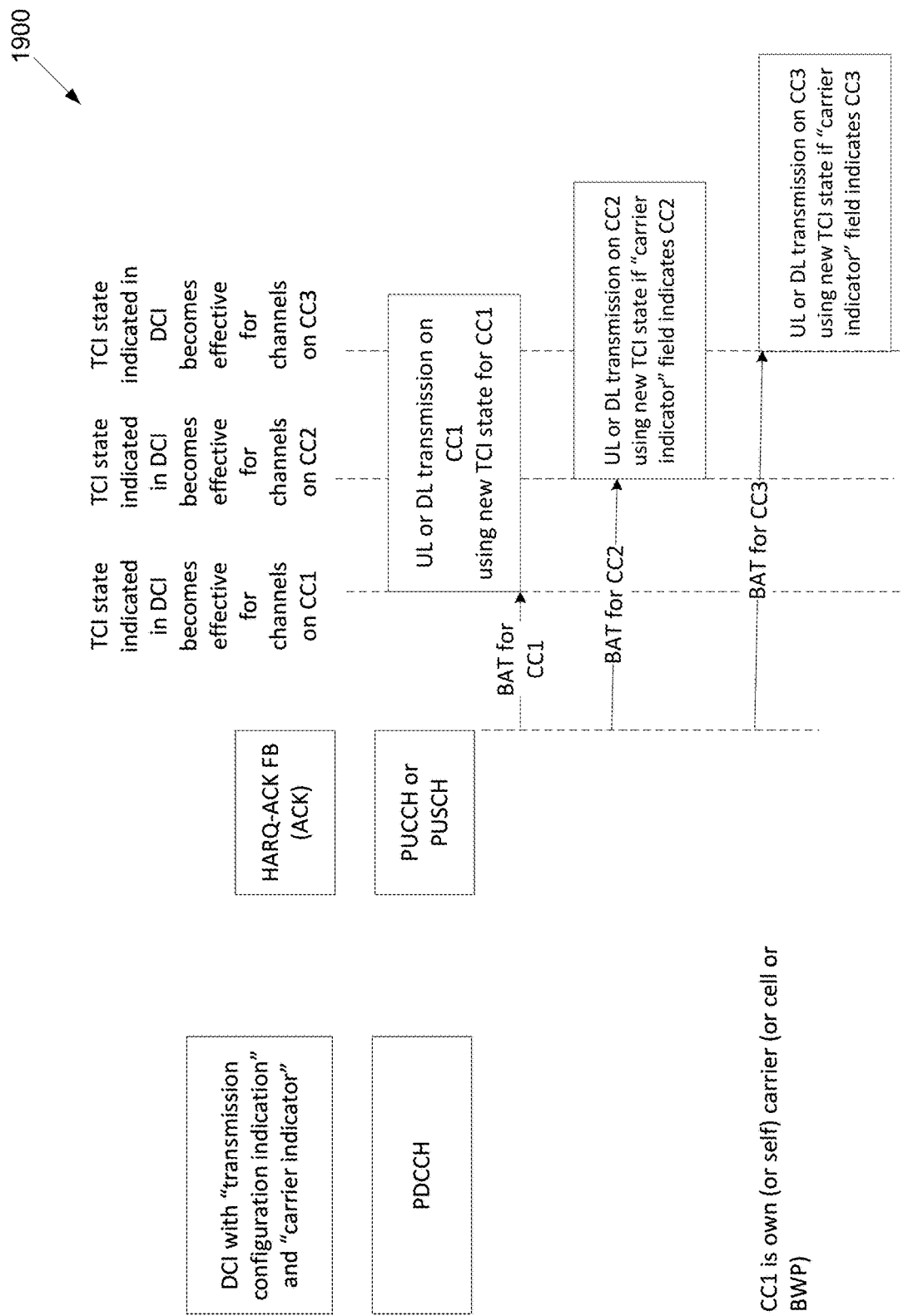
FIG. 19 illustrates yet another example of cross-carrier beam application time according to embodiments of the present disclosure.

FIG. 19 illustrates yet another example of cross-carrier beam application time 1900 according to embodiments of the present disclosure. An embodiment of the cross-carrier beam application time 1900 shown in FIG. 19 is for illustration only.

In another example, as illustrated in FIG. 19, a beam application time is determined for each carrier (or cell or BWP) in case of cross-carrier scheduling and beam indication. Carrier A includes the DCI format that provides "transmission configuration indication" (beam indication) field (e.g., TCI_state_id or TCI state codepoint from the codepoints activated by MAC CE). In addition to carrier A, carriers B1, B2, . . . are carriers that can be indicated by the "carrier indicator" field a DCI format transmitted on Carrier A.

The DCI format can be: (1) a DL related DCI format (e.g., DCI format 1_1 or DCI format 1_2) with DL assignment; and/or (2) a DL related DCI format (e.g., DCI format 1_1 or DCI format 1_2) without DL assignment.

In one example, a beam application time is configured for each carrier (or cell or BWP).

In one example, the beam application time is determined based on the beam application time configured for the carrier (or cell or BWP) to which the "transmission configuration indication" is to be applied as indicated by the "carrier indicator" field.

In one example, the beam application time is determined based on the configured beam application time of a carrier (or cell or BWP) with the smallest sub-carrier spacing among one of the following examples.

In one example, the carrier (or cell or BWP) indicated by the "carrier indicator" field and the carrier used for the HARQ-ACK feedback of the DCI format that includes the "transmission configuration indication" field.

In one example, the carrier (or cell or BWP) indicated by the "carrier indicator" field and the carrier on which the DCI format that includes the "transmission configuration indication" field is transmitted.

In one example, the carrier (or cell or BWP) indicated by the "carrier indicator" field and the carrier on which the DCI format that includes the "transmission configuration indication" field is transmitted, and the carrier used for the HARQ-ACK feedback of the DCI format that includes the "transmission configuration indication" field.

In one example, the beam application time is determined based on the configured beam application time of a carrier with the largest sub-carrier spacing among one of the following examples.

In one example, the carrier (or cell or BWP) indicated by the "carrier indicator" field and the carrier used for the HARQ-ACK feedback of the DCI format that includes the "transmission configuration indication" field.

In one example, the carrier (or cell or BWP) indicated by the "carrier indicator" field and the carrier on which the DCI format that includes the "transmission configuration indication" field is transmitted.

In one example, the carrier (or cell/or BWP) indicated by the "carrier indicator" field and the carrier on which the DCI format that includes the "transmission configuration indication" field is transmitted, and the carrier used for the HARQ-ACK feedback of the DCI format that includes the "transmission configuration indication" field.

In one example, the beam application time is determined based on the largest (or smallest) configured beam application time among one of the following examples.

In one example, the carrier (or cell or BWP) indicated by the "carrier indicator" field and the carrier used for the HARQ-ACK feedback of the DCI format that includes the "transmission configuration indication" field.

In one example, the carrier (or cell or BWP) indicated by the "carrier indicator" field and the carrier on which the DCI format that includes the "transmission configuration indication" field is transmitted.

In one example, the carrier (or cell or BWP) indicated by the "carrier indicator" field and the carrier on which the DCI format that includes the "transmission configuration indication" field is transmitted, and the carrier used for the HARQ-ACK feedback of the DCI format that includes the "transmission configuration indication" field.

Figure 20:
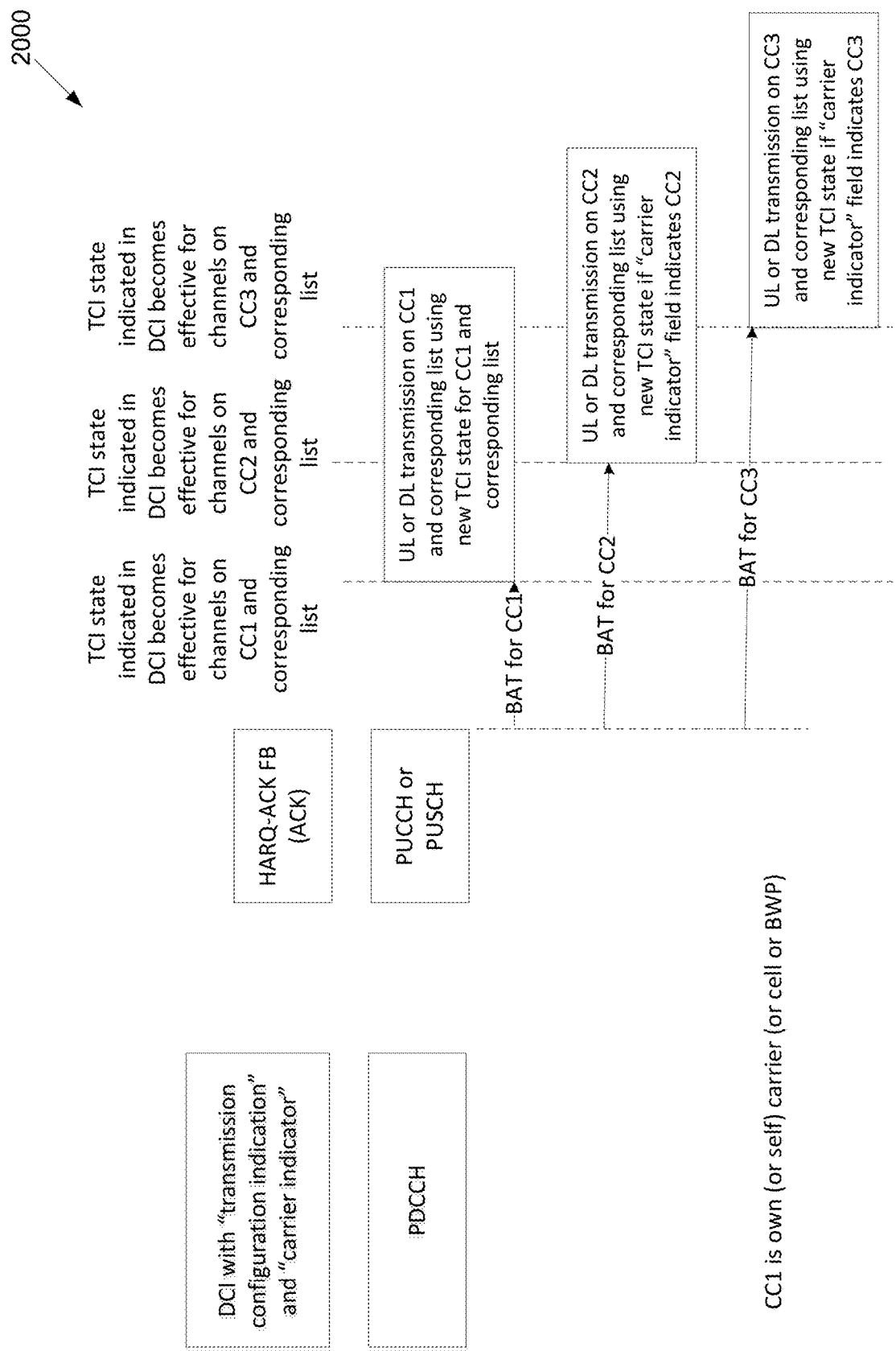
FIG. 20 illustrates yet another example of cross-carrier beam application time according to embodiments of the present disclosure.

FIG. 20 illustrates yet another example of cross-carrier beam application time 2000 according to embodiments of the present disclosure. An embodiment of the cross-carrier beam application time 2000 shown in FIG. 20 is for illustration only.

In another example, as illustrated in FIG. 20, a beam indication applies to a list of carriers (or cells or BWPs), wherein the list of carriers (or cells or BWPs) is configured by higher layer (e.g., RRC) signaling. A beam application time is determined for each list of carriers in case of cross-carrier scheduling and beam indication. Carrier A includes the DCI format that provides "transmission configuration indication" (beam indication) field (e.g., TCI_state_id or TCI state codepoint from the codepoints activated by MAC CE). In addition to carrier A, carriers B1, B2, . . . are carriers that can be indicated by the "carrier indicator" field a DCI format transmitted on Carrier A. The indicated carrier (or cell or BWP) is part of a list of carriers (or cells or BWPs), the "transmission configuration indication" applies to all carriers (or cells or BWPs) in the list.

The DCI format can be: (1) a DL related DCI format (e.g., DCI format 1_1 or DCI format 1_2) with DL assignment; and/or (2) a DL related DCI format (e.g., DCI format 1_1 or DCI format 1_2) without DL assignment.

In one example, a beam application time is configured for each carrier (or cell or BWP).

In one example, the beam application time is determined based on the beam application time configured for the carrier (or cell or BWP) to which the "transmission configuration indication" is to be applied as indicated by the "carrier indicator" field and carriers (or cells or BWPs) in the corresponding list following the same beam. The beam application is that configured for the carrier (cell or BWP) with the smallest sub-carrier spacing among the aforementioned.

In one example, the beam application time is determined based on the beam application time configured for the carrier (or cell or BWP) to which the "transmission configuration indication" is to be applied as indicated by the "carrier indicator" field and carriers (or cells or BWPs) in the corresponding list following the same beam. The beam application is that configured for the carrier (cell or BWP) with the largest sub-carrier spacing among the aforementioned.

In one example, the beam application time is determined based on the configured beam application time of a carrier (or cell or BWP) with the smallest sub-carrier spacing among one of the following examples.

In one example, the carrier (or cell or BWP) indicated by the "carrier indicator" field and corresponding list following the same beam and the carrier used for the HARQ-ACK feedback of the DCI format that includes the "transmission configuration indication" field.

In one example, the carrier (or cell or BWP) indicated by the "carrier indicator" field and corresponding list following the same beam and the carrier on which the DCI format that includes the "transmission configuration indication" field is transmitted.

In one example, the carrier (or cell or BWP) indicated by the "carrier indicator" field and corresponding list following the same beam and the carrier on which the DCI format that includes the "transmission configuration indication" field is transmitted, and the carrier used for the HARQ-ACK feedback of the DCI format that includes the "transmission configuration indication" field.

In one example, the beam application time is determined based on the configured beam application time of a carrier (or cell or BWP) with the largest sub-carrier spacing among one of the following examples.

In one example, the carrier (or cell or BWP) indicated by the "carrier indicator" field and corresponding list following the same beam and the carrier used for the HARQ-ACK feedback of the DCI format that includes the "transmission configuration indication" field.

In one example, the carrier (or cell or BWP) indicated by the "carrier indicator" field and corresponding list following the same beam and the carrier on which the DCI format that includes the "transmission configuration indication" field is transmitted.

In one example, the carrier (or cell or BWP) indicated by the "carrier indicator" field and corresponding list following the same beam and the carrier on which the DCI format that includes the "transmission configuration indication" field is transmitted, and the carrier used for the HARQ-ACK feedback of the DCI format that includes the "transmission configuration indication" field.

In one example, the beam application time is determined based on the largest (or smallest) configured beam application time among one of the following examples.

In one example, the carrier (or cell or BWP) indicated by the "carrier indicator" field and corresponding list following the same beam.

In one example, the carrier (or cell or BWP) indicated by the "carrier indicator" field and corresponding list following the same beam and the carrier used for the HARQ-ACK feedback of the DCI format that includes the "transmission configuration indication" field.

In one example, the carrier (or cell or BWP) indicated by the "carrier indicator" field and corresponding list following the same beam and the carrier on which the DCI format that includes the "transmission configuration indication" field is transmitted.

In one example, the carrier (or cell or BWP) indicated by the "carrier indicator" field and corresponding list following the same beam and the carrier on which the DCI format that includes the "transmission configuration indication" field is transmitted, and the carrier used for the HARQ-ACK feedback of the DCI format that includes the "transmission configuration indication" field.

The present disclosure provides: (1) a cross carrier beam indication for unified TCI framework; (2) using TCI state code points mapped to multiple TCI states; (3) using multiple TCI state code points in a DCI format; and/or (4) timing aspects.

A time unit for DL signaling, for UL signaling, on a cell is one symbol. A symbol belongs to a slot that includes a number of symbols such as 14 symbols. A slot can also be used as a time unit. A bandwidth (BW) unit is referred to as a resource block (RB). One RB includes a number of sub-carriers (SCs). For example, a slot can have duration of one millisecond and an RB can have a bandwidth of 180 kHz and include 12 SCs with inter-SC spacing of 15 kHz. As another example, a slot can have a duration of 0.25 milliseconds and include 14 symbols and an RB can have a BW of 720 kHz and include 12 SCs with SC spacing of 60 kHz. An RB in one symbol of a slot is referred to as physical RB (PRB) and includes a number of resource elements (REs). A slot can be either full DL slot, or full UL slot, or hybrid slot similar to a special subframe in time division duplex (TDD) systems (as shown in 3GPP standard specification).

DL signals include data signals conveying information content, control signals conveying DL control information (DCI), and reference signals (RS) that are also known as pilot signals. A gNB transmits data information or DCI through respective physical DL shared channels (PDSCHs) or physical DL control channels (PDCCHs). A PDSCH or a PDCCH can be transmitted over a variable number of slot symbols including one slot symbol. A UE can be indicated a spatial setting for a PDCCH reception based on a configuration of a value for a transmission configuration indication state (TCI state) of a control resource set (CORESET) where the UE receives the PDCCH. The UE can be indicated a spatial setting for a PDSCH reception based on a configuration by higher layers or based on an indication by a DCI format scheduling the PDSCH reception of a value for a TCI state. The gNB can configure the UE to receive signals on a cell within a DL bandwidth part (BWP) of the cell DL BW.

A DCI format that can be used for DL assignments to schedule PDSCH transmissions can be DCI format 1_0, DCI format 1_1 or DCI format 1_2. TABLE 1, 2, and 3 provide the fields of DCI format 1_0, DCI format 1_1 and DCI format 1_2.

TABLE 1

DCI format 1_0

| Field | Description |
|---|---|
| Identifier for DCI formats | Value 1 to indicate DL DCI format |
| Frequency domain resource assignment | |
| Time domain resource assignment | Described in TS 38.214. Index to determine slot offset and slot-length indicator value (SLIV) |
| VRB-to-PRB mapping | 0 for non-interleaved, 1 for interleaved |
| Modulation and coding scheme | |
| New data indicator | |
| Redundancy version | |
| HARQ process number | |
| Downlink assignment index | 2 bits for counter DAI |
| TPC command for scheduled PUCCH | See TS 38.213 |
| PUCCH resource indicator | See TS 38.213 |
| PDSCH-to-HARQ feedback timing indicator | See TS 38.213 |

TABLE 2

DCI format 1_1

| Field | Description |
|---|---|
| Identifier for DCI formats | Value 1 to indicate DL DCI format |
| Carrier indicator | Described in TS 38.213 |
| Bandwidth part indicator | Number of DL BWP excluding initial DL BWP |

TABLE 2-continued

DCI format 1_1

| Field | Description |
|---|---|
| Frequency domain resource assignment | For resource allocation Type 0: Bitmap<br>For resource allocation Type 1: RIV<br>Dynamic switch: MSB indicates resource allocation type |
| Time domain resource assignment | Described in TS 38.214. Index to determine slot offset and slot-length indicator value (SLIV) |
| VRB-to-PRB mapping | 0 for non-interleave, 1 for interleaved |
| PRB bundling size indicator | 1 bit if prb-BundlingType is set to dynamicBundling otherwise 0 bits. See TS 38.214 |
| Rate matching indicator | See TS 38.214 |
| ZP CSI-RS trigger | Size depends on number of ZP CSI-RS resource set. |
| For TB1: Modulation and coding scheme | Modulation and Coding scheme for TB1. See TS 38.214. |
| For TB1: New data indicator | New data indicator for TB 1. |
| For TB 1: Redundancy version | Redundancy version for TB 1:<br>"00"→$rv_{id}$ = 0, "01"→$rv_{id}$ = 1,<br>"10"→$rv_{id}$ = 2, "11"→$rv_{id}$ = 3 |
| For TB2: Modulation and coding scheme | Modulation and Coding scheme for TB2. See TS 38.214. |
| For TB2: New data indicator | New data indicator for TB2. |
| For TB2: Redundancy version | Redundancy version for TB2:<br>"00"→$rv_{id}$ = 0, "01"→$rv_{id}$ = 1,<br>"10"→$rv_{id}$ = 2, "11"→$rv_{id}$ = 3 |
| HARQ process number | |
| Downlink assignment index (DAI) | 2 bits total DAI, if more than one serving cell with dynamic codebook configured.<br>2 bits counter DAI, if dynamic codebook is configured. |
| TPC command for scheduled PUCCH | See TS 38.213 |
| PUCCH resource indicator | See TS 38.213 |
| PDSCH-to-HARQ feedback timing indicator | See TS 38.213 |
| One-shot HARQ-ACK request | Release 16 |
| PDSCH group index | Release 16 |
| New feedback indicator | Release 16 |
| Number of requested PDSCH group(s) | Release 16 |
| Antenna ports | |
| Transmission configuration indication | 0 bit if higher layer parameter tci-PresentInDCI is not enabled; otherwise, 3 bits. See TS 38.214 |
| SRS request | |
| CBG transmission information | 0 bit if higher layer parameter codeBlockGroupTransmission for PDSCH is not configured, otherwise, 2, 4, 6, or 8 bits. See TS 38.214 |
| CBG flushing out information | 1 bit if higher layer parameter codeBlockGroupFlushIndicator is configured as "TRUE," 0 bit otherwise. |
| DMRS sequence initialization | |
| Priority indicator | Release 16. 0 bit if higher layer parameter priority IndicatorForDCI-Format1-1 is not configured; otherwise, 1 bit. See TS 38.213 |
| ChannelAccess-Cpext | Release 16 |
| Minimum applicable scheduling offset indicator | Release 16 |
| Scell dormancy indication | Release 16.<br>0 bit if higher layer parameter dormancyGroupWithinActiveTime is not configured; otherwise, 1, 2, 3, 4 or 5 bits bitmap determined according to higher layer parameter dormancyGroupWithinActiveTime |

TABLE 3

DCI format 1_2

| Field | Description |
|---|---|
| Identifier for DCI formats | Value 1 to indicate DL DCI format |
| Carrier indicator | Described in TS 38.213 |
| Bandwidth part indicator | Number of DL BWP excluding initial DL BWP |
| Frequency domain resource assignment | For resource allocation Type 0: Bitmap<br>For resource allocation Type 1: RIV<br>Dynamic switch: MSB indicates resource allocation type |
| Time domain resource assignment | Described in TS 38.214. Index to determine slot offset and slot-length indicator value (SLIV) |
| VRB-to-PRB mapping | 0 for non-interleaved, 1 for interleaved |
| PRB bundling size indicator | 1 bit if prb-BundlingType is set to dynamicBundling otherwise 0 bits. See TS 38.214 |
| Rate matching indicator | See TS 38.214 |
| ZP CSI-RS trigger | Size depends on number of ZP CSI-RS resource set. See TS 38.214 |
| Modulation and coding scheme | |
| New data indicator | |
| Redundancy version | |
| HARQ process number | |
| Downlink assignment index | |
| TPC command for scheduled PUCCH | See TS 38.213 |
| PUCCH resource indicator | See TS 38.213 |
| PDSCH-to-HARQ feedback timing indicator | See TS 38.213 |
| Antenna ports | |
| Transmission configuration indication | |
| SRS request | |
| DMRS sequence initialization | |
| Priority indicator | 0 bit if higher layer parameter priority IndicatorForDCI-Format1-1 is not configured; otherwise, 1 bit. See TS 38.213 |

A gNB transmits one or more of multiple types of RS including channel state information RS (CSI-RS) and demodulation RS (DMRS). A CSI-RS is primarily intended for UEs to perform measurements and provide channel state information (CSI) to a gNB. For channel measurement, non-zero power CSI-RS (NZP CSI-RS) resources are used. For interference measurement reports (IMRs), CSI interference measurement (CSI-IM) resources associated with a zero power CSI-RS (ZP CSI-RS) configuration are used. A CSI process consists of NZP CSI-RS and CSI-IM resources.

A UE can determine CSI-RS transmission parameters through DL control signaling or higher layer signaling, such as radio resource control (RRC) signaling from a gNB. Transmission instances of a CSI-RS can be indicated by DL control signaling or configured by higher layer signaling. A DMRS is transmitted only in the BW of a respective PDCCH or PDSCH and a UE can use the DMRS to demodulate data or control information.

UL signals also include data signals conveying information content, control signals conveying UL control information (UCI), DMRS associated with data or UCI demodulation, sounding RS (SRS) enabling a gNB to perform UL channel measurement, and a random access (RA) preamble enabling a UE to perform random access. A UE transmits data information or UCI through a respective physical UL shared channel (PUSCH) or a physical UL control channel (PUCCH). A PUSCH or a PUCCH can be transmitted over a variable number of slot symbols including one slot symbol.

The gNB can configure the UE to transmit signals on a cell within an UL BWP of the cell UL BW.

UCI includes hybrid automatic repeat request acknowledgement (HARQ-ACK) information, indicating correct or incorrect detection of data transport blocks (TBs) in a PDSCH, scheduling request (SR) indicating whether a UE has data in its buffer, and CSI reports enabling a gNB to select appropriate parameters for PDSCH or PDCCH transmissions to a UE. HARQ-ACK information can be configured to be with a smaller granularity than per TB and can be per data code block (CB) or per group of data CBs where a data TB includes a number of data CBs. A CSI report from a UE can include a channel quality indicator (CQI) informing a gNB of a largest modulation and coding scheme (MCS) for the UE to detect a data TB with a predetermined block error rate (BLER), such as a 10% BLER, of a precoding matrix indicator (PMI) informing a gNB how to combine signals from multiple transmitter antennas in accordance with a multiple input multiple output (MIMO) transmission principle, and of a rank indicator (RI) indicating a transmission rank for a PDSCH.

UL RS includes DMRS and SRS. DMRS is transmitted only in a BW of a respective PUSCH or PUCCH transmission. A gNB can use a DMRS to demodulate information in a respective PUSCH or PUCCH. SRS is transmitted by a UE to provide a gNB with an UL CSI and, for a TDD system, an SRS transmission can also provide a PMI for DL transmission. Additionally, in order to establish synchronization or an initial higher layer connection with a gNB, a UE can transmit a physical random access channel (PRACH as shown in 3GPP standard specification).

Rel-17 introduced the unified TCI framework, where a unified or master or main or indicated TCI state is signaled or indicated to the UE also referred to as an indicated TCI state. The unified or master or main or indicated TCI state can be one of: (1) in case of joint TCI state indication, wherein a same beam is used for DL and UL channels, a joint TCI state that can be used at least for UE-dedicated DL channels and UE-dedicated UL channels; (2) in case of separate TCI state indication, wherein different beams are used for DL and UL channels, a DL TCI state can be used at least for UE-dedicated DL channels; and/or (3) in case of separate TCI state indication, wherein different beams are used for DL and UL channels, a UL TCI state can be used at least for UE-dedicated UL channels.

The unified (master or main or indicated) TCI state is TCI state of UE-dedicated reception on PDSCH/PDCCH or dynamic-grant/configured-grant based PUSCH and all of dedicated PUCCH resources In the present disclosure, a beam is determined by either of: (1) a TCI state, that establishes a quasi-colocation (QCL) relationship or spatial relation between a source reference signal (e.g., SSB and/or CSI-RS) and a target reference signal; and/or (2) a spatial relation information that establishes an association to a source reference signal, such as SSB or CSI-RS or SRS. In either case, the ID of the source reference signal identifies the beam.

The TCI state and/or the spatial relation reference RS can determine a spatial Rx filter for reception of downlink channels at the UE, or a spatial Tx filter for transmission of uplink channels from the UE. The TCI state and/or the spatial relation reference RS can determine a spatial Tx filter for transmission of downlink channels from the gNB, or a spatial Rx filter for reception of uplink channels at the gNB.

A UE may be communicating with the network through two or more spatial relation filters for transmission and receptions, which in this disclosure are referred to as beams.

The beams are determined by a TCI state, for example, a joint TCI state for UL and DL beams, or a DL TCI state for DL beams or a UL TCI state UL beams. The beams can be associated with a single TRP, alternatively, the beams can be associated with multiple (two or more) TRPs, wherein the TRPs can have a same physical cell identity (PCI) (i.e., transmitting SSBs associated with the same PCI), or can have different PCIs (i.e., transmitting SSBs associated with different PCIs). The TCI state can be conveyed by a DCI format (e.g., DCI format 1_1 or DCI format 1_2) without DL assignment. The DCI format can include more than one "transmission configuration indication" (TCI) field, for example one TCI field associated with each entity. In the present disclosure, some design aspects related to the activation of TCI state, for more than one TRP and the repurposing of fields in DL-related DCI format without DL assignment for addition TCI fields, are provided.

The present disclosure relates to a 5G/NR communication system. The present disclosure considers design aspects related to: (1) activation of TCI state subsets, for more than one TRP; and/or (2) repurposing of fields in DL-related DCI format without DL assignment for additional TCI fields.

In the following examples, as illustrated in FIG. 8, a UE is configured/updated through higher layer RRC signaling one or more sets of TCI States with $L_i$ elements per set i. Wherein i=0, . . . , I−1. There are J RRC configured TCI state sets.

MAC CE signaling activates one or more subsets of $K_j$ TCI states or TCI state code points from the set(s) of $L_i$ TCI states per subset j, wherein each element in the subsets of $K_j$ elements is associated with a code point of the DCI field used for indication of the TCI state. Wherein j=0, . . . , J−1. There are J MAC CE activated TCI state subsets.

L1 control signaling (i.e., Downlink Control Information (DCI)) updates the UE's TCI state, wherein the DCI includes one or more "transmission configuration indication" (TCI) fields. Each TCI field is $b_h$ bits. Wherein h=0, . . . , H−1. There are H TCI fields in the DCI format.

In one example, H=J, i.e., each activated set of TCI states or TCI state codepoints has a corresponding set of TCI fields. In one example, $K_j \leq 2^{b_h}$, wherein j=h.

In one example, $b_h$ is the same value for all h. i.e., $b_h$=b for h=0, . . . , H−1. In further example, b can be specified in the system specifications (e.g., b=3 or b=4, . . . ) and/or b can be configured/updated by RRC signaling and/or MAC CE signaling.

Figure 21:
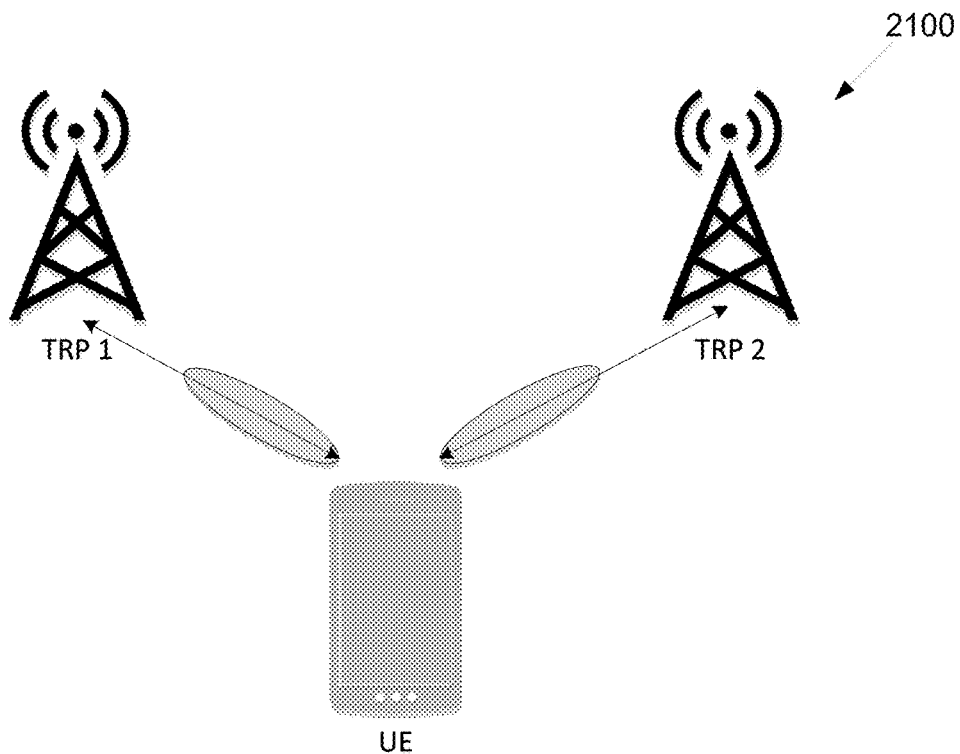
FIG. 21 illustrates an example of communication between the UE and TRPs according to embodiments of the present disclosure.

FIG. 21 illustrates an example of communication between the UE and TRPs 2100 according to embodiments of the present disclosure. An embodiment of the communication between the UE and TRPs 2100 shown in FIG. 21 is for illustration only.

In the example shown in FIG. 21, the UE communicates with two TRPs, TRP1 and TRP2, each TRP can have its own beam when communicating with the UE. A generalization of FIG. 21 is that the UE communicates with multiple TRPs, e.g., T TRPs, wherein the UE can use separate beam when communicating with each TRP.

Figure 22:
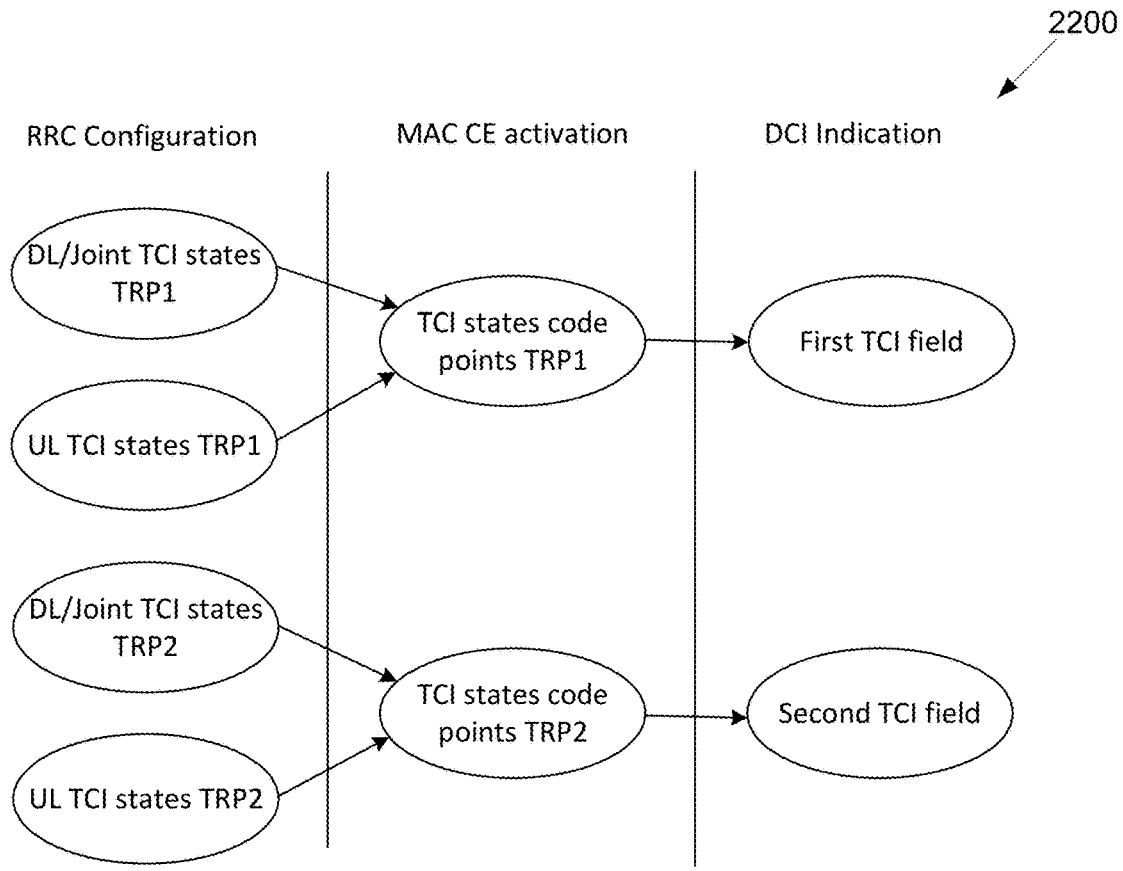
FIG. 22 illustrates an example of UE configuration with TCI states according to embodiments of the present disclosure.

FIG. 22 illustrates an example of UE configuration with TCI states 2200 according to embodiments of the present disclosure. An embodiment of the UE configuration with TCI states 2200 shown in FIG. 22 is for illustration only.

In one example, for 2 TRPs (e.g., TRP1 and TRP2), the UE is configured up to I=4 a sets of TCI states (FIG. 22): (1) first set is for DL and Joint TCI states for TRP1; (2) a second set is for UL TCI states for TRP1; (3) third set is for DL and Joint TCI states for TRP2; and (4) fourth set is for UL TCI states for TRP2.

In one example, for 2 TRPs (e.g., TRP1 and TRP2), the UE is activated up to J=2 subsets of TCI states or TCI state codepoints (FIG. 22): (1) a first subset includes TCI states or TCI state code points corresponding to TCI states form the first set (DL and Joint TCI states for TRP1) and/or from the second set (UL TCI states for TRP1). This subset of TCI states corresponds to TRP1; and (2) a second subset includes TCI states or TCI state code points corresponding to TCI states form the third set (DL and Joint TCI states for TRP2) and/or from the fourth set (UL TCI states for TRP2). This subset of TCI states corresponds to TRP2.

The DCI format includes two "transmission configuration indication" fields. The first "transmission configuration indication" field signals a TCI state or TCI state code point from the first subset. The second "transmission configuration indication" field signals a TCI state or TCI state code point from the second subset.

In one example, for T Entities (e.g., Entity1, Entity2, ..., Entity_T), the UE is configured up to I=2T sets of TCI states: (1) a first set is for DL and Joint TCI states for Entity1; (2) a second set is for UL TCI states for Entity1; (3) a third set is for DL and Joint TCI states for Entity2; (4) a fourth set is for UL TCI states for Entity2 ... (2T−1) a (2T−1)th is for DL and Joint TCI states for Entity_T; and (2T) 2Tth is for UL TCI states for Entity_T.

In one example, for T Entities (e.g., Entity1, Entity2, ..., Entity T), the UE is activated up to J=T subsets of TCI states or TCI state codepoints: (1) a first subset includes TCI states or TCI state code points corresponding to TCI states form the first set (DL and Joint TCI states for Entity1) and/or from the second set (UL TCI states for Entity1). This subset of TCI states corresponds to Entity1; (2) a second subset includes TCI states or TCI state code points corresponding to TCI states form the third set (DL and Joint TCI states for Entity2) and/or from the fourth set (UL TCI states for Entity2). This subset of TCI states corresponds to Entity2, and so on.

(T) A second subset includes TCI states or TCI state code points corresponding to TCI states form the (2T−1)th set (DL and Joint TCI states for Entity_T) and/or from the 2Tth set (UL TCI states for Entity_T). This subset of TCI states corresponds to Entity_T.

The DCI format includes T "transmission configuration indication" fields. The first "transmission configuration indication" field signals a TCI state or TCI state code point from the first subset. The second "transmission configuration indication" field signals a TCI state or TCI state code point from the second subset, and so on until the T th "transmission configuration indication" field which signals a TCI state or TCI state code point from the T th subset.

In example, an entity can be: (1) one or more cells, wherein one cell can be associated with one or more physical cell IDs (PCIs); (2) one or more PCIs; (3) one or more TRPs; (4) one or more TRP panels; (5) one or more component carriers; (6) one or more SSBs; (7) one or more UE panels; (8) one or more BWPs; (9) one or more frequency spans (e.g., PRBs or sub-carriers); (10) one or more time intervals (e.g., slots or symbols); and (11) one or more antenna ports.

Figure 23:
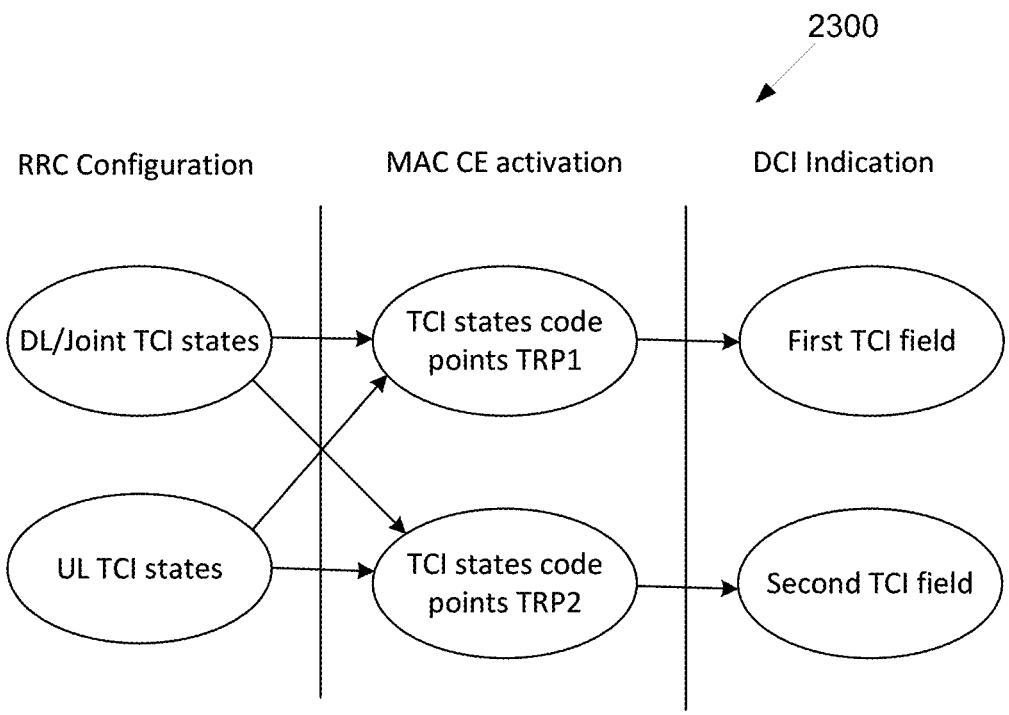
FIG. 23 illustrates another example of UE configuration with TCI states according to embodiments of the present disclosure.

FIG. 23 illustrates another example of UE configuration with TCI states 2300 according to embodiments of the present disclosure. An embodiment of the UE configuration with TCI states 2300 shown in FIG. 23 is for illustration only.

In one example, for 2 TRPs (e.g., TRP1 and TRP2), the UE is configured up to I=2 sets of TCI states (as shown in FIG. 23): (1) a first set is for DL and Joint TCI states for TRP1 and TRP2; and (2) a second set is for UL TCI states for TRP1 and TRP2.

In one example, for 2 TRPs (e.g., TRP1 and TRP2), the UE is activated up to J=2 subsets of TCI states or TCI state codepoints (as shown in FIG. 23): (1) a first subset includes TCI states or TCI state code points corresponding to TCI states form the first set (DL and Joint TCI states) and/or from the second set (UL TCI states). This subset of TCI states corresponds to TRP1; (2) a second subset includes TCI states or TCI state code points corresponding to TCI states form the first set (DL and Joint TCI states) and/or from the second set (UL TCI states). This subset of TCI states corresponds to TRP2.

The DCI format includes two "transmission configuration indication" fields. The first "transmission configuration indication" field signals a TCI state or TCI state code point from the first subset. The second "transmission configuration indication" field signals a TCI state or TCI state code point from the second subset.

In one example, for T Entities (e.g., Entity1, Entity2, ..., Entity_T), the UE is configured up to I=2 sets of TCI states: (1) a first set is for DL and Joint TCI states for Entity1, Entity2, ..., Entity_T; and (2) a second set is for UL TCI states for Entity1, Entity2, ..., Entity_T.

In one example, for T Entities (e.g., Entity1, Entity2, ..., Entity_T), the UE is activated up to J=T subsets of TCI states or TCI state codepoints: (1) a first subset includes TCI states or TCI state code points corresponding to TCI states form the first set (DL and Joint TCI states) and/or from the second set (UL TCI states). This subset of TCI states corresponds to Entity1; (2) a second subset includes TCI states or TCI state code points corresponding to TCI states form the first set (DL and Joint TCI states) and/or from the second set (UL TCI states). This subset of TCI states corresponds to Entity2; . . . and T th subset includes TCI states or TCI state code points corresponding to TCI states form the first set (DL and Joint TCI states) and/or from the second set (UL TCI states). This subset of TCI states corresponds to Entity_T.

The DCI format includes T "transmission configuration indication" fields. The first "transmission configuration indication" field signals a TCI state or TCI state code point from the first subset. The second "transmission configuration indication" field signals a TCI state or TCI state code point from the second subset. The T th "transmission configuration indication" field signals a TCI state or TCI state code point from the T th subset In one example, an entity can be: (1) one or more cells, wherein one cell can be associated with one or more physical cell IDs (PCIs); (2) one or more PCIs; (3) one or more TRPs; (4) one or more TRP panels; (5) one or more component carriers; (6) one or more SSBs; (7) one or more UE panels; (8) one or more BWPs; (9) one or more frequency spans (e.g., PRBs or sub-carriers); (10) one or more time intervals (e.g., slots or symbols); and (11) one or more antenna ports.

Figure 26:
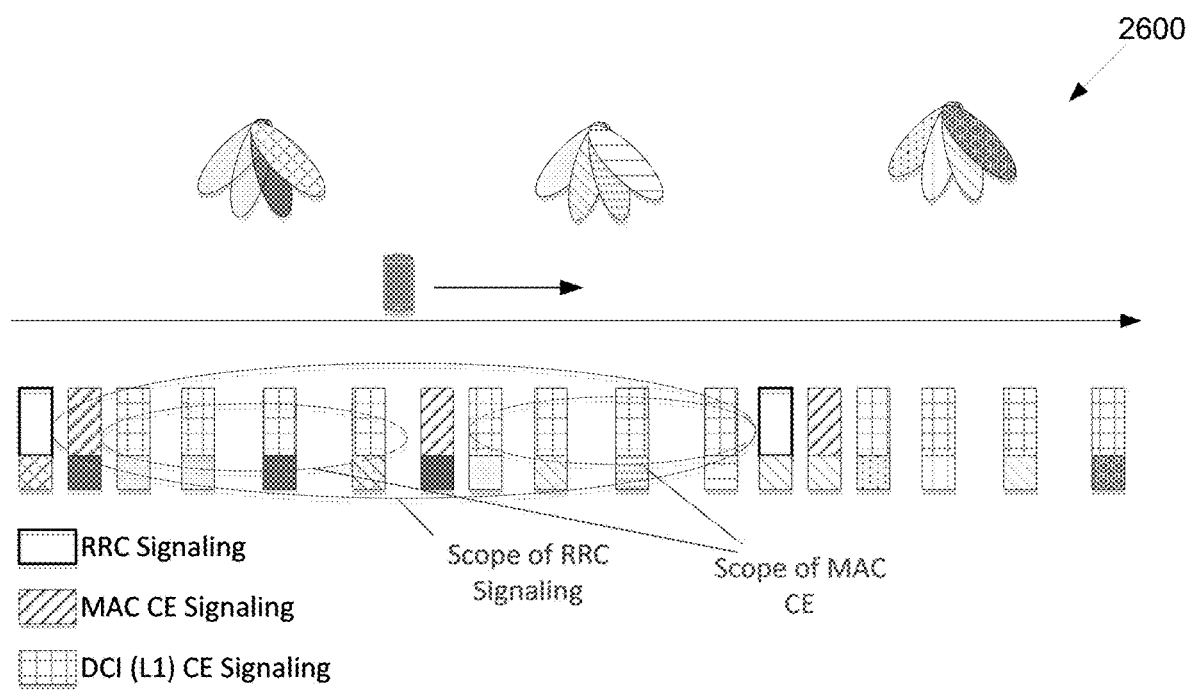
FIG. 26 illustrates an example of RRC signaling, MAC CE signaling, and DCI CE signaling according to embodiments of the present disclosure.

As a UE moves along a trajectory, the rate of DCI signaling to update the TCI state can be higher than the rate of MAC CE signaling to update the TCI state code points which in turn can be higher than the rate of RRC signaling to configure/update the TCI states. As illustrated in FIG. 26, as a UE moves along a trajectory, RRC signaling configures/updates a set of L TCI state states. MAC signaling includes a subset of K TCI states and associates each with code points for the DCI. There can be one or more MAC CE TCI state updates between two consecutive RRC configurations of TCI states. DCI signaling updates the TCI state as a UE moves along a trajectory according to the code points included in the MAC CE. There can be one or more DCI TCI state updates between two consecutive MAC CE TCI state updates.

In one further example, there is no DCI signaling of the TCI state, the MAC CE selects or activates a TCI state out of the/sets of TCI states configured by RRC. This is illustrated in FIG. 24.

Figure 24:
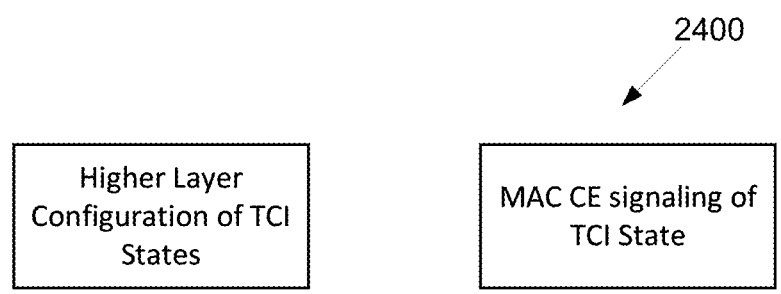
FIG. 24 illustrates an example of configuration of TCI states according to embodiments of the present disclosure.
Figure 27:
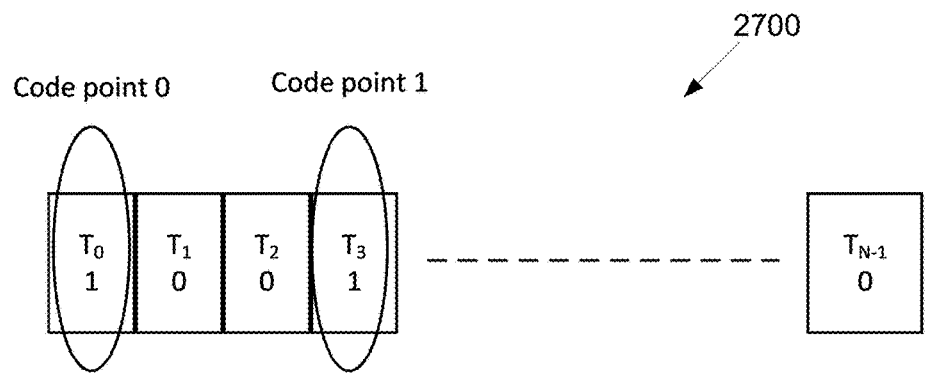
FIG. 27 illustrates an example of TCI state subset according to embodiments of the present disclosure.

FIG. 24 illustrates an example of configuration of TCI states 2400 according to embodiments of the present dis- In another embodiment, the MAC CE includes a bit map of the RRC-configured TCI states as illustrated in FIG. 27 for each of J activated TCI state subsets, with a bit corresponding to each RRC-configured TCI state, a bit is set to 1 when its corresponding TCI state is active, otherwise the bit is set 0. The first TCI state with its corresponding bit set to 1, corresponds to code point 0. The second TCI state with its corresponding bit set to 1, corresponds to code point 1, and so on.

TABLE 4

| | LIST of TCI States Active by MAC CE | | | |
|---|---|---|---|---|
| Code point | Activated Subset 0 | Activated Subset 1 | ... | Activated Subset J-1 |
| Code point 0 | TCI State $T_{0,0}$ or TCI State $TD_{0,0}$ + TCI State $TU_{0,0}$ | TCI State $T_{1,0}$ or TCI State $TD_{1,0}$ + TCI State $TU_{1,0}$ | ... | TCI State $T_{J-1,0}$ or TCI State $TD_{J-1,0}$ + TCI State $TU_{J-1,0}$ |
| Code point 1 | TCI State $T_{0,1}$ or TCI State $TD_{0,1}$ + TCI State $TU_{0,1}$ | TCI State $T_{1,1}$ or TCI State $TD_{1,1}$ + TCI State $TU_{1,1}$ | ... | TCI State $T_{J-1,1}$ or TCI State $TD_{J-1,1}$ + TCI State $TU_{J-1,1}$ |
| ... | ... | ... | ... | ... | closure. An embodiment of the configuration of TCI states 2400 shown in FIG. 24 is for illustration only.

In one further example, there is no MAC CE signaling of the TCI code points, the RRC configured TCI states directly provide code points for DCI signaling of the TCI state. This is illustrated in FIG. 25.

Figure 25:
FIG. 25 illustrates an example of configuration of TCI states according to embodiments of the present disclosure.

FIG. 25 illustrates an example of configuration of TCI states 2500 according to embodiments of the present disclosure. An embodiment of the configuration of TCI states 2500 shown in FIG. 25 is for illustration only.

In one example, according to the examples of FIG. 8, FIG. 24, and FIG. 25, the TCI states configured by RRC are common for UL and DL channels.

In one example, according to the examples of FIG. 8, FIG. 24, and FIG. 25, the TCI states configured by RRC for UL channels are separate from the TCI state configured for DL channels.

FIG. 26 illustrates an example of RRC signaling, MAC CE signaling, and DCI CE signaling 2600 according to embodiments of the present disclosure. An embodiment of the RRC signaling, MAC CE signaling, and DCI CE signaling 2600 shown in FIG. 26 is for illustration only.

In one example, the mapping of TCI states to code points, by a MAC CE, can be based on the ordinal position of the activate TCI states within each of the J activated subsets. In one embodiment, the MAC CE provides a J lists of active TCI States, as illustrated in TABLE 4, wherein the first active TCI state in each list corresponds to code point 0, the second active TCI state in each list corresponds to code point 1, and so on.

In TABLE 4, a code point can correspond to one of: (1) One TCI state, wherein the TCI state can be one of a Joint TCI state or DL TCI state or an UL TCI state. (2) Two TCI states, a DL TCI state and an UL TCI state. $T_{j,i}$ is a DL or UL or Joint TCI state for code point i of activated subset j. $TD_{j,i}$ is a DL TCI state for code point i of activated subset j. $TU_{j,i}$ is an UL TCI state for code point i of activated subset j.

FIG. 27 illustrates an example of TCI state subset 2700 according to embodiments of the present disclosure. An embodiment of the TCI state subset 2700 shown in FIG. 27 is for illustration only.

In another example, $K_i$ TCI states are mapped to code point i, wherein $K_0, K_1, \ldots, K_{M-1}$, the number of TCI states mapped to a TCI state code point, can be configured and updated by higher layer RRC signaling and/or MAC CE signaling and/or specified in system specifications. M is the number of activated codepoints by MAC CE signaling. In one further embodiment $K_0=K_1=\ldots=K_{M-1}=K$.

In one example, a UE specific RRC signaling can be used to configure/update the I lists of TCI states.

In another example, a UE group signaling can be used to configure/update the I lists TCI states, wherein an RRC message is sent to a group a UEs including a set of I lists TCI states.

In another example, a cell-part signaling can be used to configure/update the I lists TCI states, wherein an RRC message is broadcast in part of a cell. For example, a part of a cell can be covered by one or more beams, or in another example a part of a cell can be covered by one or more TRPs (Transmission Reception Points). In yet a third example a part of a cell can be cover by one or more beams or one or a more TRPs. In yet a fourth example a part of cell can cover the entire cell.

In one example, the RRC message signaling the TCI states includes an index. The MAC CE including the subset of the selected TCI states and associated code points, includes the index of the corresponding RRC message providing the TCI states. This is illustrated in FIG. 28.

Figure 28:
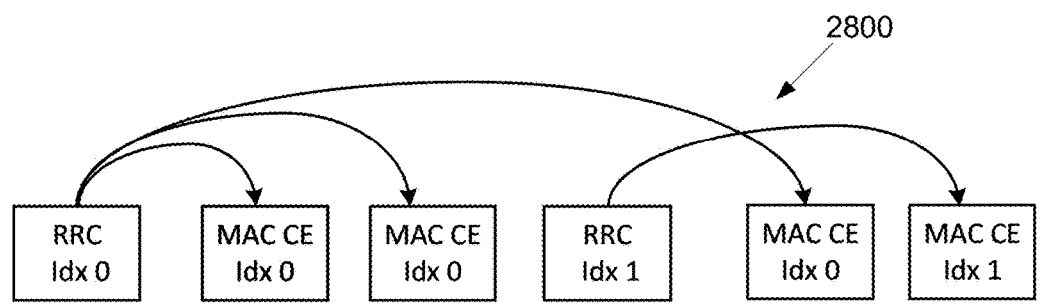
FIG. 28 illustrates an example of TCI state including an index according to embodiments of the present disclosure.

FIG. 28 illustrates an example of TCI state including an index 2800 according to embodiments of the present disclosure. An embodiment of the TCI state including an index 2800 shown in FIG. 28 is for illustration only.

Figure 29:
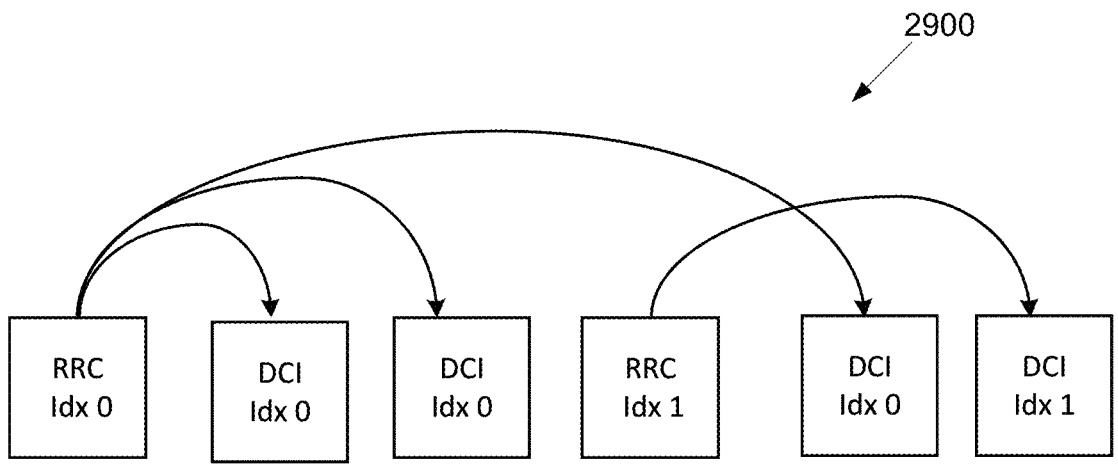
FIG. 29 illustrates another example of TCI state including an index according to embodiments of the present disclosure.

In another example, the RRC signaling the TCI state includes an index. There is no configured MAC CE to update the TCI state code points. The DCI including the TCI state field, includes the index of the corresponding RRC message providing the TCI states. As illustrated in FIG. 25 and FIG. 29.

FIG. 29 illustrates another example of TCI state including an index 2900 according to embodiments of the present disclosure. An embodiment of the TCI state including an index 2900 shown in FIG. 29 is for illustration only.

In one example, a UE specific MAC CE signaling can be used to indicate J subsets of $M_j$ (j=0, 1, ... J−1) TCI states and associate with the code points of the DCI for TCI state update.

In one example, $M_j$=1, i.e., a MAC CE activates or signals or indicates a TCI state to a UE for subset j. In this case, the "transmission configuration indication" field corresponding to subset j can be one of (1) not included in the DCI format (2) if included in the DCI format not used for beam indication.

In one example, $M_j$=1, for j=0, 1, ... J−1, i.e., a MAC CE activates or signals or indicates a TCI state to a UE for all J subsets. In this case, there may not be a DCI format for beam indication.

In another example, a UE group MAC CE signaling can be used to indicate J subsets of $M_j$ (j=0, 1, ... J−1) TCI states and associate with the code points of the DCI for TCI state update. Wherein a MAC CE message is sent to a group of UEs.

In one example, according to FIG. 8 or FIG. 24, a UE group MAC CE signaling can be used to activate/indicate/signal a TCI state for each UE within a group of UEs. Wherein, a MAC CE message is sent to a group of UEs.

In one example, each UE has at least one TCI (a TCI state can be common (or joint) for UL and DL channels or separate TCI states for DL and UL channels) in the MAC CE sent to a group of UEs.

In another example, a TCI state can apply to a subset of UEs within the group of UEs, wherein a TCI state can be common (or joint) for UL and DL channels, and/or a TCI state for UL channels can be separate from that of a DL channel.

In yet another example a TCI state can apply to all UEs within a group of UEs, wherein a TCI state can be common (or joint) for UL and DL channels, or a TCI state for UL channels can be separate from that of a DL channel.

In another example, a cell-part MAC CE signaling can be used to indicate J subsets of $M_j$ (j=0, 1, ... J−1) TCI states and associate with the code points of the DCI for TCI state update. For example, a part of a cell can be covered by one or more beams, or in another example a part of a cell can be covered by one or more TRPs. In yet a third example a part of a cell can be cover by one or more beams or one or a more TRPs. In yet a fourth example a part of cell can cover the entire cell.

In one example, according to FIG. 8 or FIG. 24, cell-part MAC CE signaling can be used to activate/indicate/signal a TCI state for each UE within a part of a cell. Wherein, a MAC CE message is sent to a group of UEs.

In one example, each UE has at least one TCI (a TCI state can be common (or joint) for UL and DL channels or separate TCI states for DL and UL channels) in the MAC CE sent to UEs in a part of a cell.

In another example, a TCI state can apply to a subset of UEs within the UEs of a part of a cell, wherein a TCI state can be common (or joint) for UL and DL channels, and/or a TCI state for UL channels can be separate from that of a DL channel.

In yet another example a TCI state can apply to all UEs within the UEs of a part of a cell, wherein a TCI state can be common (or joint) for UL and DL channels, or a TCI state for UL channels can be separate from that of a DL channel.

In one example, the MAC CE includes an index. The DCI including the TCI state field, includes the index of the corresponding MAC CE providing the TCI state code points. This is illustrated in FIG. 30.

Figure 30:
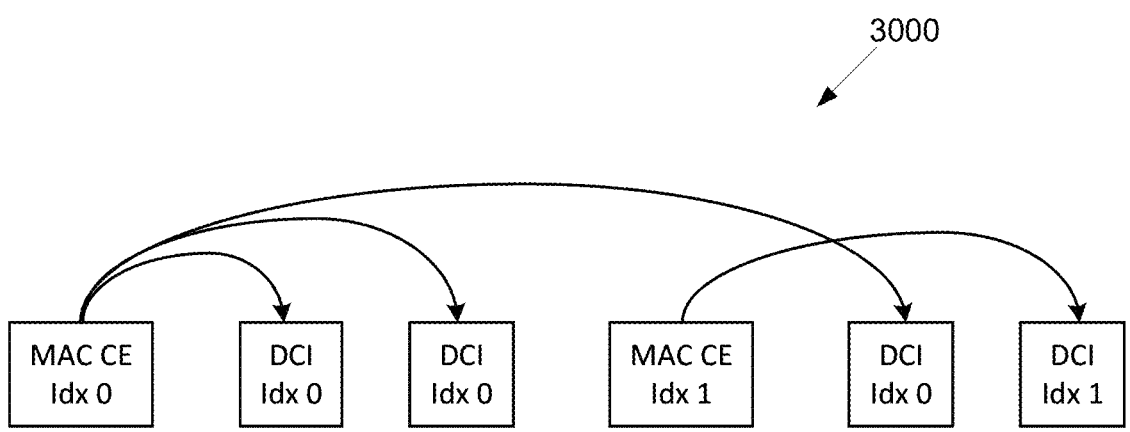
FIG. 30 illustrates another example of TCI state including an index according to embodiments of the present disclosure.

FIG. 30 illustrates another example of TCI state including an index 3000 according to embodiments of the present disclosure. An embodiment of the TCI state including an index 3000 shown in FIG. 30 is for illustration only.

In one example, a UE specific L1 signaling can be used to indicate a TCI state to the UE. There are H "transmission configuration indication" (TCI) fields for TCI indication. In one example H=J, wherein J is as described in examples disclosed herein, e.g., there is a TCI field for each MAC CE activated subset.

In one example, a DCI carrying the TCI state(s) can be a downlink related DCI with DL assignment or without DL assignment, i.e., a DCI for PDSCH assignment (e.g., DCI format 1_0 or DCI format 1_1 or DCI format DCI format 1_2).

In another example, the DCI carrying the TCI state(s) can be an uplink related DCI with UL grant or without UL grant, i.e., a DCI for PUSCH scheduling (e.g., DCI format 0_0 or DCI format 0_1 or DCI format 0_2).

In another example, the DCI carrying the TCI state(s) can be purpose designed DCI for TCI state indication.

In another example, a UE group signaling can be used to indicate a TCI state for a UE. Wherein a L1 DCI message is sent to a group of UEs, a TCI state can be common (or joint) for UL and DL channels and/or separate TCI states for DL and UL channels.

In one example, a DCI can include TCI state(s) that applies to a group of UEs.

In another example, a DCI can include multiple TCI states, wherein each TCI state is associated with one UE.

In another example, a DCI can include multiple TCI states, wherein each TCI state is associated with one or more UEs.

In other examples, a TCI state codepoint signaled or activated, can be N TCI states wherein, N≥1. Wherein, the multiple TCI states can correspond to different entities, e.g., UL/DL directions and/or serving cells and/or BWPs and/or component carriers and/or TRPs and/or TRP panels and/or UE panels.

A TCI state of a UE can be updated by L1 control (DCI) signaling and/or MAC CE signaling, wherein the decision to update a TCI state by L1 control signaling and/or MAC CE signaling can be based on UE capability and/or higher layer (RRC and/or MAC CE) configuration or as specified in the system specifications or other condition or network implementation.

In one example, a UE can indicate its capability to support TCI state update by L1 control (DCI) signaling. If a UE does not support TCI state update by L1 control (DCI) signaling, the TCI state can be updated by MAC CE signaling, in this case according to the illustration of FIG. 8, an RRC configuration message including I TCI state lists, and a MAC CE can be sent to a UE or to a group of UEs.

In one embodiment, the MAC CE includes a TCI state for a UE for subset j, i.e., $M_j$=1, as illustrated in FIG. 24. In a second embodiment, the MAC CE includes $M_j$ (>1) TCI states, the first TCI state is used to indicate a beam to a UE not supporting TCI state update by L1 control (DCI) signaling corresponding to activated subset j. A TCI state can be common (or joint) for UL and DL channels and/or separate TCI states for DL and UL channels. Separate TCI states can be used for different entities. In one example entity (e.g., TRP) j corresponds to MAC CE activated subset j and TCI field j in the DCI format used for beam indication.

In another example, a UE can be configured by RRC signaling or MAC CE an L1 control (DCI) signal to update the TCI state. If a UE is not configured an L1 control (DCI) signal to update the TCI state, the TCI state can be updated by MAC CE signaling, in this case according to the illustration of FIG. 8, an RRC configuration message including I lists of TCI states, and a MAC CE can be sent to a UE or to a group of UEs.

In one embodiment, the MAC CE includes a TCI state for a UE for each entity j, i.e., $M_j=1$, as illustrated in FIG. 24. In a second embodiment, the MAC CE includes $M_j$ (>1) TCI states, the first TCI state is used to indicate a beam to a UE that is not configured an L1 control (DCI) signal to update the TCI state for each entity j. A TCI state can be common (or joint) for UL and DL channels and/or separate TCI states for DL and UL channels. Separate TCI states can be used for different entities. In one example entity (e.g., TRP) j corresponds to MAC CE activated subset j and TCI field j in the DCI format used for beam indication.

In one example, a UE can be configured an L1 control (DCI) to update the TCI state, a UE can be further configured a MAC CE to update the TCI state. A UE can be further configured/updated, by RRC signaling and/or MAC CE signaling and/or L1 control (DCI) signaling, a parameter to select the mechanism for beam indication (TCI state indication), i.e., whether to use DCI for TCI state indication or MAC CE for TCI state indication.

In another example, a UE can be configured an L1 control (DCI) to update the TCI state, a UE can further configure a MAC CE to select, M, TCI state codepoints for DCI state indication, wherein M can be configured/updated by RRC signaling and/or MAC CE signaling and/or L1 signaling. If $M_j=1$, i.e., the MAC CE selects 1 codepoint for TCI state for entity j, the MAC is used for TCI state indication, and there is no DCI signaling for TCI state indication.

In another example, a UE can be configured an L1 control (DCI) to update the TCI state, a UE can be further configured a MAC CE to update the TCI state. A gNB can select either the DCI to update the TCI state, or the MAC CE to update the TCI state. In one example, this selection is determined by the gNB's implementation. In another example, the selection can be based on the payload size of the TCI state indication. For small TCI state payloads, the DCI is used to update the TCI state. For large TCI state payload, the MAC CE is used to update the TCI state.

In one example, a maximum or threshold payload size of TCI state indication by DCI is specified in system specifications and/or is configured and updated by RRC signaling and/or by MAC CE signaling: if the payload size is larger than (or larger than or equal to) the maximum or threshold value, MAC CE TCI state indication is used instead of DCI TCI state indication. In another example, a maximum or threshold number of TCI states in a TCI state indication by DCI is specified in system specifications and/or is configured and updated by RRC signaling and/or by MAC CE signaling; if the number of TCI states is larger than (or larger than or equal to) the maximum or threshold value, MAC CE TCI state indication is used instead of DCI TCI state indication.

In another example, a UE can be configured an L1 control (DCI) to update the TCI state, a UE can be further configured a MAC CE to update the TCI state. A DCI TCI state indication is used for certain entities, while a MAC CE TCI state indication is used for other entities.

The decision which TCI state indication mechanism to use (e.g., MAC CE or DCI) can be: (1) specified in system specifications; (2) based on higher layer (RRC and/or MAC CE) configuration and reconfiguration; (3) payload load of corresponding TCI state message relative to a threshold; (4) a number of TCI states indicated in corresponding TCI state message relative to a threshold; (5) UE capability; and/or (6) left for network implementation.

In another example, a UE can indicate its capability to support TCI state update MAC CE. If a UE does not support TCI state code point update by MAC CE, the TCI state code points are determined by the RRC configuration, wherein the first TCI state in the RRC configuration corresponds to code point one, the second TCI state in the RRC configuration corresponds to code point 2, and so on.

In this case, according to the illustration of FIG. 8, the only messages that can be sent to the UE are "the Higher Layer Configuration of TCI State" and the "DCI signaling of TCI states" as illustrated in FIG. 25. If there are I lists of TCI state configured by RRC with size $L_i$ for list i and the h TCI field in the DCI format for beam indication is $b_h$ bits, $L_i \leq 2^{b_h}$, wherein RRC list i corresponds to TCI field h in the DCI format used for beam indication. A TCI state can be common (or joint) for UL and DL channels and/or separate TCI states for DL and UL channels.

In another example, a UE can be configured by RRC signaling a TCI state update MAC CE. If a UE is not configured a MAC CE to update the TCI state code points, the TCI state code points are determined by the RRC configuration, wherein the first TCI state in the RRC configuration corresponds to code point one, the second TCI state in the RRC configuration corresponds to code point 2, and so on.

In this case, according to the illustration of FIG. 8, the only messages that can be sent to the UE are "the Higher Layer Configuration of TCI State" and the "DCI signaling of TCI states" as illustrated in FIG. 25. If there are I lists of TCI state configured by RRC with size $L_i$ for list i and the h TCI field in the DCI format for beam indication is $b_h$ bits, $L_i \leq 2^{b_h}$, wherein RRC list i corresponds to TCI field h in the DCI format used for beam indication. A TCI state can be common (or joint) for UL and DL channels and/or separate TCI states for DL and UL channels.

In another example, it is specified by system specification that a TCI state can be updated by MAC CE signaling for entity j, in this case according to the illustration of FIG. 24, an RRC configuration message including L TCI states, and a MAC CE can be sent to a UE or to a group of UEs, wherein, the MAC CE includes a TCI state for a UE for entity j, i.e., $MK_j=1$. A TCI state can be common (or joint) for UL and DL channels and/or separate TCI states for DL and UL channels.

In another example, it is specified by system specification that a UE does not support TCI state code point update by MAC CE, the TCI state code points are determined by the RRC configuration, wherein the first TCI state in the RRC configuration corresponds to code point one, the second TCI state in the RRC configuration corresponds to code point 2, and so on. In this case, according to the illustration of FIG. 25, the only messages that can be sent to the UE are "the Higher Layer Configuration of TCI State" and the "DCI signaling of TCI states."

If there are I lists of TCI state configured by RRC with size $L_i$ for list i and the h TCI field in the DCI format for beam indication is $b_h$ bits, $L_i \leq 2^{b_h}$, wherein RRC list i corresponds to TCI field h in the DCI format used for beam indication. A TCI state can be common (or joint) for UL and DL channels and/or separate TCI states for DL and UL channels.

In one example, a TCI state codepoint signaled or activated, can be N TCI states wherein, N≥1. Wherein, the multiple TCI states can correspond to different entities, e.g., UL/DL directions and/or serving cells and/or BWPs and/or component carriers and/or TRPs and/or TRP panels and/or UE panels.

In the present disclosure, the term TCI state is used generically to refer to any beam indication or spatial filter indication signaling, for example a TCI state can be replaced by spatial relation information, RS resources index, wherein an RS is associated with a beam or a spatial receive or transmit filter, etc.

In one example the TCI state can be indicated by a DCI format without DL assignment. In one example, the TCI state can be indicated by DCI format 1_0 without DL assignment. In one example, the TCI state can be indicated by DCI format 1_1 without DL assignment. In one example, the TCI state can be indicated by DCI format 1_2 without DL assignment.

In one example, when DCI format 1_1 is used for beam indication without DL assignment: (1) CS-RNTI is used to scramble the CRC for the DCI; and (2) the fields of the DCI format are configured according to TABLE 5 or TABLE 6.

TABLE 5

Example of DCI format 1_1 used for beam indication without DL assignment.

| Field | Description |
| --- | --- |
| Identifier for DCI formats | Value 1 to indicate DL DCI format |
| Carrier indicator | Described in TS 38.213 |
| Bandwidth part indicator | Number of DL BWP excluding initial DL BWP |
| Frequency domain resource assignment | Set to all "0"s for FDRA Type 0, or all "1"s for FDRA Type 1, or all "0"s for dynamicSwitch (same as in Table 10.2-4 of TS 38.213) |
| Time domain resource assignment | Described in TS 38.214. Index to determine slot offset and slot-length indicator value (SLIV) |
| VRB-to-PRB mapping | Reserved. Size is 0 or 1 bit |
| PRB bundling size indicator | Reserved. Size is 0 or 1 bit |
| Rate matching indicator | Reserved. Size is 0, 1, 2 bits |
| ZP CSI-RS trigger | Reserved. Size 0, 1, or 2 bits |
| For TB1: Modulation and coding scheme | all "1"s |
| For TB1: New data indicator | 0 |
| For TB1: Redundancy version | All "1"s |
| For TB2: Modulation and coding scheme | Reserved. Size is 5 bits, if maxNrofCodeWordsScheduledByDCI equals 2 |
| For TB2: New data indicator | Reserved. Size is 1 bits, if maxNrofCodeWordsScheduledByDCI equals 2 |
| For TB2: Redundancy version | Reserved. Size is 2 bits, if maxNrofCodeWordsScheduledByDCI equals 2 |
| HARQ process number | Reserved. Size is 4 bits |
| Downlink assignment index (DAI) | 2 bits total DAI, if more than one serving cell with dynamic codebook configured. 2 bits counter DAI, if dynamic codebook is configured. |
| TPC command for scheduled PUCCH | See TS 38.213 |
| PUCCH resource indicator | See TS 38.213 |
| PDSCH-to-HARQ feedback timing indicator | See TS 38.213 |
| One-shot HARQ-ACK request | Reserved. Size is 0 or 1 bit |
| PDSCH group index | Reserved. Size is 0 or 1 bit |
| New feedback indicator | Reserved. Size is 0, 1 or 2 bits |
| Number of requested PDSCH group(s) | Reserved. Size is 0 or 1 bit |
| Antenna ports | Reserved. Size is 4 to 6 bits |
| Transmission configuration indication | 0 bit if higher layer parameter tci-PresentInDCI is not enabled; otherwise, 3 bits. Used to indicate the TCI state. |
| SRS request | Reserved. Size is 2 bits |
| SRS offset indicator | Reserved. Size is 0, 1 or 2 bits |
| CBG transmission information | Reserved. Size is 0, 2, 4, 6 or 8 bits. |
| CBG flushing out information | Reserved. Size is 0 or 1 bit. |
| DMRS sequence initialization | Reserved. Size is 1 bit. |
| Priority indicator | Reserved. Size is 0 or 1 bit. |
| ChannelAccess-Cpext | Reserved. Size is 0, 1, 2, 3, or 4 bits. |
| Minimum applicable scheduling offset indicator | Reserved. Size is 0 or 1 bit. |
| Scell dormancy indication | Reserved. Size is 0 to 5 bits. |

TABLE 6

Example of DCI format 1_1 used for beam indication without DL assignment.

| Field | Description |
| --- | --- |
| Identifier for DCI formats | Value 1 to indicate DL DCI format |
| Carrier indicator | Described in TS 38.213 |
| Bandwidth part indicator | Number of DL BWP excluding initial DL BWP |
| Frequency domain resource assignment | Set to all "0"s for FDRA Type 0, or all "1"s for FDRA Type 1, or all "0"s for dynamicSwitch (same as in Table 10.2-4 of TS 38.213) |
| Time domain resource assignment | Described in TS 38.214. Index to determine slot offset and slot-length indicator value (SLIV) |
| VRB-to-PRB mapping | Reserved. Size is 0 or 1 bit |
| PRB bundling size indicator | Reserved. Size is 0 or 1 bit |
| Rate matching indicator | Reserved. Size is 0, 1, 2 bits |
| ZP CSI-RS trigger | Reserved. Size 0, 1, or 2 bits |
| For TB1: Modulation and coding scheme | all "1"s |
| For TB1: New data indicator | 0 |
| For TB1: Redundancy version | All "1"s |
| For TB2: Modulation and coding scheme | all "1"s |
| For TB2: New data indicator | 0 |
| For TB2: Redundancy version | All "1"s |
| HARQ process number | Reserved. Size is 4 bits |
| Downlink assignment index (DAI) | 2 bits total DAI, if more than one serving cell with dynamic codebook configured. 2 bits counter DAI, if dynamic codebook is configured. |
| TPC command for scheduled PUCCH | See TS 38.213 |
| PUCCH resource indicator | See TS 38.213 |
| PDSCH-to-HARQ feedback timing indicator | See TS 38.213 |
| One-shot HARQ-ACK request | Reserved. Size is 0 or 1 bit |
| PDSCH group index | Reserved. Size is 0 or 1 bit |
| New feedback indicator | Reserved. Size is 0, 1 or 2 bits |
| Number of requested PDSCH group(s) | Reserved. Size is 0 or 1 bit |
| Antenna ports | Reserved. Size is 4 to 6 bits |
| Transmission configuration indication | 0 bit if higher layer parameter tci-PresentInDCI is not enabled; otherwise, 3 bits. Used to indicate the TCI state. |
| SRS request | Reserved. Size is 2 bits |
| SRS offset indicator | Reserved. Size is 0, 1 or 2 bits |
| CBG transmission information | Reserved. Size is 0, 2, 4, 6 or 8 bits. |
| CBG flushing out information | Reserved. Size is 0 or 1 bit. |

TABLE 6-continued

Example of DCI format 1_1 used for
beam indication without DL assignment.

| Field | Description |
|---|---|
| DMRS sequence initialization | Reserved. Size is 1 bit. |
| Priority indicator | Reserved. Size is 0 or 1 bit. |
| ChannelAcces s-Cpext | Reserved. Size is 0, 1, 2, 3, or 4 bits. |
| Minimum applicable scheduling offset indicator | Reserved. Size is 0 or 1 bit. |
| Scell dormancy indication | Reserved. Size is 0 to 5 bits. |

As described in TS 38.212, each field is mapped in the order in which it appears in the description (as described in TS 38.212) including the zero padding if any, with the first field mapped to the lowest order information bit $a_0$ of the DCI format, and each successive field mapped to higher order information bits. The most significant bit of each field is mapped to the lowest order information bit for that field, e.g., the most significant bit of the first field is mapped to $a_0$.

In one example, the fields that are reserved can be repurposed for beam indication.

In one example, H fields are used for beam indication (TCI state or TCI state code point indication). The beam indication fields are h=0, ... H−1. The size of each beam indication field is $b_h$. In one example, all beam indication fields have the same size, i.e., $b_h$=b for h=0, ..., H−1.

In one example, the "transmission configuration indication" (TCI) field is used to indicate the TCI state or TCI state code point for h=0. The size of remaining TCI states or TCI state code points is $\Sigma_{h=1}^{H-1} b_h$ or (H−1)b.

In one sub-example, the bits corresponding to the reserved fields are repurposed for the indication of the TCI states or TCI state code points h=1, ..., H−1, starting from one of: (1) The first (according to the order in which it appears in the DCI format description in TS 38.212) reserved field in the DCI format, then the second reserved field, and so on until all TCI states or TCI state code points have been allocated to reserved bits. Or (2) The last (according to the order in which it appears in the DCI format description in TS 38.212) reserved field in the DCI format, then the second from last reserved field, and so on until all TCI states or TCI state code points have been allocated to reserved bits.

In one example, when the bits of a reserved field are repurposed, at least partially, for TCI states or TCI state code points, the bits are repurposed starting with the least significant bit of the field.

In one example, when the bits of a reserved field are repurposed, at least partially, for TCI states or TCI state code points, the bits are repurposed starting with the most significant bit of the field In one example, the mapping of TCI states or TCI state code points starts with h=1, then h=2, .... And starts with the MSB of each TCI state field, to the repurposed bits for TCI state indication starting with one of (1) the lowest order repurposed bit, or (2) the highest order repurposed bit.

In one example, the mapping of TCI states or TCI state code points starts with h=H−1, then h=H−2, ... h=1 And starts with the MSB of each TCI state field, to the repurposed bits for TCI state indication starting with one of (1) the lowest order repurposed bit, or (2) the highest order repurposed bit.

In one example, the mapping of TCI states or TCI state code points starts with h=1, then h=2, .... And starts with the LSB of each TCI state field, to the repurposed bits for TCI state indication starting with one of (1) the lowest order repurposed bit, or (2) the highest order repurposed bit.

In one example, the mapping of TCI states or TCI state code points starts with h=H−1, then h=H−2, ... h=1 And starts with the LSB of each TCI state field, to the repurposed bits for TCI state indication starting with one of (1) the lowest order repurposed bit, or (2) the highest order repurposed bit.

In one sub-example, the bits corresponding to reserved fields with a fixed bit size, that does not depend on RRC configuration, are repurposed for the indication of the TCI states or TCI state code points h=1, ..., H−1, starting from one of: (1) The first (according to the order in which it appears in the DCI format description in TS 38.212) reserved field with a fixed size in the DCI format, then the second reserved field with a fixed size, and so on until all TCI states or TCI state code points have been allocated to reserved bits (2) The last (according to the order in which it appears in the DCI format description in TS 38.212) reserved field with a fixed size in the DCI format, then the second from last reserved field with a fixed size, and so on until all TCI states or TCI state code points have been allocated to reserved bits.

Example of fields with fixed size included: (1) HARQ process number with size 4 bits; (2) SRS request with size 2 bits; and (3) DMRS sequence initiation with size 1 bit.

The following examples are additionally provided.

In one example, when the bits of a reserved field are repurposed, at least partially, for TCI states or TCI state code points, the bits are repurposed starting with the least significant bit of the field.

In one example, when the bits of a reserved field are repurposed, at least partially, for TCI states or TCI state code points, the bits are repurposed starting with the most significant bit of the field.

In one example, the mapping of TCI states or TCI state code points starts with h=1, then h=2, .... And starts with the MSB of each TCI state field, to the repurposed bits for TCI state indication starting with one of (1) the lowest order repurposed bit, or (2) the highest order repurposed bit.

In one example, the mapping of TCI states or TCI state code points starts with h=H−1, then h=H−2, ... h=1 And starts with the MSB of each TCI state field, to the repurposed bits for TCI state indication starting with one of (1) the lowest order repurposed bit, or (2) the highest order repurposed bit.

In one example, the mapping of TCI states or TCI state code points starts with h=1, then h=2, .... And starts with the LSB of each TCI state field, to the repurposed bits for TCI state indication starting with one of (1) the lowest order repurposed bit, or (2) the highest order repurposed bit.

In one example, the mapping of TCI states or TCI state code points starts with h=H−1, then h=H−2, ... h=1 And starts with the LSB of each TCI state field, to the repurposed bits for TCI state indication starting with one of (1) the lowest order repurposed bit, or (2) the highest order repurposed bit.

In one sub-example, the bits corresponding to reserved fields with a minimum bit size greater than 0, that does not depend on RRC configuration, are repurposed for the indication of the TCI states or TCI state code points h=1, ..., H−1, starting from one of: (1) The first (according to the order in which it appears in the DCI format description in TS 38.212) reserved field with a minimum size greater than 0 in the DCI format, then the second reserved field with a minimum size greater than 0, and so on until all TCI states or TCI state code points have been allocated to reserved bits.

(2) The last (according to the order in which it appears in the DCI format description in TS 38.212) reserved field with a minimum size greater than 0 in the DCI format, then the second from last reserved field with a minimum size greater than 0, and so on until all TCI states or TCI state code points have been allocated to reserved bits.

Example of fields with minimum size greater than 0 included: (1) HARQ process number with size 4 bits; (2) SRS request with size 2 bits; (3) antenna port with a minimum size of 4 bits. In one example only the bits corresponding to the minimum size can be repurposed (e.g., 4 bits), in another example, all the bits of the field depending on the RRC configuration can be repurposed; and (4) DMRS sequence initiation with size 1 bit.

The following examples are additionally provided.

In one example, when the bits of a reserved field are repurposed, at least partially, for TCI states or TCI state code points, the bits are repurposed starting with the least significant bit of the field.

In one example, when the bits of a reserved field are repurposed, at least partially, for TCI states or TCI state code points, the bits are repurposed starting with the most significant bit of the field.

In one example, the mapping of TCI states or TCI state code points starts with h=1, then h=2, . . . . And starts with the MSB of each TCI state field, to the repurposed bits for TCI state indication starting with one of (1) the lowest order repurposed bit, or (2) the highest order repurposed bit.

In one example, the mapping of TCI states or TCI state code points starts with h=H−1, then h=H−2, . . . h=1 And starts with the MSB of each TCI state field, to the repurposed bits for TCI state indication starting with one of (1) the lowest order repurposed bit, or (2) the highest order repurposed bit.

In one example, the mapping of TCI states or TCI state code points starts with h=1, then h=2, . . . . And starts with the LSB of each TCI state field, to the repurposed bits for TCI state indication starting with one of (1) the lowest order repurposed bit, or (2) the highest order repurposed bit.

In one example, the mapping of TCI states or TCI state code points starts with h=H−1, then h=H−2, . . . h=1 And starts with the LSB of each TCI state field, to the repurposed bits for TCI state indication starting with one of (1) the lowest order repurposed bit, or (2) the highest order repurposed bit.

In one example, if there are not enough bits to convey all the TCI states or TCI state codepoints, RRC configures additional fields in the DCI format, or increase the size of the fields of the DCI format, starting from one of: (1) The first (according to the order in which it appears in DCI format description in TS 38.212) reserved field in the DCI format, then the second reserved field, and so on until enough bits are available to allocate all TCI states or TCI state code points to reserved bits. Or (2) The last (according to the order in which it appears in DCI format description in TS 38.212) reserved field in the DCI format, then the second from last reserved field, and so on until enough bits are available to allocate all TCI states or TCI state code points to reserved bits.

In one example, existing RRC parameters are used to configure the fields. In another example, new RRC parameter(s) are introduced for the configuration of the fields, wherein the configured fields are applicable to both DCI with DL assignment and DCI without DL assignment, however, these fields may not be used in the DCI with DL assignment.

The following examples are additionally provided.

In one example, when the bits of a reserved field are repurposed, at least partially, for TCI states or TCI state code points, the bits are repurposed starting with the least significant bit of the field.

In one example, when the bits of a reserved field are repurposed, at least partially, for TCI states or TCI state code points, the bits are repurposed starting with the most significant bit of the field.

In one example, the mapping of TCI states or TCI state code points starts with h=1, then h=2, . . . . And starts with the MSB of each TCI state field, to the repurposed bits for TCI state indication starting with one of (1) the lowest order repurposed bit, or (2) the highest order repurposed bit.

In one example, the mapping of TCI states or TCI state code points starts with h=H−1, then h=H−2, . . . h=1 And starts with the MSB of each TCI state field, to the repurposed bits for TCI state indication starting with one of (1) the lowest order repurposed bit, or (2) the highest order repurposed bit.

In one example, the mapping of TCI states or TCI state code points starts with h=1, then h=2, . . . . And starts with the LSB of each TCI state field, to the repurposed bits for TCI state indication starting with one of (1) the lowest order repurposed bit, or (2) the highest order repurposed bit.

In one example, the mapping of TCI states or TCI state code points starts with h=H−1, then h=H−2, . . . h=1 And starts with the LSB of each TCI state field, to the repurposed bits for TCI state indication starting with one of (1) the lowest order repurposed bit, or (2) the highest order repurposed bit.

In one example, if there are not enough bits to convey all the TCI states or TCI state codepoints, it may be up to the network implementation to configure reserved DCI fields, with a sufficient number of bits to convey the TCI states or TCI state code points.

The following examples are additionally provided.

In one example, when the bits of a reserved field are repurposed, at least partially, for TCI states or TCI state code points, the bits are repurposed starting with the least significant bit of the field.

In one example, when the bits of a reserved field are repurposed, at least partially, for TCI states or TCI state code points, the bits are repurposed starting with the most significant bit of the field.

In one example, the mapping of TCI states or TCI state code points starts with h=1, then h=2, . . . . And starts with the MSB of each TCI state field, to the repurposed bits for TCI state indication starting with one of (1) the lowest order repurposed bit, or (2) the highest order repurposed bit.

In one example, the mapping of TCI states or TCI state code points starts with h=H−1, then h=H−2, . . . h=1 And starts with the MSB of each TCI state field, to the repurposed bits for TCI state indication starting with one of (1) the lowest order repurposed bit, or (2) the highest order repurposed bit.

In one example, the mapping of TCI states or TCI state code points starts with h=1, then h=2, . . . . And starts with the LSB of each TCI state field, to the repurposed bits for TCI state indication starting with one of (1) the lowest order repurposed bit, or (2) the highest order repurposed bit.

In one example, the mapping of TCI states or TCI state code points starts with h=H−1, then h=H−2, . . . h=1 And starts with the LSB of each TCI state field, to the repurposed bits for TCI state indication starting with one of (1) the lowest order repurposed bit, or (2) the highest order repurposed bit.

In one example, if there is one additional TCI state field, i.e., H=2, the "HARQ process number" (HPN) field number (4-bits) is used to convey the TCI state. If the TCI state field is 3-bits: (1) in one example, the TCI state field is mapped to the 3 MSBs of the HPN field; and (2) in another example, the TCI state field is mapped to the 3 LSBs of the HPN field.

If the TCI state field is 4-bits, all 4-bits of the HPN are used for the TCI state.

In one example, the size of the TCI states or TCI state code points is $\Sigma_{h=1}^{H-1} b_h$ or Hb.

In one sub-example, the bits corresponding to the reserved fields are repurposed for the indication of the TCI states or TCI state code points h=0, . . . , H−1, starting from one of: (1) The first (according to the order in which it appears in the DCI format description in TS 38.212) reserved field in the DCI format, then the second reserved field, and so on until all TCI states or TCI state code points have been allocated to reserved bits. Or (2) The last (according to the order in which it appears in the DCI format description in TS 38.212) reserved field in the DCI format, then the second from last reserved field, and so on until all TCI states or TCI state code points have been allocated to reserved bits.

In one example, when the bits of a reserved field are repurposed, at least partially, for TCI states or TCI state code points, the bits are repurposed starting with the least significant bit of the field.

In one example, when the bits of a reserved field are repurposed, at least partially, for TCI states or TCI state code points, the bits are repurposed starting with the most significant bit of the field.

In one example, the mapping of TCI states or TCI state code points starts with h=0, then h=1, . . . . And starts with the MSB of each TCI state field, to the repurposed bits for TCI state indication starting with one of (1) the lowest order repurposed bit, or (2) the highest order repurposed bit.

In one example, the mapping of TCI states or TCI state code points starts with h=H−1, then h=H−2, . . . h=0 And starts with the MSB of each TCI state field, to the repurposed bits for TCI state indication starting with one of (1) the lowest order repurposed bit, or (2) the highest order repurposed bit.

In one example, the mapping of TCI states or TCI state code points starts with h=0, then h=1, . . . . And starts with the LSB of each TCI state field, to the repurposed bits for TCI state indication starting with one of (1) the lowest order repurposed bit, or (2) the highest order repurposed bit.

In one example, the mapping of TCI states or TCI state code points starts with h=H−1, then h=H−2, . . . h=0 And starts with the LSB of each TCI state field, to the repurposed bits for TCI state indication starting with one of (1) the lowest order repurposed bit, or (2) the highest order repurposed bit.

In one sub-example, the bits corresponding to reserved fields with a fixed bit size, that does not depend on RRC configuration, are repurposed for the indication of the TCI states or TCI state code points h=0, . . . , H−1, starting from one of: (1) The first (according to the order in which it appears in the DCI format description in TS 38.212) reserved field with a fixed size in the DCI format, then the second reserved field with a fixed size, and so on until all TCI states or TCI state code points have been allocated to reserved bits; and (2) The last (according to the order in which it appears in the DCI format description in TS 38.212) reserved field with a fixed size in the DCI format, then the second from last reserved field with a fixed size, and so on until all TCI states or TCI state code points have been allocated to reserved bits.

Example of fields with fixed size included: (1) HARQ process number with size 4 bits; (2) in one example, transmission configuration indication with size 3 bits is included. In one example, transmission configuration indication is not included; (3) SRS request with size 2 bits; and (4) DMRS sequence initiation with size 1 bit.

The following examples are additionally provided.

In one example, when the bits of a reserved field are repurposed, at least partially, for TCI states or TCI state code points, the bits are repurposed starting with the least significant bit of the field.

In one example, when the bits of a reserved field are repurposed, at least partially, for TCI states or TCI state code points, the bits are repurposed starting with the most significant bit of the field.

In one example, the mapping of TCI states or TCI state code points starts with h=0, then h=1, . . . . And starts with the MSB of each TCI state field, to the repurposed bits for TCI state indication starting with one of (1) the lowest order repurposed bit, or (2) the highest order repurposed bit.

In one example, the mapping of TCI states or TCI state code points starts with h=H−1, then h=H−2, . . . h=0 And starts with the MSB of each TCI state field, to the repurposed bits for TCI state indication starting with one of (1) the lowest order repurposed bit, or (2) the highest order repurposed bit.

In one example, the mapping of TCI states or TCI state code points starts with h=0, then h=1, . . . . And starts with the LSB of each TCI state field, to the repurposed bits for TCI state indication starting with one of (1) the lowest order repurposed bit, or (2) the highest order repurposed bit.

In one example, the mapping of TCI states or TCI state code points starts with h=H−1, then h=H−2, . . . h=0 And starts with the LSB of each TCI state field, to the repurposed bits for TCI state indication starting with one of (1) the lowest order repurposed bit, or (2) the highest order repurposed bit.

In one sub-example, the bits corresponding to reserved fields with a minimum bit size greater than 0, that does not depend on RRC configuration, are repurposed for the indication of the TCI states or TCI state code points h=0, H−1, starting from one of: (1) The first (according to the order in which it appears in the DCI format description in TS 38.212) reserved field with a minimum size greater than 0 in the DCI format, then the second reserved field with a minimum size greater than 0, and so on until all TCI states or TCI state code points have been allocated to reserved bits; and (2) The last (according to the order in which it appears in the DCI format description in TS 38.212) reserved field with a minimum size greater than 0 in the DCI format, then the second from last reserved field with a minimum size greater than 0, and so on until all TCI states or TCI state code points have been allocated to reserved bits.

Example of fields with minimum size greater than 0 included: (1) HARQ process number with size 4 bits; (2) SRS request with size 2 bits; (3) in one example, transmission configuration indication with size 3 bits is included. In one example, transmission configuration indication is not included; (4) antenna port with a minimum size of 4 bits. In one example only the bits corresponding to the minimum size can be repurposed (e.g., 4 bits), in another example, all the bits of the field depending on the RRC configuration can be repurposed; and (5) DMRS sequence initiation with size 1 bit.

The following examples are additionally provided.

In one example, when the bits of a reserved field are repurposed, at least partially, for TCI states or TCI state code points, the bits are repurposed starting with the least significant bit of the field.

In one example, when the bits of a reserved field are repurposed, at least partially, for TCI states or TCI state code points, the bits are repurposed starting with the most significant bit of the field.

In one example, the mapping of TCI states or TCI state code points starts with h=0, then h=1, . . . . And starts with the MSB of each TCI state field, to the repurposed bits for TCI state indication starting with one of (1) the lowest order repurposed bit, or (2) the highest order repurposed bit.

In one example, the mapping of TCI states or TCI state code points starts with h=H−1, then h=H−2, . . . h=0 And starts with the MSB of each TCI state field, to the repurposed bits for TCI state indication starting with one of (1) the lowest order repurposed bit, or (2) the highest order repurposed bit.

In one example, the mapping of TCI states or TCI state code points starts with h=0, then h=1, . . . . And starts with the LSB of each TCI state field, to the repurposed bits for TCI state indication starting with one of (1) the lowest order repurposed bit, or (2) the highest order repurposed bit.

In one example, the mapping of TCI states or TCI state code points starts with h=H−1, then h=H−2, . . . h=0 And starts with the LSB of each TCI state field, to the repurposed bits for TCI state indication starting with one of (1) the lowest order repurposed bit, or (2) the highest order repurposed bit.

In one example, if there are not enough bits to convey all the TCI states or TCI state codepoints, RRC configures additional fields in the DCI format, or increase the size of the fields of the DCI format, starting from one of: (1) The first (according to the order in which it appears in the DCI format description in TS 38.212) reserved field in the DCI format, then the second reserved field, and so on until enough bits are available to allocate all TCI states or TCI state code points to reserved bits. Or (2) The last (according to the order in which it appears in the DCI format description in TS 38.212) reserved field in the DCI format, then the second from last reserved field, and so on until enough bits are available to allocate all TCI states or TCI state code points to reserved bits.

In one example, existing RRC parameters are used to configure the fields. In another example, new RRC parameter(s) are introduced for the configuration of the fields, wherein the configured fields are applicable to both DCI with DL assignment and DCI without DL assignment, however, these fields may not be used in the DCI with DL assignment.

The following examples are additionally provided.

In one example, when the bits of a reserved field are repurposed, at least partially, for TCI states or TCI state code points, the bits are repurposed starting with the least significant bit of the field.

In one example, when the bits of a reserved field are repurposed, at least partially, for TCI states or TCI state code points, the bits are repurposed starting with the most significant bit of the field.

In one example, the mapping of TCI states or TCI state code points starts with h=0, then h=1, . . . . And starts with the MSB of each TCI state field, to the repurposed bits for TCI state indication starting with one of (1) the lowest order repurposed bit, or (2) the highest order repurposed bit.

In one example, the mapping of TCI states or TCI state code points starts with h=H−1, then h=H−2, . . . h=0 And starts with the MSB of each TCI state field, to the repurposed bits for TCI state indication starting with one of (1) the lowest order repurposed bit, or (2) the highest order repurposed bit.

In one example, the mapping of TCI states or TCI state code points starts with h=0, then h=1, . . . . And starts with the LSB of each TCI state field, to the repurposed bits for TCI state indication starting with one of (1) the lowest order repurposed bit, or (2) the highest order repurposed bit.

In one example, the mapping of TCI states or TCI state code points starts with h=H−1, then h=H−2, . . . h=0 And starts with the LSB of each TCI state field, to the repurposed bits for TCI state indication starting with one of (1) the lowest order repurposed bit, or (2) the highest order repurposed bit.

In one example, if there are not enough bits to convey all the TCI states or TCI state codepoints, it may be up to the network implementation to configure reserved DCI fields, with a sufficient number of bits to convey the TCI states or TCI state code points.

The following examples are additionally provided.

In one example, when the bits of a reserved field are repurposed, at least partially, for TCI states or TCI state code points, the bits are repurposed starting with the least significant bit of the field.

In one example, when the bits of a reserved field are repurposed, at least partially, for TCI states or TCI state code points, the bits are repurposed starting with the most significant bit of the field.

In one example, the mapping of TCI states or TCI state code points starts with h=0, then h=1, . . . . And starts with the MSB of each TCI state field, to the repurposed bits for TCI state indication starting with one of (1) the lowest order repurposed bit, or (2) the highest order repurposed bit.

In one example, the mapping of TCI states or TCI state code points starts with h=H−1, then h=H−2, . . . h=0 And starts with the MSB of each TCI state field, to the repurposed bits for TCI state indication starting with one of (1) the lowest order repurposed bit, or (2) the highest order repurposed bit.

In one example, the mapping of TCI states or TCI state code points starts with h=0, then h=1, . . . . And starts with the LSB of each TCI state field, to the repurposed bits for TCI state indication starting with one of (1) the lowest order repurposed bit, or (2) the highest order repurposed bit.

In one example, the mapping of TCI states or TCI state code points starts with h=H−1, then h=H−2, . . . h=0 And starts with the LSB of each TCI state field, to the repurposed bits for TCI state indication starting with one of (1) the lowest order repurposed bit, or (2) the highest order repurposed bit.

In one example, if there is one additional TCI state field, i.e., H=2: (1) the "transmission configuration indication" (TCI) field is used to convey one TCI state (e.g., the first TCI state); and (2) the "HARQ process number" (HPN) field number (4-bits) is used to convey the other TCI state (e.g., the second TCI state). If the TCI state field is 3-bits: (a) in one example, the TCI state field is mapped to the 3 MSBs of the HPN field; and (b) in another example, the TCI state field is mapped to the 3 LSBs of the HPN field.

If the TCI state field is 4-bits, all 4-bits of the HPN are used for the TCI state: (1) in an alternative example, the first TCI state is conveyed by the HPN field and the second TCI state is conveyed by the TCI field.

In one example, when DCI format 1_2 is used for beam indication without DL assignment: (1) CS-RNTI is used to scramble the CRC for the DCI; and (2) the fields of the DCI format are configured according to TABLE 7.

TABLE 7

Example of DCI format 1_2 used for
beam indication without DL assignment.

| Field | Description |
|---|---|
| Identifier for DCI formats | Value 1 to indicate DL DCI format |
| Carrier indicator | Described in TS 38.213 |
| Bandwidth part indicator | Number of DL BWP excluding initial DL BWP |
| Frequency domain resource assignment | Set to all "0"s for FDRA Type 0, or all "1"s for FDRA Type 1, or all "0"s for dynamicSwitch (same as in Table 10.2-4 of TS 38.213) |
| Time domain resource assignment | Described in TS 38.214. Index to determine slot offset and slot-length indicator value (SLIV) |
| VRB-to-PRB mapping | Reserved. Size is 0 or 1 bit |
| PRB bundling size indicator | Reserved. Size is 0 or 1 bit |
| Rate matching indicator | Reserved. Size 0, 1, or 2 bits |
| ZP CSI-RS trigger | Reserved. Size 0, 1, or 2 bits |
| Modulation and coding scheme | all "1"s |
| New data indicator | 0 |
| Redundancy version | all "1"s |
| HARQ process number | Reserved. Size 0 to 4 bits |
| Downlink assignment index | Size 0, 1, 2, or 4 bits. |
| TPC command for scheduled PUCCH | See TS 38.213 |
| Second TPC command for scheduled PUCCH | Reserved. Size is 0 or 2 bits |
| PUCCH resource indicator | See TS 38.213 |
| PDSCH-to-HARQ feedback timing indicator | See TS 38.213 |
| Antenna ports | Reserved. Size is 0, or 4 to 6 bits |
| Transmission configuration indication | 0 bit if higher layer parameter tci-PresentDCI-1-2 is not configured; otherwise, 1, 2, or 3 bits. Used to indicate the TCI state. |
| SRS request | Reserved. Size is 0, to 3 bits |
| SRS offset indicator | Reserved. Size is 0, 1, or 2 bits |
| DMRS sequence initialization | Reserved. Size is 0 or 1 bit |
| Priority indicator | Reserved. Size is 0 or 1 bit. |

As described in TS 38.212, each field is mapped in the order in which it appears in the description (as described in TS 38.212) including the zero padding if any, with the first field mapped to the lowest order information bit $a_0$ of the DCI format, and each successive field mapped to higher order information bits. The most significant bit of each field is mapped to the lowest order information bit for that field, e.g., the most significant bit of the first field is mapped to $a_0$.

In one example, the fields that are reserved can be repurposed for beam indication.

In one example, H fields are used for beam indication (TCI state or TCI state code point indication). The beam indication fields are h=0, . . . H−1. The size of each beam indication field is $b_h$. In one example, all beam indication fields have the same size, i.e., $b_h$=b for h=0, . . . , H−1.

In one example, the "transmission configuration indication" (TCI) field is used to indicate the TCI state or TCI state code point for h=0. The size of remaining TCI states or TCI state code points is $\Sigma_{h=1}^{H-1} b_h$ or (H−1)b.

Note that, according to TABLE 7, the fields reserved in a DCI format 1_2 without DL assignment can have a minimum size of 0. In this case, if there are not enough reserved fields configured to convey the TCI states or TCI state code points, additional reserved fields can be configured and/or existing fields can be configured to have a larger bit-width.

In one sub-example, the bits corresponding to the reserved fields are repurposed for the indication of the TCI states or TCI state code points h=1, . . . , H−1, starting from one of: (1) The first (according to the order in which it appears in the DCI format description in TS 38.212) reserved field in the DCI format, then the second reserved field, and so on until all TCI states or TCI state code points have been allocated to reserved bits. Or (2) The last (according to the order in which it appears in the DCI format description in TS 38.212) reserved field in the DCI format, then the second from last reserved field, and so on until all TCI states or TCI state code points have been allocated to reserved bits.

In one example, when the bits of a reserved field are repurposed, at least partially, for TCI states or TCI state code points, the bits are repurposed starting with the least significant bit of the field.

In one example, when the bits of a reserved field are repurposed, at least partially, for TCI states or TCI state code points, the bits are repurposed starting with the most significant bit of the field.

In one example, the mapping of TCI states or TCI state code points starts with h=1, then h=2, . . . . And starts with the MSB of each TCI state field, to the repurposed bits for TCI state indication starting with one of (1) the lowest order repurposed bit, or (2) the highest order repurposed bit.

In one example, the mapping of TCI states or TCI state code points starts with h=H−1, then h=H−2, . . . h=1 And starts with the MSB of each TCI state field, to the repurposed bits for TCI state indication starting with one of (1) the lowest order repurposed bit, or (2) the highest order repurposed bit.

In one example, the mapping of TCI states or TCI state code points starts with h=1, then h=2, . . . . And starts with the LSB of each TCI state field, to the repurposed bits for TCI state indication starting with one of (1) the lowest order repurposed bit, or (2) the highest order repurposed bit.

In one example, the mapping of TCI states or TCI state code points starts with h=H−1, then h=H−2, . . . h=1 And starts with the LSB of each TCI state field, to the repurposed bits for TCI state indication starting with one of (1) the lowest order repurposed bit, or (2) the highest order repurposed bit.

In one example, if there are not enough bits to convey all the TCI states or TCI state codepoints, RRC configures additional fields in the DCI format, or increase the size of the fields of the DCI format, starting from one of: (1) The first (according to the order in which it appears in DCI format description in TS 38.212) reserved field in the DCI format, then the second reserved field, and so on until enough bits are available to allocate all TCI states or TCI state code points to reserved bits. Or (2) The last (according to the order in which it appears in DCI format description in TS 38.212) reserved field in the DCI format, then the second from last reserved field, and so on until enough bits are available to allocate all TCI states or TCI state code points to reserved bits.

In one example, existing RRC parameters are used to configure the fields. In another example, new RRC parameter(s) are introduced for the configuration of the fields, wherein the configured fields are applicable to both DCI with DL assignment and DCI without DL assignment, however, these fields may not be used in the DCI with DL assignment.

The following examples are additionally provided.

In one example, when the bits of a reserved field are repurposed, at least partially, for TCI states or TCI state code points, the bits are repurposed starting with the least significant bit of the field.

In one example, when the bits of a reserved field are repurposed, at least partially, for TCI states or TCI state code points, the bits are repurposed starting with the most significant bit of the field.

In one example, the mapping of TCI states or TCI state code points starts with h=1, then h=2, . . . . And starts with the MSB of each TCI state field, to the repurposed bits for TCI state indication starting with one of (1) the lowest order repurposed bit, or (2) the highest order repurposed bit.

In one example, the mapping of TCI states or TCI state code points starts with h=H−1, then h=H−2, . . . h=1 And starts with the MSB of each TCI state field, to the repurposed bits for TCI state indication starting with one of (1) the lowest order repurposed bit, or (2) the highest order repurposed bit.

In one example, the mapping of TCI states or TCI state code points starts with h=1, then h=2, . . . . And starts with the LSB of each TCI state field, to the repurposed bits for TCI state indication starting with one of (1) the lowest order repurposed bit, or (2) the highest order repurposed bit.

In one example, the mapping of TCI states or TCI state code points starts with h=H−1, then h=H−2, . . . h=1 And starts with the LSB of each TCI state field, to the repurposed bits for TCI state indication starting with one of (1) the lowest order repurposed bit, or (2) the highest order repurposed bit.

In one example, if there are not enough bits to convey all the TCI states or TCI state codepoints, it may be up to the network implementation to configure reserved DCI fields, with a sufficient number of bits to convey the TCI states or TCI state code points.

The following examples are additionally provided.

In one example, when the bits of a reserved field are repurposed, at least partially, for TCI states or TCI state code points, the bits are repurposed starting with the least significant bit of the field.

In one example, when the bits of a reserved field are repurposed, at least partially, for TCI states or TCI state code points, the bits are repurposed starting with the most significant bit of the field.

In one example, the mapping of TCI states or TCI state code points starts with h=1, then h=2, . . . . And starts with the MSB of each TCI state field, to the repurposed bits for TCI state indication starting with one of (1) the lowest order repurposed bit, or (2) the highest order repurposed bit.

In one example, the mapping of TCI states or TCI state code points starts with h=H−1, then h=H−2, . . . h=1 And starts with the MSB of each TCI state field, to the repurposed bits for TCI state indication starting with one of (1) the lowest order repurposed bit, or (2) the highest order repurposed bit.

In one example, the mapping of TCI states or TCI state code points starts with h=1, then h=2, . . . . And starts with the LSB of each TCI state field, to the repurposed bits for TCI state indication starting with one of (1) the lowest order repurposed bit, or (2) the highest order repurposed bit.

In one example, the mapping of TCI states or TCI state code points starts with h=H−1, then h=H−2, . . . h=1 And starts with the LSB of each TCI state field, to the repurposed bits for TCI state indication starting with one of (1) the lowest order repurposed bit, or (2) the highest order repurposed bit.

In one example, if there is one additional TCI state field, i.e., H=2, the "HARQ process number" (HPN) field number (0 to 4-bits) is used to convey the TCI state. The HPN is configured with at least enough bits to convey the TCI. In one example, existing RRC parameters are used to configure the size of HPN to be sufficient for TCI state (if not already sufficient). In another example, new RRC parameter(s) are introduced for the configuration of the HPN field to have sufficient size for the TCI state (if not already sufficient), wherein the additionally configured bits in the HPN are applicable to both DCI with DL assignment and DCI without DL assignment, however, these additional bits may not be used in the DCI with DL assignment.

The additional bits may be one of (1) MSB bits of the HPN field, (2) LSB bits of the HPN field. If the TCI field is m-bits and the HPN field is n-bits, wherein n≥m: (1) in one example, the TCI state field is mapped to the m MSBs of the HPN field; and (2) in another example, the TCI state field is mapped to the m LSB s of the HPN field.

If the TCI state field is n-bits, all n-bits of the HPN are used for the TCI state.

In one example, the size of the TCI states or TCI state code points is $\Sigma_{h=1}^{H-1} b_h$ or Hb.

Note that, according to TABLE 7, the fields reserved in a DCI format 1_2 without DL assignment can have a minimum size of 0. In this case, if there are not enough reserved fields configured to convey the TCI states or TCI state code points, additional reserved fields can be configured and/or existing fields can be configured to have a larger bit-width.

In one sub-example, the bits corresponding to the reserved fields are repurposed for the indication of the TCI states or TCI state code points h=0, . . . , H−1, starting from one of: (1) The first (according to the order in which it appears in the DCI format description in TS 38.212) reserved field in the DCI format, then the second reserved field, and so on until all TCI states or TCI state code points have been allocated to reserved bits. Or (2) The last (according to the order in which it appears in the DCI format description in TS 38.212) reserved field in the DCI format, then the second from last reserved field, and so on until all TCI states or TCI state code points have been allocated to reserved bits.

In one example, when the bits of a reserved field are repurposed, at least partially, for TCI states or TCI state code points, the bits are repurposed starting with the least significant bit of the field.

In one example, when the bits of a reserved field are repurposed, at least partially, for TCI states or TCI state code points, the bits are repurposed starting with the most significant bit of the field.

In one example, the mapping of TCI states or TCI state code points starts with h=0, then h=1, . . . . And starts with the MSB of each TCI state field, to the repurposed bits for TCI state indication starting with one of (1) the lowest order repurposed bit, or (2) the highest order repurposed bit.

In one example, the mapping of TCI states or TCI state code points starts with h=H−1, then h=H−2, . . . h=0 And starts with the MSB of each TCI state field, to the repurposed bits for TCI state indication starting with one of (1) the lowest order repurposed bit, or (2) the highest order repurposed bit.

In one example, the mapping of TCI states or TCI state code points starts with h=0, then h=1, . . . . And starts with the LSB of each TCI state field, to the repurposed bits for TCI state indication starting with one of (1) the lowest order repurposed bit, or (2) the highest order repurposed bit.

In one example, the mapping of TCI states or TCI state code points starts with h=H−1, then h=H−2, ... h=0 And starts with the LSB of each TCI state field, to the repurposed bits for TCI state indication starting with one of (1) the lowest order repurposed bit, or (2) the highest order repurposed bit.

In one example, if there are not enough bits to convey all the TCI states or TCI state codepoints, RRC configures additional fields in the DCI format, or increase the size of the fields of the DCI format, starting from one of: (1) The first (according to the order in which it appears in the DCI format description in TS 38.212) reserved field in the DCI format, then the second reserved field, and so on until enough bits are available to allocate all TCI states or TCI state code points to reserved bits. Or (2) The last (according to the order in which it appears in the DCI format description in TS 38.212) reserved field in the DCI format, then the second from last reserved field, and so on until enough bits are available to allocate all TCI states or TCI state code points to reserved bits.

In one example, existing RRC parameters are used to configure the fields. In another example, new RRC parameter(s) are introduced for the configuration of the fields, wherein the configured fields are applicable to both DCI with DL assignment and DCI without DL assignment, however, these fields may not be used in the DCI with DL assignment.

The following examples are additionally provided.

In one example, when the bits of a reserved field are repurposed, at least partially, for TCI states or TCI state code points, the bits are repurposed starting with the least significant bit of the field.

In one example, when the bits of a reserved field are repurposed, at least partially, for TCI states or TCI state code points, the bits are repurposed starting with the most significant bit of the field.

In one example, the mapping of TCI states or TCI state code points starts with h=0, then h=1, .... And starts with the MSB of each TCI state field, to the repurposed bits for TCI state indication starting with one of (1) the lowest order repurposed bit, or (2) the highest order repurposed bit.

In one example, the mapping of TCI states or TCI state code points starts with h=H−1, then h=H−2, ... h=0 And starts with the MSB of each TCI state field, to the repurposed bits for TCI state indication starting with one of (1) the lowest order repurposed bit, or (2) the highest order repurposed bit.

In one example, the mapping of TCI states or TCI state code points starts with h=0, then h=1, .... And starts with the LSB of each TCI state field, to the repurposed bits for TCI state indication starting with one of (1) the lowest order repurposed bit, or (2) the highest order repurposed bit.

In one example, the mapping of TCI states or TCI state code points starts with h=H−1, then h=H−2, ... h=0 And starts with the LSB of each TCI state field, to the repurposed bits for TCI state indication starting with one of (1) the lowest order repurposed bit, or (2) the highest order repurposed bit.

In one example, if there are not enough bits to convey all the TCI states or TCI state codepoints, it may be up to the network implementation to configure reserved DCI fields, with a sufficient number of bits to convey the TCI states or TCI state code points.

The following examples are additionally provided.

In one example, when the bits of a reserved field are repurposed, at least partially, for TCI states or TCI state code points, the bits are repurposed starting with the least significant bit of the field.

In one example, when the bits of a reserved field are repurposed, at least partially, for TCI states or TCI state code points, the bits are repurposed starting with the most significant bit of the field.

In one example, the mapping of TCI states or TCI state code points starts with h=0, then h=1, .... And starts with the MSB of each TCI state field, to the repurposed bits for TCI state indication starting with one of (1) the lowest order repurposed bit, or (2) the highest order repurposed bit.

In one example, the mapping of TCI states or TCI state code points starts with h=H−1, then h=H−2, ... h=0 And starts with the MSB of each TCI state field, to the repurposed bits for TCI state indication starting with one of (1) the lowest order repurposed bit, or (2) the highest order repurposed bit.

In one example, the mapping of TCI states or TCI state code points starts with h=0, then h=1, .... And starts with the LSB of each TCI state field, to the repurposed bits for TCI state indication starting with one of (1) the lowest order repurposed bit, or (2) the highest order repurposed bit.

In one example, the mapping of TCI states or TCI state code points starts with h=H−1, then h=H−2, ... h=0 And starts with the LSB of each TCI state field, to the repurposed bits for TCI state indication starting with one of (1) the lowest order repurposed bit, or (2) the highest order repurposed bit.

In one example, if there is one additional TCI state field, i.e., H=2: (1) the "transmission configuration indication" (TCI) field is used to convey one TCI state (e.g., the first TCI state); and (2) the "HARQ process number" (HPN) field number (0 to 4-bits) is used to convey the other TCI state (e.g., the second TCI state). The HPN is configured with at least enough bits to convey the TCI. In one example, existing RRC parameters are used to configure the size of HPN to be sufficient for TCI state (if not already sufficient). In another example, new RRC parameter(s) are introduced for the configuration of the HPN field to have sufficient size for the TCI state (if not already sufficient), wherein the additionally configured bits in the HPN are applicable to both DCI with DL assignment and DCI without DL assignment, however, these additional bits may not be used in the DCI with DL assignment. The additional bits may be one of (1) MSB bits of the HPN field, (2) LSB bits of the HPN field. If the TCI field is m-bits and the HPN field is n-bits, wherein n≥m: (a) in one example, the TCI state field is mapped to the m MSBs of the HPN field; and (b) in another example, the TCI state field is mapped to the m LSB s of the HPN field.

If the TCI state field is n-bits, all n-bits of the HPN are used for the TCI state: (1) in an alternative example, the first TCI state is conveyed by the HPN field and the second TCI state is conveyed by the TCI field.

Various embodiments of the present disclosure provide: (1) activation of multiple TCI state subsets for multiple TRPs; and (2) repurposing of fields in DL-related DCI format without DL assignment for addition TCI fields.

A beam based operation is essential for the commercialization of FR2 (i.e., mmWaves), support of beam management in release 15 and release 16 incurs overhead and latency impacting the robustness of beam management. To address this concern, release 17 introduced the unified TCI framework to streamline beam management. Rel-17, for unified TCI framework, considered single TRP operation.

Rel-18 extends the unified TCI framework to support multi-TRP (mTRP) operation. This involves multiple beam indications for DL and UL channels (M=>2 and/or N=>2), where M is the number of DL beam indications and M is the number of UL beam indications. Signaling aspects for the multiple TCI states is provided in this disclosure.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE), comprising:
 a transceiver configured to:
  receive configuration information for a list of transmission configuration indicator (TCI) states,
  receive configuration information for a list of TCI state code points, wherein a TCI state code point from the list of TCI state code points indicates a TCI state for a first carrier and a TCI state for a second carrier,
  receive configuration information for cross carrier scheduling,
  receive a downlink control information (DCI) format including (i) a carrier indicator field associated with the configuration information for cross carrier scheduling and (ii) a transmission configuration indication field indicating the TCI state code point;
  receive a list of component carriers that corresponds to a same TCI state identifier (ID), wherein a carrier indicated by the carrier indicator field of the DCI format is included in the list of component carriers; and
 a processor operably coupled to the transceiver, the processor configured to apply the indicated TCI state code point for the first carrier and the second carrier and all carriers in the list of components carriers,
 wherein the transceiver is further configured to receive or transmit, on the first and second carriers, downlink (DL) channels or uplink (UL) channels, respectively, based on quasi-co-location properties or spatial properties corresponding to the indicated TCI state code point,
 wherein the application of the indicated TCI state code point for the carriers in the list of component carriers is after a configured time from a last symbol of a channel conveying hybrid automatic repeat request acknowledgement (HARQ-ACK) feedback corresponding to the DCI format, and
 wherein the configured time depends on a carrier with a smallest sub-carrier spacing among a carrier on which the DCI format was received and the carriers in the list of component carriers that use the indicated TCI state code point.

2. The UE of claim 1, wherein:
 the first carrier is a carrier on which the DCI format is received, and
 the second carrier is a carrier indicated by the carrier indicator field of the DCI format.

3. The UE of claim 1, wherein the configured time further depends on a carrier with a smallest sub-carrier spacing between a carrier on which the DCI format was received and a carrier indicated by the DCI format.

4. The UE of claim 1, wherein the TCI state code point indicates:
 a DL, UL, or Joint TCI state for the first carrier, and
 a DL, UL, or Joint TCI state for the second carrier.

5. The UE of claim 1, wherein the DCI format is DCI Format 1_1 or DCI Format 1_2 carrying the TCI state code point with a DL assignment.

6. The UE of claim 1, wherein the DCI format is DCI Format 1_1 or DCI Format 1_2 carrying the TCI state code point without a DL assignment.

7. A base station (BS), comprising:
 a transceiver configured to:
  transmit configuration information for a list of transmission configuration indicator (TCI) states,
  transmit configuration information for a list of TCI state code points, wherein a TCI state code point from the list of TCI state code points indicates a TCI state for a first carrier and a TCI state for a second carrier,
  transmit configuration information for cross carrier scheduling,
  transmit a downlink control information (DCI) format including (i) a carrier indicator field associated with the configuration information for cross carrier scheduling and (ii) a transmission configuration indication field indicating the TCI state code point,
  transmit a list of component carriers that corresponds to a same TCI state identifier (ID), wherein a carrier indicated by the carrier indicator field of the DCI format is included in the list of component carriers; and
 a processor operably coupled to the transceiver, the processor configured to apply the indicated TCI state code point for the first carrier and the second carrier and all carriers in the list of components carriers,
 wherein the transceiver is further configured to transmit or receive, on the first carrier and the second carrier, downlink (DL) channels or uplink (UL) channels, respectively, based on quasi-co-location properties or spatial properties corresponding to the indicated TCI state code point,
 wherein the application of the indicated TCI state code point for the carriers in the list of component carrier is after a configured time from a last symbol of a channel conveying hybrid automatic repeat request acknowledgement (HARQ-ACK) feedback corresponding to the DCI format, and
 wherein the configured time depends on a carrier with a smallest sub-carrier spacing among a carrier on which the DCI format was transmitted and the carriers in the list of component carriers that use the indicated TCI state code point.

8. The BS of claim 7, wherein:
 the first carrier is a carrier on which the DCI format is transmitted, and
 the second carrier is a carrier indicated by the carrier indicator field of the DCI format.

9. The BS of claim 7, wherein the configured time further depends on a carrier with a smallest sub-carrier spacing between a carrier on which the DCI format was transmitted and a carrier indicated by the DCI format.

10. The BS of claim 7, wherein the TCI state code point indicates:
a DL, UL, or Joint TCI state for the first carrier, and
a DL, or UL, or Joint TCI state for the second carrier.

11. The BS of claim 7, wherein the DCI format is DCI Format 1_1 or DCI Format 1_2 carrying the TCI state code point with a DL assignment.

12. The BS of claim 7, wherein the DCI format is DCI Format 1_1 or DCI Format 1_2 carrying the TCI state code point without a DL assignment.

13. A method of operating a user equipment (UE), the method comprising:
receiving configuration information for a list of transmission configuration indicator (TCI) states;
receiving configuration information for a list of TCI state code points, wherein a TCI state code point from the list of TCI state code points indicates a TCI state for a first carrier and a TCI state for a second carrier;
receiving configuration information for cross carrier scheduling;
receiving a downlink control information (DCI) format including (i) a carrier indicator field associated with the configuration information for cross carrier scheduling and (ii) a transmission configuration indication field indicating the TCI state code point;
receiving a list of component carriers that corresponds to a same TCI state identifier (ID), wherein a carrier indicated by the carrier indicator field of the DCI format is included in the list of component carriers;
applying the indicated TCI state code point for the first carrier and the second carrier and all carriers in the list of components carriers; and
receiving or transmitting, on the first carrier and the second carrier, downlink (DL) channels or uplink (UL) channels, respectively, based on quasi-co-location properties or spatial properties corresponding to the indicated TCI state code point,
wherein the application of the indicated TCI state code point for the carriers in the list of component carriers is after a configured time from a last symbol of a channel conveying hybrid automatic repeat request acknowledgement (HARQ-ACK) feedback corresponding to the DCI format, and
wherein the configured time depends on a carrier with a smallest sub-carrier spacing among a carrier on which the DCI format was received and the carriers in the list of component carriers that use the indicated TCI state code point.

14. The method of claim 13, wherein:
the first carrier is a carrier on which the DCI format is received, and
the second carrier is a carrier indicated by the carrier indicator field of the DCI format.

15. The method of claim 13, wherein the configured time further depends on a carrier with a smallest sub-carrier spacing between a carrier on which the DCI format was received and a carrier indicated by the DCI format.

16. The method of claim 13, wherein the TCI state code point indicates:
a DL, UL, or Joint TCI state for the first carrier, and
a DL, UL, or Joint TCI state for the second carrier.

17. The method of claim 13, wherein:
the DCI format is DCI Format 1_1 or DCI Format 1_2 carrying the TCI state code point with a DL assignment, or
the DCI format is DCI Format 1_1 or DCI Format 1_2 carrying the TCI state code point without a DL assignment.

* * * * *